(12) United States Patent
Hatai et al.

(10) Patent No.: US 6,794,805 B1
(45) Date of Patent: Sep. 21, 2004

(54) FIELD EMISSION ELECTRON SOURCE, METHOD OF PRODUCING THE SAME, AND USE OF THE SAME

(75) Inventors: Takashi Hatai, Osaka (JP); Takuya Komoda, Hyogo (JP); Yoshiaki Honda, Kyoto (JP); Koichi Aizawa, Osaka (JP); Yoshifumi Watabe, Osaka (JP); Tsutomu Ichihara, Osaka (JP); Yukihiro Kondo, Osaka (JP); Naomasa Oka, Kyoto (JP); Nobuyoshi Koshida, Tokyo (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 09/382,956

(22) Filed: Aug. 25, 1999

(30) Foreign Application Priority Data

| May 26, 1998 | (JP) | ............................................. | 11-146739 |
| Aug. 26, 1998 | (JP) | ............................................. | 10-239606 |
| Sep. 25, 1998 | (JP) | ............................................. | 10-272334 |
| Dec. 22, 1998 | (JP) | ............................................. | 10-363965 |
| Dec. 22, 1998 | (JP) | ............................................. | 10-363970 |

(51) Int. Cl.$^7$ ............................ H01J 1/30; H01J 29/04; H01J 31/12
(52) U.S. Cl. ...................... 313/309; 313/310; 313/311
(58) Field of Search .............................. 313/310, 309, 313/311, 495, 496, 336, 351

(56) References Cited

U.S. PATENT DOCUMENTS

| 5,894,189 A |  | 4/1999 | Ogasawara et al. | .......... 313/310 |
| 6,249,080 B1 | * | 6/2001 | Komoda et al. | ............ 313/310 |
| 6,285,118 B1 |  | 9/2001 | Hatai et al. | |
| 6,498,426 B1 |  | 12/2002 | Watabe et al. | |
| 6,583,578 B1 |  | 6/2003 | Ichihara et al. | |
| 6,590,321 B1 |  | 7/2003 | Komoda et al. | |

FOREIGN PATENT DOCUMENTS

| JP | 6-140502 | 5/1994 | .......... H01L/21/76 |
| JP | 8-111166 | 4/1996 | ............. H01J/1/30 |
| JP | 9-92130 | 4/1997 | ............. H01J/1/30 |
| JP | 9-259795 | 10/1997 | ........... H01J/31/12 |

OTHER PUBLICATIONS

Partial Translation of Japanese Patent Publication No. 08–111166, published Apr. 30, 1996.*
English language abstract of JP 6–140502.
English language abstract of JP 8–111166.
English language abstract of JP 9–92130.
English language abstract of JP 9–259795.

* cited by examiner

*Primary Examiner*—Ashok Patel
(74) *Attorney, Agent, or Firm*—Greenblum & Bernstein, P.L.C.

(57) ABSTRACT

An array of field emission electron sources and a method of preparing the array which discharges electrons from desired regions of a surface electrode of field emission electron sources. The field emission electron source 10 comprises an electrically conductive substrate of p-type silicon substrate 1; n-type regions 8 of stripes of diffusion layers on one of principal surfaces of the p-type silicon substrate, strong electric field drift layers 6 formed on the n-type regions 8 which is made of oxidized porous poly-silicon for drifting electrons injected from the n-type region 8; poly-silicon layers 3 between the strong field drift layers 6; surface electrodes 7 of the stripes of thin conductive film formed in a manner to cross over the stripes of the strong field drift layer 6 and the poly-silicon layers 3. By selecting a pair of the n-type regions 8 and the surface electrodes 7 and thereby making electron emitted from the crossing points due to combination of the surface electrode 7 to be electrically applied and the n-type region 8 to be electrically applied, electrons can be discharged from desired regions of the surface electrodes 7.

22 Claims, 31 Drawing Sheets

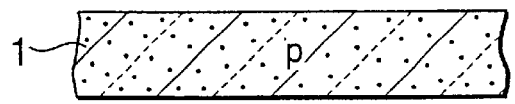
Fig.1A
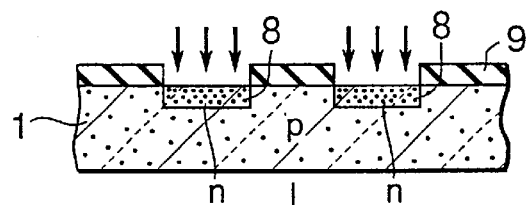
Fig.1B
Fig.1C
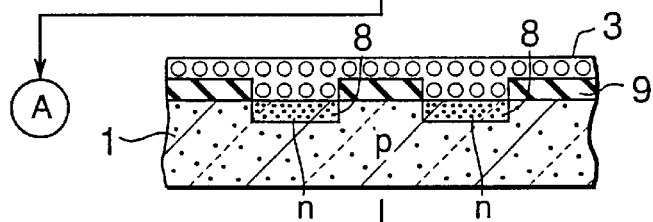
Fig.1D
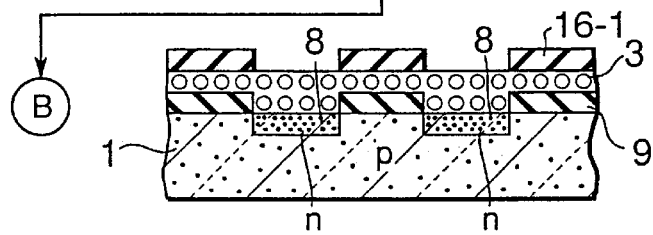
Fig.1E
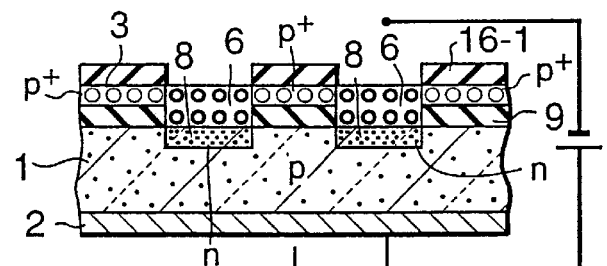
Fig.1F
Fig.1G
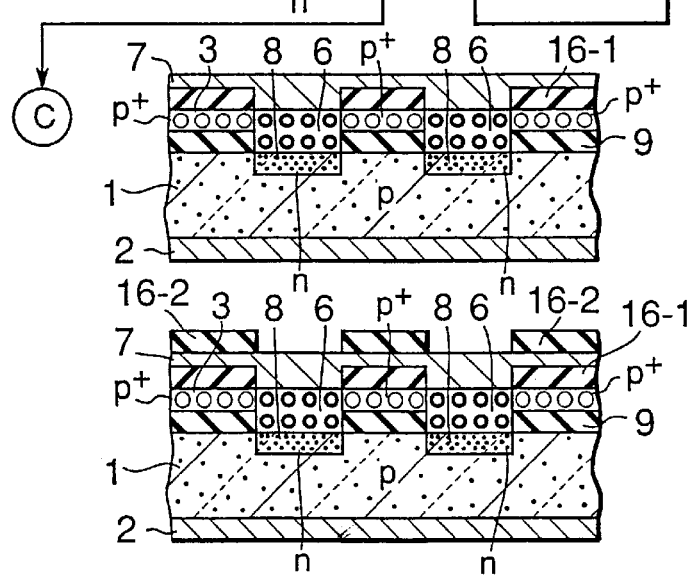

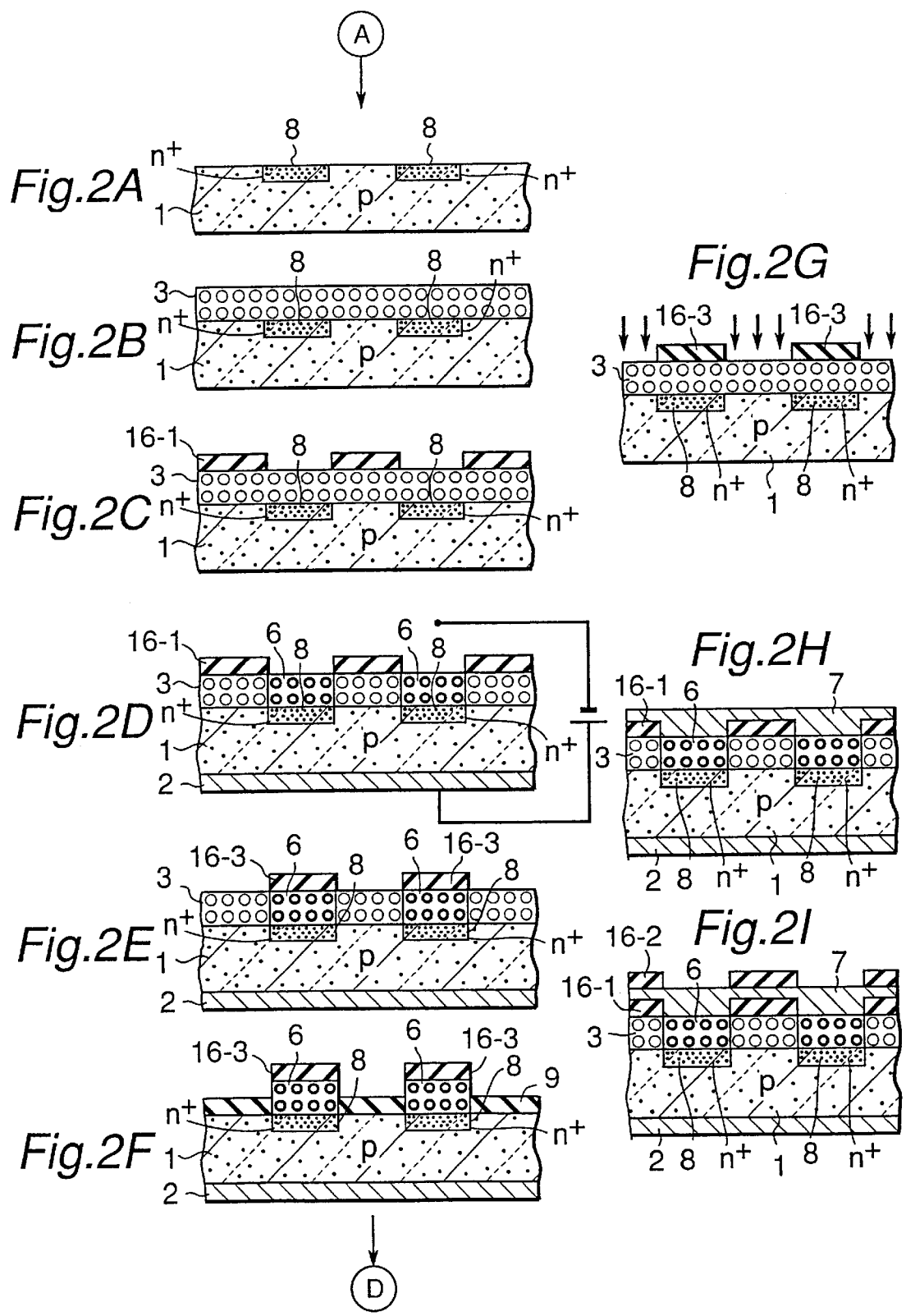

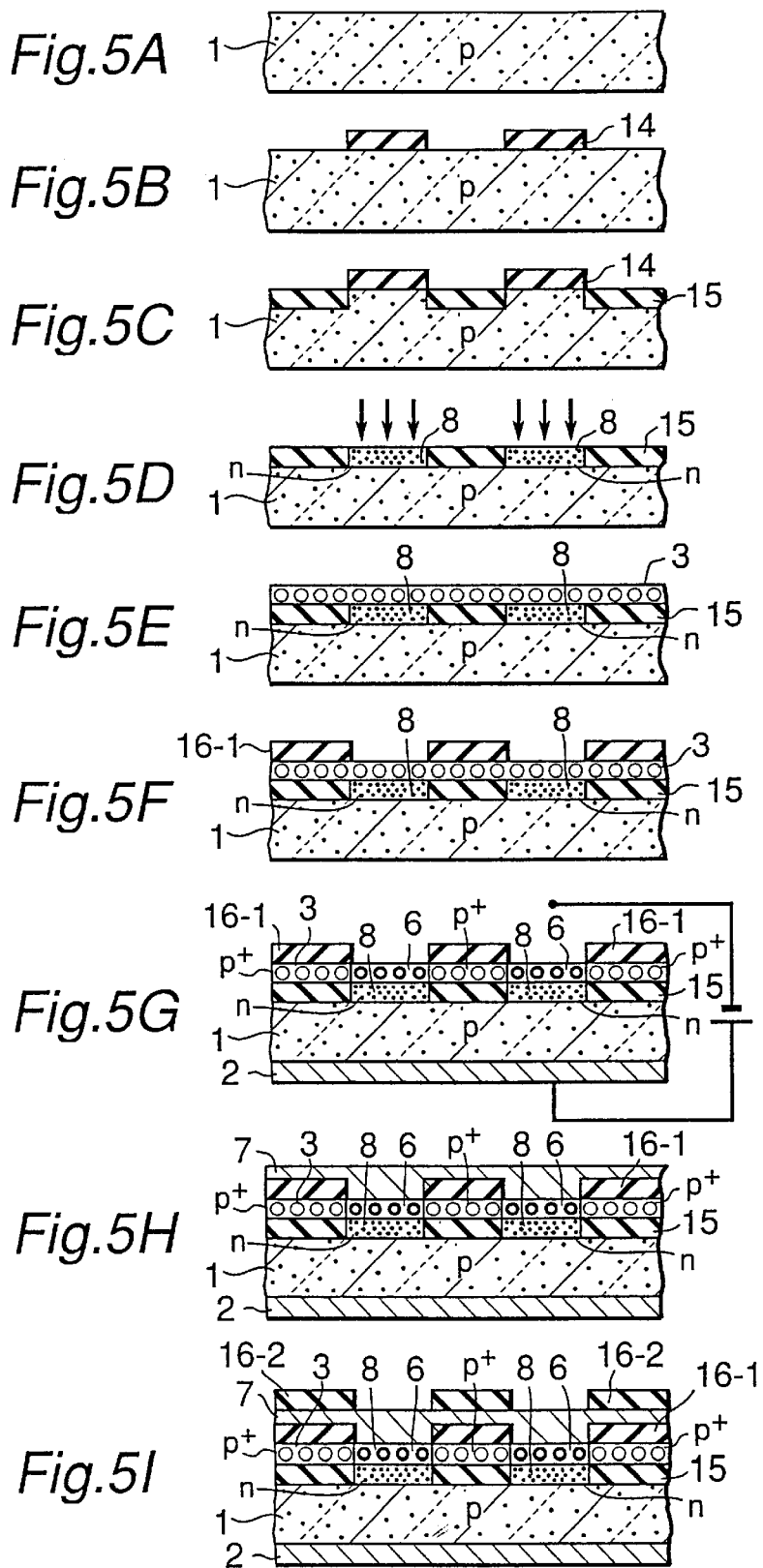

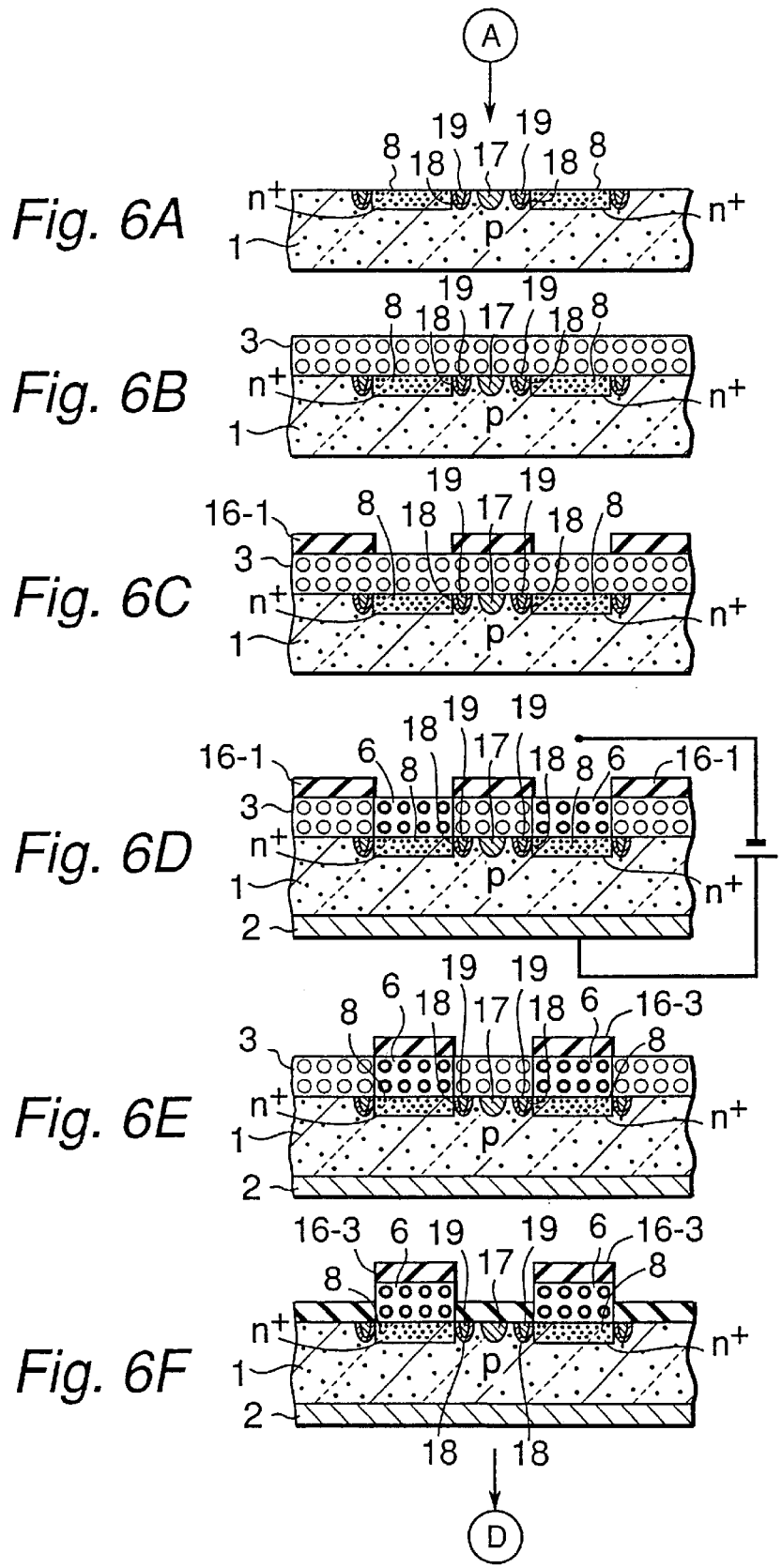

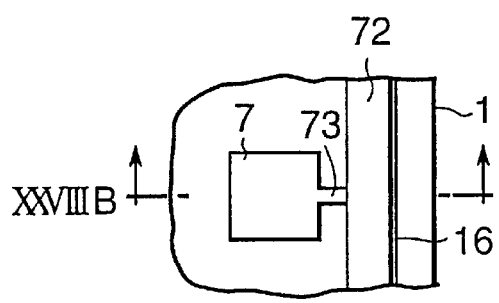
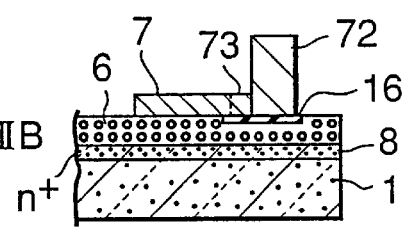
Fig.28A  Fig.28B
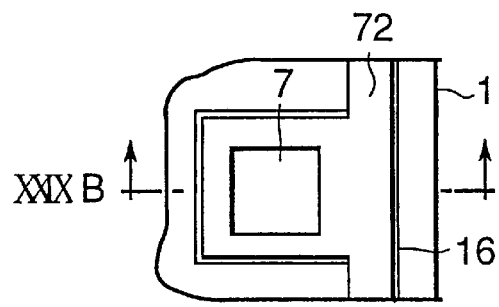
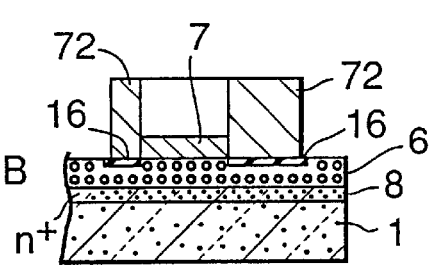
Fig.29A  Fig.29B

FIELD EMISSION ELECTRON SOURCE, METHOD OF PRODUCING THE SAME, AND USE OF THE SAME

BACKGROUND OF THE INVENTION

1. Field of the Invention

The present invention relates to a field emission electron source that emits an electron beam through strong electric field emission using a semiconductor material, and its production and use, and is an improvement of U.S. patent application Ser. No. 09/140,647 (Field emission electron source array, and its production and use), now U.S. Pat. No. 6,249,080, issued Jun. 19, 2001, of which the contents are incorporated in their entirety herein by reference.

2. Description of the Related Art

The present inventors proposed a planar field emission electron source produced by forming a porous polycrystal silicon layer that is processed by thermal oxidation on an electrically conductive substrate, and forming surface electrodes made of thin metal films on the thermally oxidized porous polycrystal silicon layer (Japanese Patent Application No. 65592/1998). The field emission electron source emits electrons through the surface of the surface electrode by applying a direct current voltage across the surface electrode and the conductive substrate, with the surface electrode serving as the positive electrode, and applying a direct current voltage across the surface electrode and a collector electrode that is disposed to oppose the surface electrode, with the surface electrode serving as the negative electrode.

A display apparatus that utilizes the field emission electron source of this type comprises a glass substrate 33 disposed to oppose the surface electrodes 7 of the field emission electron source 10' as shown in FIG. 22, while collector electrodes 31 formed in the form of stripes on a surface of the glass substrate 33 that opposes the field emission electron source 10', and a phosphor layer 32 formed to cover the collector electrode 31 for emitting visible light when irradiated with electron beams emitted by the surface electrodes 7. The field emission electron source 10' has a thermally oxidized porous polycrystal silicon layer 6 formed on an n-type silicon substrate 1' that is an electrically conductive substrate, and surface electrodes 7 formed in stripes on the porous polycrystal silicon layer 6. The n-type silicon substrate 1' has an ohmic electrode 2 formed on the back surface thereof.

In the display apparatus described above, it is necessary to apply a voltage selectively to regions from which it is desired to emit electrons in order to emit electrons from predetermined regions of the planar field emission electron source 10'.

Thus in the display apparatus of this type, the surface electrodes 7 are formed in the configuration of stripes and the collector electrodes 31 are formed in the configuration of stripes that cross the surface electrodes 7 at right angles, so that electrons are emitted only from those of the surface electrode 7 to which a voltage is applied, by selecting some of the collector electrodes 31 and some of the surface electrodes 7 and applying the voltage (strong electric field) therebetween. Of the electrons emitted, only those electrons emitted from the region of the surface electrodes 7 opposing the collector electrode 31 to which the voltage is applied are accelerated, thereby to cause the phosphor covering the collector electrode 31 to emit light. To sum up, in the display apparatus of the configuration shown in FIG. 22, light is emitted from the phosphor layer 32 only at a portion thereof corresponding to that where the electrodes 7, 31 to which the voltage is applied intersect each other, by applying the voltage to the particular surface electrode 7 and the particular collector electrode 31. By switching the surface electrode 7 and the collector electrode 31 to which the voltage is applied, images or characters can be displayed. In the display apparatus described above, however, it is necessary to accelerate the electrons by applying a high voltage to the collector electrode 31 in order to cause the phosphor layer 32 to emit light with the electrons emitted by the field emission electron source 10', and a high voltage of several hundreds to several thousands of volts is usually applied to the collector electrode 31 in the case of the display apparatus using the field emission electron source.

However, it is necessary to switch a high voltage of several hundreds to several thousands of volts applied to the collector electrode 31 in the case of the display apparatus using the field emission electron source 10' of the configuration shown in FIG. 22, thus giving rise to such a problem that a surge voltage generated when switching the high voltage requires it to use a switching element that has a high withstanding voltage that leads to a higher cost. Furthermore, assuming a collector current of 1 mA flowing in the collector electrode 31 and a collector voltage of 1 kV applied, for example, a switching element having a capability of 1 W is required for each of the collector electrodes 31, mere switching elements provided for the number of collector electrodes 31 become very bulky.

Under the above circumstances, the present invention has been made, and a first object thereof is to provide a field emission electron source that is capable of emitting electrons selectively from a desired region of surface electrodes without switching the collector electrodes to which a high voltage is applied, and a method of producing the same.

SUMMARY OF THE INVENTION

In order to achieve the first object described above, the present invention provides a field emission electron source comprising an electrically conductive substrate having a lower electrode which may be formed from a conductive layer located on at least one of principal surfaces; a strong electric field drift layer formed on the conductive layer of the electrically conductive substrate; and surface electrodes consisting of a thin conductive film formed on the strong electric field drift layer, wherein electrons are injected from the electrically conductive substrate into the strong electric field drift layer and are drifted and emitted through the thin conductive film by applying a voltage across the thin conductive film and the conductive layer of the electrically conductive substrate with the thin conductive film serving as a positive electrode, wherein the conductive layer provided on the conductive substrate is formed from a plurality of stripes extending in parallel to each other at predetermined intervals and the thin conductive film is formed from a plurality of stripes extending in parallel to each other at predetermined intervals to oppose and cross the stripes of the conductive layer via the strong electric field drift layer; and wherein the strong electric field drift layer is a porous polycrystal semiconductor layer that is oxidized or nitrized, with the conductive layer and the thin conductive film hold the strong electric field drift layer therebetween at each position where the strips of the conductive layer and the stripes of the thin conductive film that oppose each other intersect, thereby forming a plurality of electron sources arranged at predetermined intervals on the conductive substrate.

By selecting the lower electrode and the surface electrode and applying a voltage to them, electrons can be emitted only from a selected region of the surface electrode to which the lower electrodes cross. Therefore, firstly it is made possible to emit electrons only from a desired region of the surface electrodes. Also secondly it is made possible to eliminate a circuit that switches a high voltage of several hundreds to several thousands of volts applied to the collector electrode in case of a display apparatus having such a configuration as the collector electrodes is disposed to oppose the surface electrode. Thus the present invention has an advantage to reduce the size and cost of the field emission electron source array that is capable of selectively emitting electrons from a desired region of the surface electrode.

The term "conductive substate" herein refers to a substrate having a conductive layer for serving as a negative electrode of the field emission electron source provided on a principal surface thereof and also having a strength to support a polycrystal semiconductor layer that is laminated thereon in vacuum. Usually, the term "conductive substrate" means a substrate having an n-type impurity-doped conductive layer formed in a predetermined region of a p-type semiconductor layer that forms one of the principal surfaces in the case of p-type semiconductor, and also means a substrate having a metal layer formed thereon in the case of an insulating substrate. The metal layer that constitutes the conductive layer or the conductive layer doped with the n-type impurity is formed on the substrate in a configuration of stripes disposed at predetermined intervals. In the case of an insulating substrate, such a configuration may also be employed, as a matter of course, by making a semiconductor layer having conductive layers comprising an impurity diffision layer on the insulating substrate.

In case that a conductive layer is formed on a semiconductor layer, it is preferable that an impurity layer of the opposite polarity (conductivity type) to the conductive layer is formed so that leak current does not flow across the conductive layers. In case that a p-type semiconductor is used as the substrate, usually, the conductive layer is made as an n-type impurity layer and the layer that isolates it is made as a p-type impurity layer. To make a large-sized substrate, it is desirable to use an insulating substrate such as glass and form a conductive layer as a metal film by vapor deposition or the like. The stripes of the conductive layer are each several tens to several thousands of micrometers in width and disposed in parallel to each other at intervals of several hundreds of micrometers. Thickness of the conductive layer is from several hundreds of angstroms to several micrometers in the case of a metal, and several micrometers in the case of a diffusion layer.

On the other hand, while the polycrystal semiconductor layer may be made of a polycrystal material of a IV group element such as Si, Ge or C, compound of IV—IV elements SiC, compound of III–V elements such as GaAs, GaN or InP, compound of II–VI elements ZnSe or other polycrystal semiconductor, polycrystal silicon is preferable since it can be made porous by anodic oxidation (anodization) and an insulation film can be formed easily on the crystal surface by subsequent oxidation or nitrization step, thereby to form a strong electric field drift layer. Detailed description of the strong electric field drift layer is given in the U.S. patent application Ser. No. 09/140,647, Japanese Patent Application Nos. 272342/1998 and 115707/1999 and the content is incorporated herein by reference.

In order to prevent current leakage from occurring between drift layers, a p-type impurity can be doped between the strong electric field drift layers when using a substrate having a p-type semiconductor layer, or preferably an insulating layer is formed on the top thereof thereby to shut off current leakage. Also a portion or a part of the semiconductor may be removed from between the strong electric field drift layers by etching, so that an insulating layer may be formed on the inner surface of the groove thereafter, or the etched space may be filled with an insulating layer.

The strong electric field drift layer can be formed by forming the polycrystal semiconductor layer on the conductive substrate, applying anodic oxidation thereto, thereby to turn the entire polycrystal semiconductor layer or an upper portion thereof located on the conductive layer into a porous structure, and then oxidizing or nitriding the porous portions. It is made easier to make the whole layer porous, when a portion where the strong electric field drift layer is to be formed is masked and the other portions are removed by etching and then subjected to anodization. There are described conditions for forming the strong electric field drift layer on the conductive substrate, conditions for anodization and oxidation or nitrization, in case of the polycrystal semiconductor of polycrystal silicon, in detail in the U.S. patent application Ser. No. 09/140,647.

As described above, in case the portion between neighboring strong electric field drift layers among the polycrystal semiconductor layer that constitute the strong electric field drift layer is removed by etching thereby to expose the principal surface of the semiconductor substrate and the insulation film is formed on the principal surface of at least the exposed semiconductor substrate, insulation between the neighboring strong electric field drift layers can be improved. When a silicon substrate is used for the semiconductor substrate, it is preferable to use an n-type diffusion layer for the conductive layer and an silicon oxide layer for the insulating layer. In a preferred embodiment, stripes of silicon nitride film are formed on the principal surface of a p-type silicon substrate and, after forming a silicon oxide layer by selectively oxidizing the portion of the principal surface of a p-type silicon substrate that is not covered by the silicon nitride film and removing the silicon nitride film, an n-type region is formed between the neighboring silicon oxide layers on the principal surface side in the p-type silicon substrate, a polycrystal semiconductor layer is formed on the n-type region, anodic oxidation process is carried out to make the polycrystal semiconductor layer porous, the porous polycrystal semiconductor layer is oxidized to form the strong electric field drift layer, and surface electrodes comprising thin metal film that cross the n-type region are formed on the strong electric field drift layer.

In the field emission electron source array described above, when the conductive layer (for example, n-type region) and the strong electric field drift layer are formed in the configuration of stripes on the conductive substrate, there is a possibility of leak current flowing between the conductive layers or between the strong electric field drift layers When such a leak current flows, electrons are emitted from the surface electrode located above the conductive layer where no voltage is applied, thus making a cause of cross-talk in a display apparatus, thus giving rise to a possibility of preventing the selective emission of electrons from the desired region of the surface electrodes.

A second object of the present invention is, accordingly, to provide a field emission electron source array that can be reduced in size and produced at a reduced cost, wherein electrons can be emitted selectively from the desired region of the surface electrodes while preventing leak current from flowing.

According to the present invention, in order to achieve the second object described above, first, when the conductive substrate is formed from a semiconductor layer in the field emission electron source array, a high-concentration impurity diffusion layer is provided between the conductive layers (impurity diffusion layers) formed on the principal surface side thereof The high-concentration impurity diffusion layer is provided between the diffusion layers thereby to prevent leak current from flowing between the diffusion layers.

Second, a p-type impurity is doped into the polycrystal semiconductor layer between the strong electric field drift layers thereby to form a p-type region and prevent leak current from flowing between the strong electric field drift layers. In this case, it is practical to interpose an insulating layer in the interface between the surface electrode and the polycrystal semiconductor layer that is doped with the p-type impurity, thereby to prevent leak current from flowing from the conductive substrate via the polycrystal semiconductor layer to the surface electrode.

Third, instead of providing the polycrystal semiconductor layer, that is formed between the strong electric field drift layers, in the p-type region, an isolation groove positioning in the direction of thickness may be provided in a part of the portion between the surface electrodes and/or in a part of the portion between the conductive layers by removing the strong electric field drift layer or the polycrystal semiconductor layer between the strong electric field drift layers by means of etching. The inner surface of the isolation groove may be coated with an isolation layer or the inner space of the isolation groove may be filled with the insulation material to improve the isolation, thereby to prevent leak current from flowing between the strong electric field drift layers. Leak current can also be prevented from flowing from the conductive substrate to the surface electrode or between the surface electrodes.

Fourth, when a back electrode connected to the semiconductor substrate is provided on the back side of the semiconductor substrate, leak current can be prevented from flowing between the conductive layers by controlling the potential of the semiconductor substrate using the back electrode.

Fifth, when an insulating layer is provided between the conductive substrate and the polycrystal semiconductor layer, leak current from the semiconductor substrate and the semiconductor layer through the polycrystal semiconductor layer to the surface electrode or the adjacent strong electric field drift layer can be prevented.

In case the conductive layer is formed as an impurity diffusion layer on the principal surface side in the conductive substrate, it is practical to provide high-concentration impurity layers on both sides of the impurity diffuision region in the direction of width. It is preferable that the impurity diffusion layer is provided as an n-type region on the p-type semiconductor substrate, and therefore an n+ layer having higher concentration of impurity than the n-type region is provided to adjoin therewith. This configuration makes it possible to reduce the total resistance of the n-type portion even when the impurity concentration of the n-type region is decreased, since the n-type region and the n+ layer adjoin with each other. Furthermore, when an n++ layer of a higher impurity concentration is provided in the n+ layer, convergence of strong electric field can be prevented thereby improving the insulation withstanding voltage.

When the surface electrodes are disposed across the strong electric field drift layer, electrons emitted from the strong electric field drift layer via the surface electrodes may be impeded from running straight.

Thus a third object of the present invention is to provide a field emission electron source having improved performance of selectively emitting electrons from a desired region of the surface electrode while maintaining the straightness (rectilinear propagation) of the electron traveling direction.

According to the present invention, in order to prevent cross-talk from occurring between the adjoining strong electric field drift layers, the polycrystal semiconductor layer between the strong electric field drift layers is removed or the degree of insulation between the strong electric field drift layers is increased by doping the p-type impurity in a high concentration. While these methods are effective in maintaining the straightness of the electron traveling direction, in order to further ensure the straightness, first, the surface electrodes disposed across the strong electric field drift layers are formed in such a configuration that the portion thereof located on the polycrystal semiconductor layer has a width smaller than that of the portion located on the strong electric field drift layer, thereby improving the straightness of the electron traveling direction than in the case where width of the surface electrode is constant over the entire length. Second, straightness of the electron traveling direction can be improved also by forming the surface electrode in such a configuration that the portion thereof that does not overlap the strong electric field drift layer has larger thickness than the portion that overlaps the strong electric field drift layer in the direction of thickness, thereby preventing electrons from penetrating therethrough. Third, when the insulation film is provided between the surface electrode and the polycrystal semiconductor layer, straightness of the emitted electrons traveling direction is maintained and cross-talk can be reduced. Moreover, when the insulation film is provided on the portion of the surface electrode that does not overlap the electron drift layer, straightness of the emitted electrons traveling direction can be further ensured.

Also providing the insulating layer causes a step to be generated between the insulating layer and the portion of the polycrystal semiconductor layer located between the strong electric field drift layers. Since it is necessary for the electrons that have drifted through the strong electric field drift layer to pass through the surface electrode, the surface electrodes are formed from thin metal film. As a consequence, the thin metal film formed over the step is likely to break. Therefore, it is practical to form the insulating layer in such a configuration as the thickness at both ends in the direction of width gradually decreases toward the end and decrease the step between the polycrystal semiconductor layer surface and the strong electric field drift layer surface, thereby to prevent breakage of the surface electrode due to the formation of the insulating layer. In case a silicon substrate is used for the semiconductor substrate, the insulating layer can the formed relatively simply by LOCOS method that is employed in the steps of MOS devices and the like, with stable configuration of the insulating layer. It is also made possible to further prevent the sure electrode from breaking and restrain the increase of the electrical resistance by increasing the thickness of the surface electrode made of the thin conductive film formed on regions other than the strong electric field drift layer. Furthermore, since the surface electrode is thin and has a high electrical resistance, Joule heat due to the current flowing therein and Joule heat due to the current flowing in the strong electric field drift layer generate significant heat. Thus it is preferable to provide wiring electrodes for electrical and thermal connection separately from the surface electrode. By making the wiring electrode thicker than the surface electrode, electrical resistance of the surface electrode can be decreased and the operation characteristics can be stabilized. It is preferable to select optimum materials, that are different from each other, for the wiring electrode and the surface electrode. It is also practical to provide an insulating layer below the wiring electrode thereby to prevent ineffective current due to electrons entering directly into the wiring layer.

Preferred embodiments for producing the field emission electron source of the configuration described above will be described below. While the description will make reference to the drawings that show semiconductor substrates being used, an electron source employing an insulating substrate can be formed with the same method except for forming a metal film as a conductive layer on the insulating substrate.

The method of producing the electron source array of the present invention comprises the steps of:

(A) forming a plurality of stripes of conductive layer disposed in parallel to each other at predetermined intervals as lower electrodes on one of the principal surfaces of a conductive substrate;

(B) forming a polycrystal semiconductor layer that covers the conductive layer formed on the principal surface of the conductive substrate;

(C) applying anodic oxidation (anodization) selectively to a part of the polycrystal semiconductor layer to turn it into a porous material by using the conductive layer as one of the electrodes;

(D) oxidizing or nitriding the polycrystal semiconductor layer that has been made porous; and (E) forming a plurality of stripes of thin conductive films disposed in parallel to each other at predetermined intervals to oppose and cross the stripes of the conductive layer on the oxidized or nitrided polycrystal semiconductor layer a part of which has been made porous.

The step of applying anodic oxidation selectively to the part of the polycrystal semiconductor layer formed in the step (B) to make it porous may include a step of forming a masing material layer that opens in predetermined regions for applying anodic oxidation on the polycrystal semiconductor layer.

In case the substrate is a semiconductor, the step (A) of forming a plurality of stripes of conductive layer preferably comprises a step (a-1) of masking the surfaces other than a predetermined region, for the purpose of doping, of the substrate having a p-type semiconductor layer on the principal surface or the p-type semiconductor substrate, and a step (a-2) of doping the predetermined region described above with an n-type impurity thereby to form an n-type impurity diffusion layer.

The step (A) of forming a plurality of stripes of conductive layer may further include a step (a-3) of forming an insulating layer on a p-type conductive substrate whereon the n-type impurity diffusion layer described above has been formed, and making openings of insulating layer in the predetermined regions of the n-type impurity diffusion layer.

The step of applying anodic oxidation selectively to a part of the polycrystal semiconductor layer formed in step (C) to turn it into a porous material is preferably a step of applying anodic oxidation by using the electrode provided on the back surface of the semiconductor substrate as one of anodizing electrodes.

The method according to the present invention may include a step (F) of introducing an impurity, of a conductivity type opposite to that of the diffusion layer that constitutes the conductive layer, to between the porous polycrystal semiconductor layers adjoining each other thereby to form a polycrystal semiconductor layer of a conductivity type opposite to that of the conductive layer, and a step (G) of forming an insulation film on the polycrystal semiconductor layer of the conductivity type opposite to that of the conductive layer.

The step, of etching away a part or whole of the semiconductor layer between the neighboring conductive layers and the semiconductor layer, where the thin conductive film is not to be formed, may be carried out either after or before the anodic oxidation process.

Also before the anodic oxidation process, a step of forming a plurality of stripes of insulating layer disposed in parallel to each other at predetermined intervals to oppose and cross the conductive layer on the polycrystal semiconductor layer may be included, while anodic oxidation to turn the polycrystal semiconductor layer into a porous material is carried out at predetermined intervals along the conductive layer. The step described above may be carried out under the conditions described in the U.S. patent application Ser. No. 09/140,647.

Specific embodiments as described below are proposed.

The first method is shown in FIG. 1A through FIG. 1G

A semiconductor substrate 1 of p-type conductivity is prepared (FIG. 1A) whereon a predetermined mask 9 is formed. An n-type impurity is doped through an opening 8 and a conductive layer 8 that serves as a lower electrode is formed in a configuration of stripes disposed at predetermined intervals (FIG. 1B).

Then a polycrystal semiconductor layer 3 is formed (FIG. 1C). Portions other than that to be porous are covered by a first mask 16-1 FIG. 1D) and, after forming an electrode layer 2 on the back surface of the substrate 1, the substrate is immersed in an electrolysis solution to carry out electrolysis with a constant current by using the electrode layer 2 as an anode thereby to apply anodic oxidation of the predetermined region, resulting in a porous layer indicated by 6 (FIG. 1E). Crystal in the porous region is oxidized or nitrized to turn it into a strong electric field drift layer 6. The drawings show a state of the entire strong electric field drift layer 6 being turned into porous polycrystal semiconductor layer by oxidation or nitrization, but only the upper portion may be turned into porous polycrystal semiconductor layer by oxidation or nitrization depending on the conditions of electrolysis.

A thin metal film 7 that serves as a surface electrode is formed on the polycrystal semiconductor layer 3 that includes the strong electric field drift layer 6 (FIG. 1F), and an insulation film 16-2 to make a second mask is formed on the thin metal film 7 in a region other than the strong electric field drift layer 6, thereby to ensure straightness of the electron traveling direction (FIG. 1G).

The second method comprises steps shown in FIG. 2A through FIG. 4D and FIG. 4G branching out of the step shown in FIG. 1B of the first method.

After doping an n-type impurity to form a conductive layer 8 on the semiconductor substrate 1, a mask 9 is once removed (FIG. 2A) and then the polycrystal semiconductor layer 3 is formed (FIG. 2B). Portions other than that to be made porous are covered by the first mask 16-1 (FIG. 2C) and, after forming the electrode layer 2 on the back surface of the substrate 1, the substrate is immersed in an electrolysis solution to carry out electrolysis using the electrode layer 2 as an anode thereby to apply anodic oxidation to the predetermined region, resulting in a porous layer indicated by 6 (FIG. 2D). Then the crystal in the porous region is oxidized or nitrized to make the strong electric field drift layer 6. The strong electric field drift layer 6 of the polycrystal semiconductor layer 3 is covered by a third mask 16-3 (FIG. 2E), the polycrystal semiconductor layer other than the strong electric field drift layer is removed by etching, the insulating layer 9 is deposited between the etched-away strong electric field drift layers 6 (FIG. 2F), the insulation film 16-3 of the third mask located on the strong electric field drift layers 6 is removed (FIG. 4D) and the thin metal film 7 that serves as the surface electrode is formed thereon (FIG. 4E), thereby forming an electron source.

The third method comprises steps shown in FIG. 3A through FIG. 3F branching out of the step shown in FIG. 1C of the first method.

After doping an n-type impurity to form the conductive layer 8 on the semiconductor substrate 1 (FIG. 1B), the polycrystal semiconductor layer 3 is formed (FIG. 1C). Portions other than that to be made porous are covered by the third mask 16-3 (FIG. 3A) and the polycrystal semiconductor layer other than the strong electric field drift layer is removed by etching (FIG. 3B). Then after removing the insulation film 16-3 of the third mask located on the strong electric field drift layers 6 (FIG. 3C) and forming the electrode layer 2 on the back surface of the substrate 1, the substrate is immersed in an electrolysis solution to carry out electrolysis using the electrode layer 2 as an anode with a constant current thereby to apply anodic oxidation to the predetermined region, resulting in a porous region indicated by 6 (FIG. 3D). Crystal in the porous region is oxidized or nitrized to turn it into the strong electric field drift layer 6. The thin metal film 7 that serves as the surface electrode is formed on the strong electric field drift layer 6 of the polycrystal semiconductor layer 3 (FIG. 3E), and the thin metal film 7 other than the strong electric field drift layer 6 is covered by an insulation film of the second mask 16-2 thereby to secure the straightness of the electron traveling direction (FIG. 3F), thus forming an electron source.

A variation of the third method comprises steps proceeding from FIG. 2G to FIG. 2C, FIG. 2D, FIG. 2H and to FIG. 2I, branching out of the step shown in FIG. 2B of the second method.

After doping an n-type impurity to form the conductive layer 8 on the semiconductor substrate 1, the mask 9 is once removed FIG. 2A) and then the polycrystal semiconductor layer 3 is formed (FIG. 2B). Portions other than that to be made porous are covered by the third mask 16-3 (FIG. 2G), and the portion other than that to be made porous is doped with a p-type impurity, the mask 16-3 is removed and the portion other than that to be made porous are covered by the first mask 16-1 (FIG. 2C). Then after forming the electrode layer 2 on the back surface of the substrate 1, the substrate is immersed in an electrolysis solution to carry out electrolysis using the electrode layer 2 as an anode with a constant current thereby to apply anodic oxidation to the predetermined region, resulting in a porous layer indicated by 6 (FIG. 2D). Crystal in the porous region is further oxidized or nitrized to turn it into the strong electric field drift layer 6.

The thin metal film 7 that serves as the surface electrode is formed on the polycrystal semiconductor layer 3 that includes the strong electric field drift layer 6 (FIG. 2H), and portion of the thin metal film 7 other than the strong electric field drift layer 6 is covered by insulation film of the second mask 16-2 thereby to secure the straightness of the electron traveling direction (FIG. 2I).

The fourth method comprises steps shown in FIG. 4A through FIG. 4E branching out of the step shown in FIG. 1E of the first method.

The first mask 16-1, located on the polycrystal semiconductor layer 3 whereon anodic oxidation was applied in FIG. 1E and the strong electric field drift layer 6 was formed by oxidation or nitrization, is removed (FIG. 4A), the strong electric field drift layer 6 of the polycrystal semiconductor layer 3 is covered by the third mask 16-3 (FIG. 4B), the polycrystal semiconductor layer other than the strong electric field drift layer is removed by etching FIG. 4C), the insulation film of the third mask 16-3 on the strong electric field drift layer 6 is removed (FIG. 4D) and the thin metal film 7 that serves as the surface electrode is formed thereon (FIG. 4E), thereby forming the electron source.

The fifth method comprises the steps shown in FIG. 5A through FIG. 5I.

Preliminary mask 14 is formed in a configuration of stripes on the principal surface side of the p-type silicon substrate 1 (FIG. 5B), and an insulating layer 15 comprising a silicon oxide film is formed by LOCOS method (FIG. 5C). The n-type region 8 is formed in stripes by using the insulating layer 15 as a mask to dope the p-type silicon substrate with the n-type impurity on the principal surface side (FIG. 5D), and the polycrystal semiconductor layer 3 is formed on the n-type region and on the insulating layer (FIG. 5E). The portion other than that to which anodic oxidation is to be applied is covered by the first mask 16-1 (FIG. 5F) and the portion of the polycrystal semiconductor layer 3 located on the n-type region is turned into a porous region by anodic oxidation process using the n-type region 8 as the electrode (FIG. 5G). The polycrystal semiconductor layer which has been made porous is oxidized to form the strong electric field drift layer 6, Then the surface electrodes comprising thin conductive films are formed in a configuration of stripes extending over the strong electric field drift layer and the polycrystal semiconductor layer (FIG. 5H). Last, the thin metal film 7 other than the strong electric field drift layer 6 is covered by the insulation film 16-2 of the second mask thereby to secure the straightness of the electron traveling direction (FIG. 5I).

Since the method described above is capable of forming the n-type region (conductive layer) in the configuration of stripes by introducing the n-type impurity on the principal surface side of the p-type silicon substrate using the insulating layer made of the silicon oxide film formed by the LOCOS method as the mask, the step of separately forming the mask for forming the n-type region becomes unnecessary, and the accuracy of the relative positions of the n-type region and the insulating layer can be improved. Also because the strong electric field drift layer can be formed by turing the portion of the polycrystal semiconductor layer located on the n-type region into a porous region by anodic oxidation process using the n-type region as the electrode and oxidizing or nitriding the polycrystal semiconductor layer that has been made porous, thus positional accuracy of the n-type region and the strong electric field drift layer is improved and, as a result, it is made possible to provide the field emission electron source wherein electrons can be emitted only from a desired region of the surface electrode and adjoining strong electric field drift layers are isolated from each other.

The sixth method comprises steps shown in FIG. 6A through FIG. 6F and continued in FIG. 4D and FIG. 4E, branching out of the step shown in FIG. 1B of the first method.

After doping an n-type impurity to form the conductive layer 8 on the semiconductor substrate 1, the first mask 16-1 is once removed (FIG. 6A), a high-concentration layer 17 is formed by heavily doping p-type impurity between the adjoining conductive layers 8 for the isolation thereof, and double layers 18, 19 are formed by doping an n-type impurity to both ends of the conductive layer so that the impurity concentration becomes higher toward the inside, thereby decreasing the resistance of the conductive layer. Other steps are the same as those shown in FIG. 2, and the polycrystal semiconductor layer 3 is formed (FIG. 6B). Portions other than that to be made porous are covered by the first mask 16-1 (FIG. 6C) and, after forming the electrode layer 2 on the back surface of the substrate 1, the substrate is immersed in an electrolytic solution to carry out electrolysis using the electrode layer 2 as an anode with a constant current, thereby to apply anodic oxidation to the predetermined region, resulting in a porous layer indicated by 6 (FIG. 6D). Crystal in the porous region is oxidized or nitrized to turn it into a strong electric field drift layer 6. The strong electric field drift layer 6 of the polycrystal semiconductor layer 3 is covered by the third mask 16-3 (FIG. 6E), the polycrystal semiconductor layer other than the strong electric field drift layer is removed by etching (FIG. 6F), the insulation film 16-3 of the third mask on the strong electric field drift layer 6 is removed (FIG. 4D) and the thin metal film 7 that serves as the surface electrode is formed thereon (FIG. 4E), thereby forming the electron source.

BRIEF DESCRIPTION OF THE DRAWINGS

FIGS. 1A through 1G are drawings explaining a flow sheet of the first method according to the present invention.

FIGS. 2A through 2I are drawings explaining a flow sheet of the second method and a variation of the third method according to the present invention.

FIGS. 4A through 4F are drawings explaining a flow sheet of the fourth method according to the present invention.

FIGS. 5A through 5I are drawings explaining a flow sheet of the fifth method according to the present invention.

FIGS. 6A through 6F are drawings explaining a flow sheet of the sixth method according to the present invention.

FIGS. 28A, B are partially enlarged plan view and sectional view taken along lines B—B, respectively, of the field emission electron source of the ninth embodiment.

FIGS. 29A, B are partially enlarged plan view and sectional view taken along lines B—B, respectively, showing a variation of the field emission electron source of the ninth embodiment.

DESCRIPTION OF THE PREFERRED EMBODIMENTS

Embodiment 1

Figure 3A:
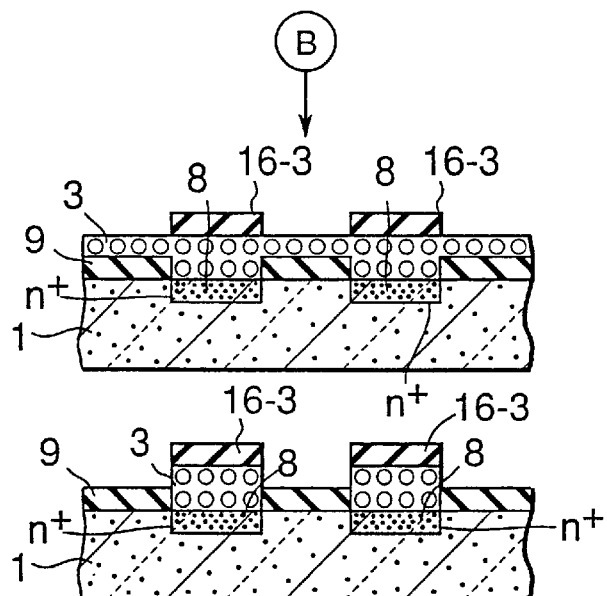
FIGS. 3A through 3F are drawings explaining a flow sheet of the third method according to the present invention.
Figure 3B:
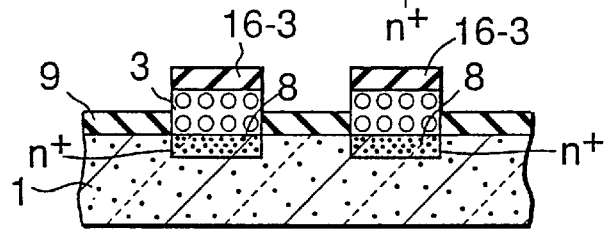
Figure 3C:
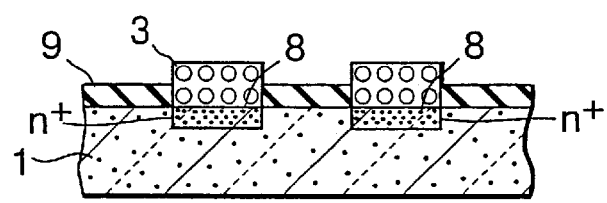
Figure 3D:
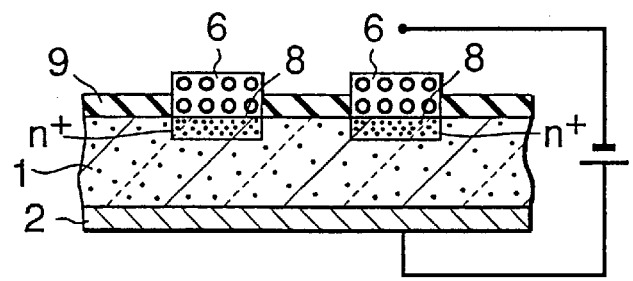
Figure 3E:
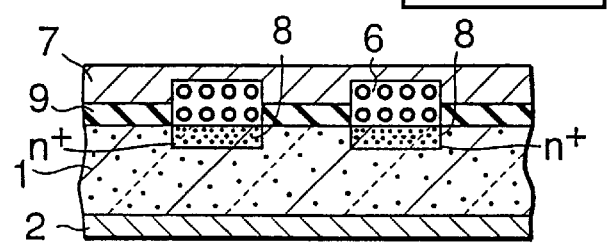
Figure 3F:
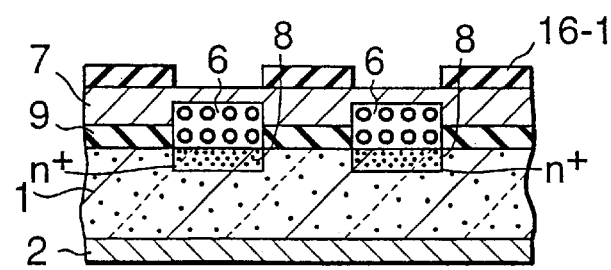
Figure 4A:
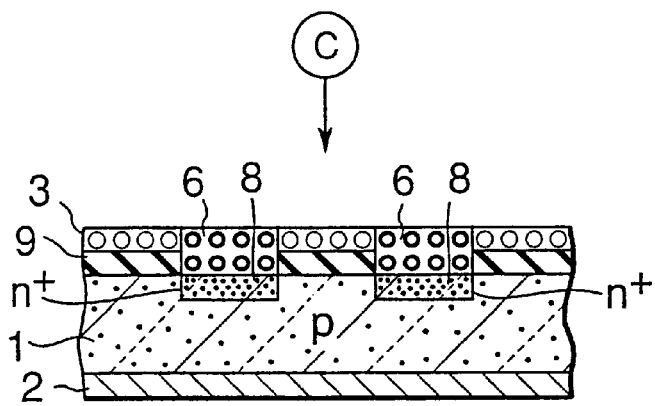
Figure 4B:
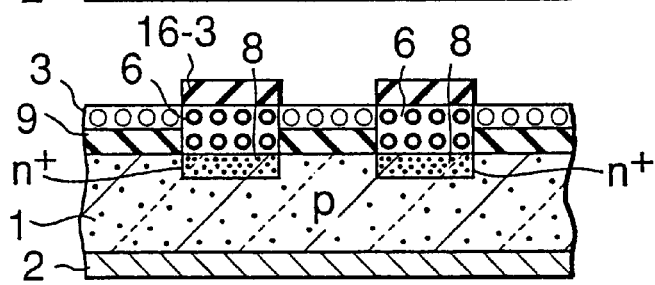
Figure 4C:
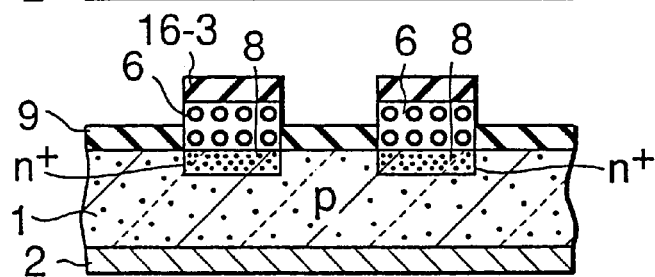
Figure 4D:
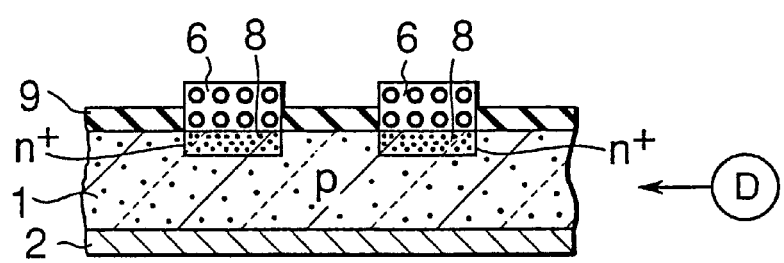
Figure 4E:
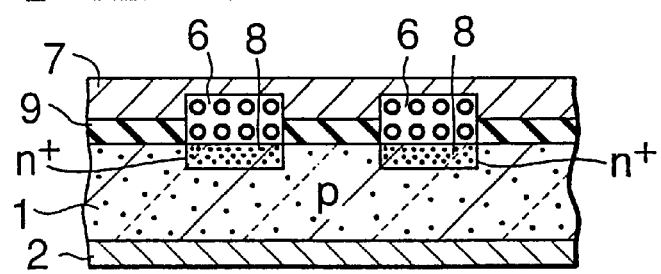
Figure 7:
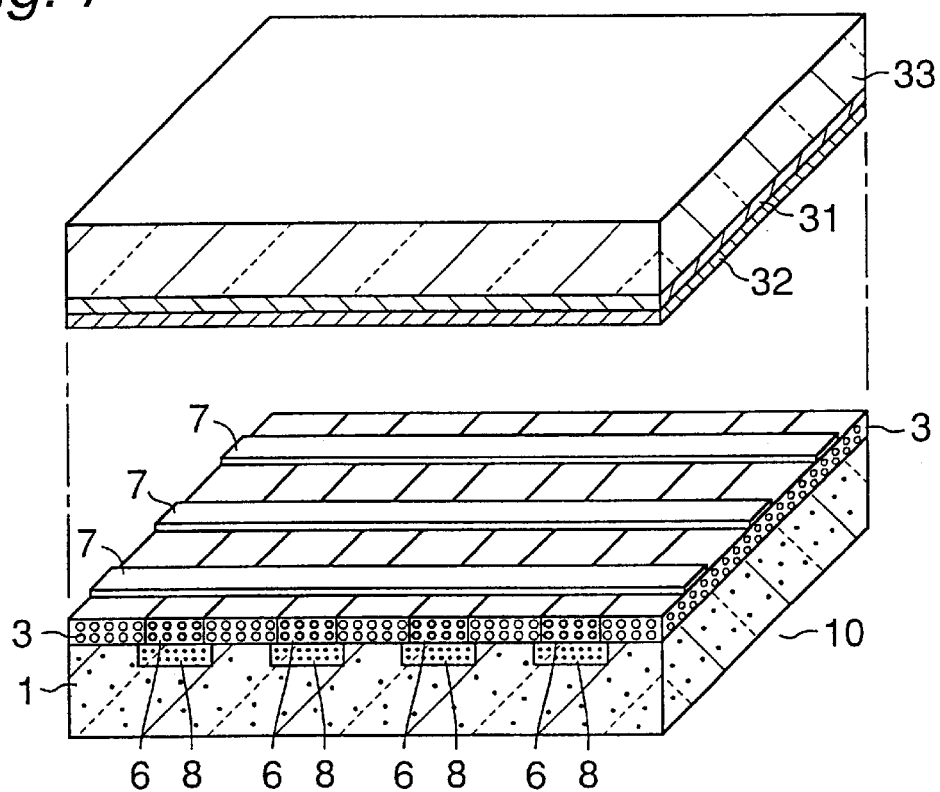
FIG. 7 is a drawing showing the schematic constitution of the first embodiment.

FIG. 7 is a perspective view schematically showing a display apparatus that uses the field emission electron source 10 of this embodiment, wherein a glass substrate 33 is disposed to oppose the field emission electron source 10. A collector electrode 31 is formed on the surface of the glass substrate 33 that opposes the field emission electron source 10, while the collector electrode 31 is coated with a phosphor layer 32 that emits visible light when irradiated with electrons emitted from the field emission electron source 10. The glass substrate 33 is integrated with the field emission electron source 10 by means of a spacer made of glass that is not shown, with the inner space enclosed by the glass substrate 33, the spacer and the field emission electron source 10 being evacuated to a predetermined degree of vacuum.

As shown in FIG. 1 through FIG. 3, the field emission electron source 10 comprises a p-type silicon substrate 1, a polycrystal silicon layer 3 that is a polycrystal semi conductor layer formed on the p-type silicon substrate 1, an n-type region 8 formed in the configuration of stripes on the principal surface side in the p-type silicon substrate 1, a strong electric field drift layer 6 made of oxidized porous polycrystal silicon layer formed in the portion of the polycrystal silicon layer that is located on the n-type region 8, and surface electrodes 7 made of thin metal film formed on the polycrystal silicon layer 3 in a configuration of stripes crossing the n-type region 8 at right angles. While gold is used for the surface electrodes 7 in this embodiment, material for making the surface electrodes 7 is not limited to gold, and may be any metal having a low work function such as aluminum, chromium, tungsten, nickel, platinum or an alloy of some of these metals. Although thickness of the surface electrodes 7 is set to 10 nm, the thickness is not limited to this value. Also carrier concentration of the n-type region 8 is set in a range from $1 \times 10^{18}$ cm$^3$ to $5 \times 10^{19}$ cm$^3$.

Figure 8:
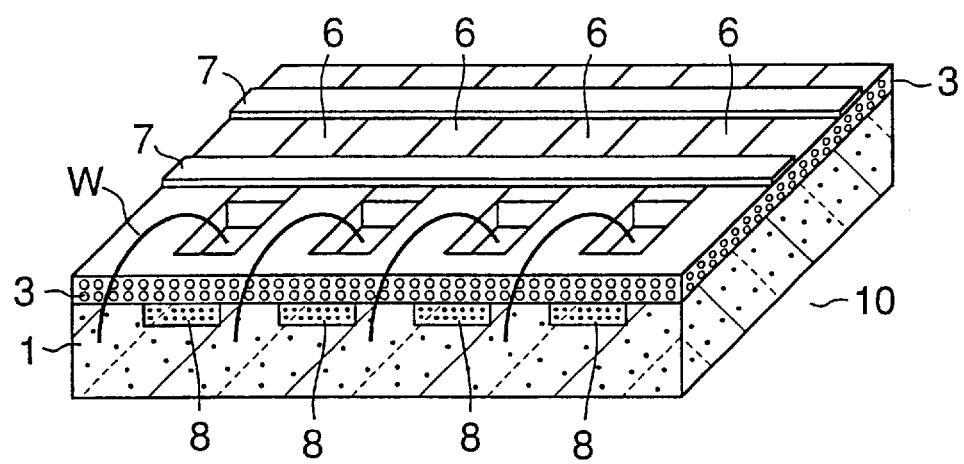
FIG. 8 is a perspective view of a key portion of FIG. 7.
Figure 9:
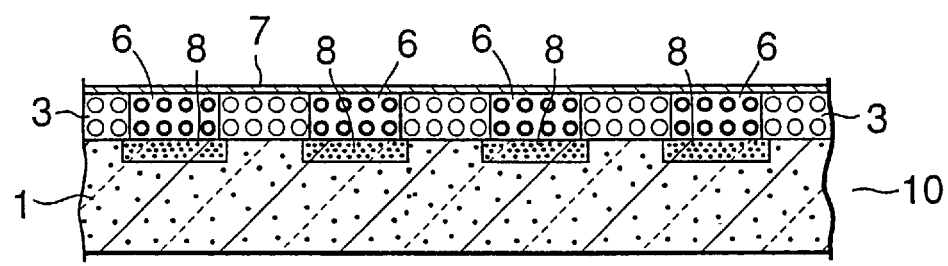
FIG. 9 is a side sectional view of FIG. 7.

In the field emission electron source 10 of this embodiment, a matrix is formed from the n-type region 8 formed in stripes and the surface electrodes 7 formed in stripes that cross the n-type region 8 at right angles. As a consequence, as a voltage is applied selectively across some of the n-type regions 8 and some of the surface electrodes 7, electrons are emitted only from such a region of the surface electrodes 7 to which the voltage is applied that crosses the n-type region 8 to which the voltage is applied, thus making it possible to emit electrons only from a desired region of the surface electrodes 7. Connection to the n-type region 8 is made with a wire W by etching a part of the strong electric field drift layer 6 and exposing a part of the surface of the n-type region 8 as shown in FIG. 8.

Figure 22:
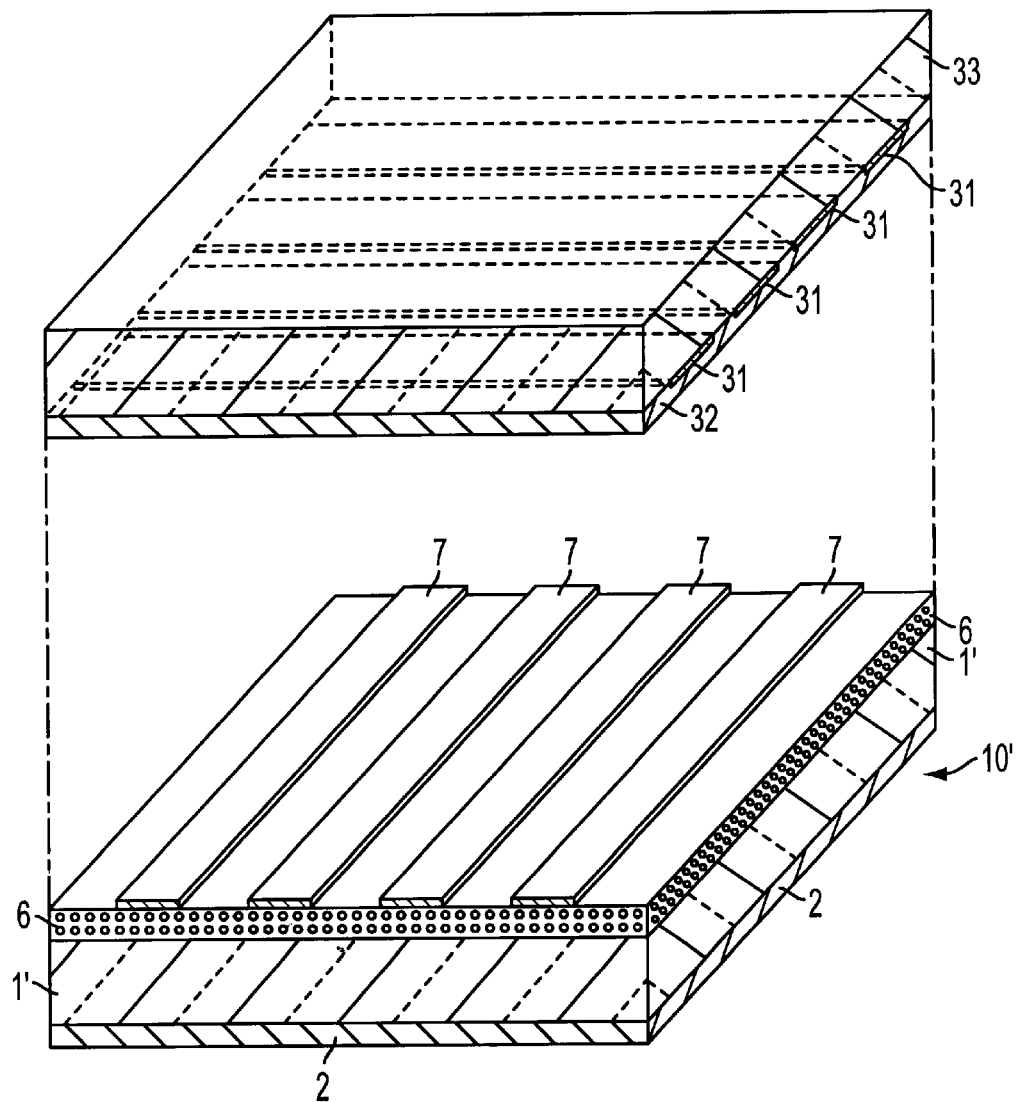
FIG. 22 is a drawing showing the schematic constitution of the display apparatus proposed in the prior art.

When a display apparatus as shown in FIG. 7 is to be made, it is not necessary to form the collector electrode 31 in the form of stripes as in the case of the display apparatus shown in FIG. 22. Thus it is made possible to eliminate a circuit that switches a high voltage of several hundreds to several thousands of volts applied to the collector electrode 31, thereby reducing the size and cost of the apparatus.

In the field emission electron source 10 of this embodiment, the voltage applied across the n-type region 8 and the surface electrodes 7 is in a range from about 10 V to about 30 V The method of producing the field emission electron source 10 of this embodiment will be described below with reference to FIGS. 10A through F.

Figure 10A:
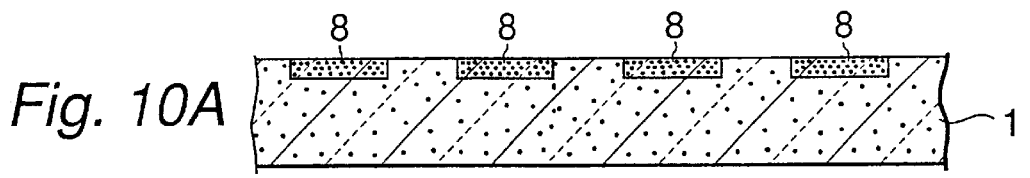
FIGS. 10A through 10F are drawings explaining a major flow sheet of the first embodiment.

First, a mask for thermal diffusion or ion implantation is provided on the principal surface of the p-type silicon substrate 1, and a dopant such as phosphorus (P) is introduced on the principal surface side of the p-type silicon substrate 1 by thermal diffusion technique or ion implantation technique thereby to form the n-type region 8 in the form of stripes. Then when the mask is removed, the structure shown in FIG. 10A is obtained.

Figure 10B:
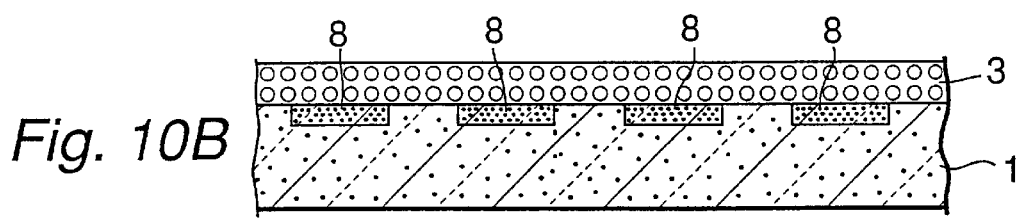

When the undoped polycrystal silicon layer 3 having a thickness of 1.5 µm is formed by LPCVD step on the principal surface of the p-type silicon substrate 1 whereon the n-type region 8 has been formed, the structure shown in FIG. 10B is obtained. Conditions of forming the film by the LPCVD process are set to substrate temperature of 610° C., SiH$_4$ gas flow rate of 600 sccm and pressure of evacuated chamber of 20 Pa. Step for forming the polycrystal silicon layer 3 is not limited to the LPCVD process, and such a process may be employed as an amorphous silicon layer is formed by sputtering or plasma CVD method and then the amorphous silicon layer is crystallized by annealing, thereby forming the polycrystal silicon layer 3.

Figure 10C:
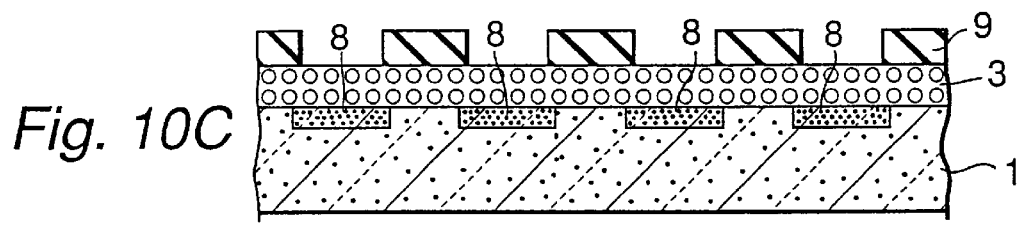
Figure 10D:
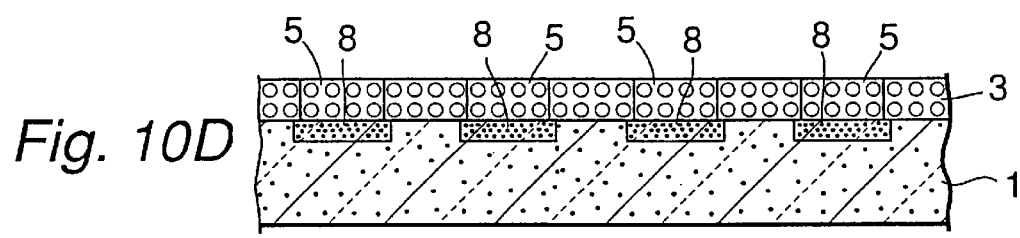

Then a photo-resist is applied to the polycrystal silicon layer 3, and stripe pattern of photo-resist layer 9 is formed by selectively removing part of the layer above the n-type regions 8 by the photolithography technique, thereby to obtain the structure shown in FIG. 10C.

Then an electrolysis solution made by mixing 55 weight % of hydrogen fluoride solution and ethanol in a proportion of 1:1 and cooled to 0° C., a platinum electrode (not shown) as negative electrode, the p-type silicon substrate 1 (an ohmic electrode not shown is formed on the back surface of the p-type silicon substrate) as positive electrode, and the photo-resist layer 9 as the mask for anodic oxidation are used to carry out anodic oxidation process with a constant current while irradiating the exposed portion of the polycrystal silicon layer 3 with light. Thus a porous polycrystal silicon layer 5 is partially formed in stripes, and subsequent removal of the photo-resist layer 9 results in the structure shown in FIG. 10D being formed. In this embodiment, conditions of the anodic oxidation process are set to constant current density of 20 mA/cm$^2$, anodic oxidation time of 15 seconds and irradiation with light emitted by means of a 500 W tungsten lamp during the anodic oxidation process. Although the current density is maintained constant during the anodic oxidation process and the degree of porosity of the porous polycrystal silicon layer 5 is made substantially uniform in this embodiment, the current density may be changed during the anodic oxidation process to form such a structure as polycrystal silicon layers of a high degree of porosity and polycrystal silicon layers of a low degree of porosity are laminated alternately, or such a structure may also be formed as the degree of porosity changes continuously in the direction of thickness. Also the polycrystal silicon layer 3 is made porous in the direction of thickness down to such a depth as reaches the p-type silicon substrate 1 in this embodiment, the polycrystal silicon layer 3 may also be made porous to a mid point in the direction of thickness.

Figure 10E:
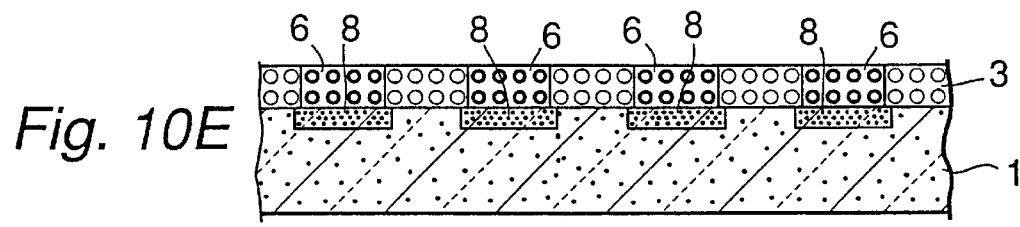

Then the porous polycrystal silicon layer 5 is subjected to rapid thermal oxidation (RTO) in a dry oxygen atmosphere using a lamp annealing apparatus, thereby to form the strong electric field drift layer 6 comprising the thermally oxidized porous polycrystal silicon layer, resulting in the structure shown in FIG. 10E. Conditions of the rapid thermal oxidation step are set to oxidizing temperature of 900° C. and oxidation period of one hour.

Figure 10F:
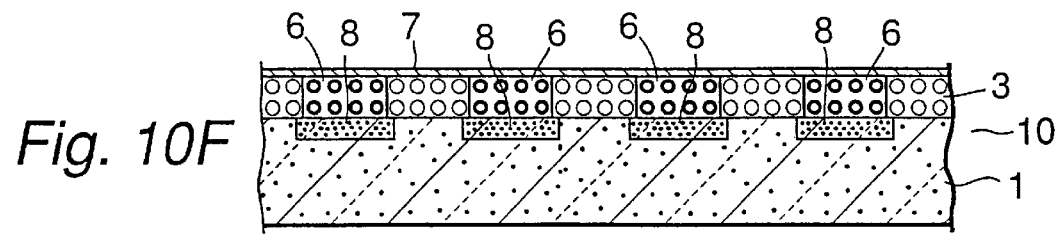

Then a thin metal film (thin gold film) is formed on the polycrystal silicon layer 3 whereon the strong electric field drift layer 6 is formed by vapor deposition using a metal mask having openings formed in the configuration of stripes, thereby forming the surface electrodes 7 formed in stripes made of thin metal film, resulting in the field emission electron source 10 of the structure shown in FIG. 10F being obtained. The pattern of the surface electrodes 7 may be made by a combination of photolithography technique and etching technique, or a combination of photolithography technique and lift-off technique.

Thus the method of producing the field emission electron source of this embodiment can provide the field emission electron source 10 that is capable of emitting electrons only from a desired region of the surface electrodes 7.

While the photo-resist layer 9 is used as the mask in the anodic oxidation process, a silicon oxide film or a silicon nitride film formed in stripes may also be used as the mask and, in case a silicon oxide film or a silicon nitride film is used, the step of removing the mask after the anodic oxidation process becomes unnecessary.

Embodiment 2

Figure 11:
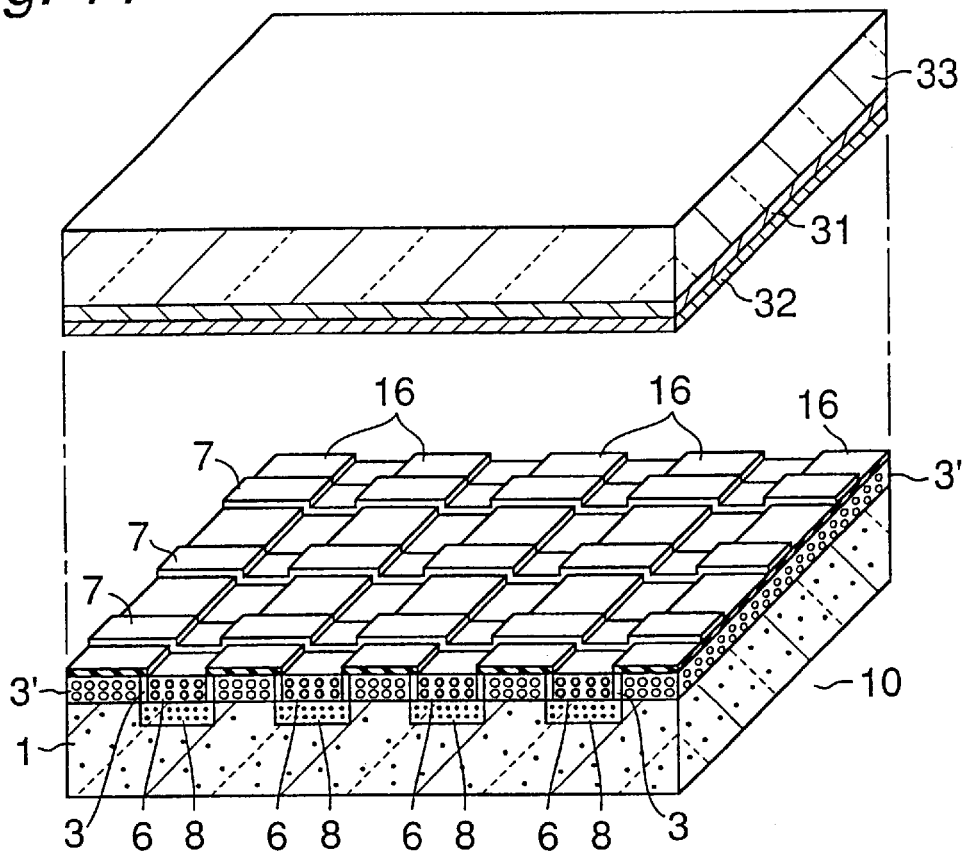
FIG. 11 is a drawing showing the schematic constitution of the second embodiment.

FIG. 11 is a perspective view schematically showing a display apparatus that uses the field emission electron source 10 of this embodiment, wherein the glass substrate 33 is disposed to oppose the field emission electron source 10. The collector electrode 31 is formed on the surface of the glass substrate 33 that opposes the field emission electron source 10, while the collector electrode 31 is coated with a phosphor layer 32 that emits visible light when irradiated with electrons emitted from the field emission electron source 10. Components similar to those of the first embodiment are denoted by identical reference numerals.

In the field emission electron source 10 having the configuration of the first embodiment shown in FIG. 1 through FIG. 3, there is a possibility, though slight it may be, of electrons drifting through the polycrystal silicon layer 3 interposed between the strong electric field drift layers 6. When this occurs, since the electrons are emitted from the surface electrodes 7 located above the -type region 8 to which the voltage is not applied, the display apparatus may suffer from cross-talk.

Figure 12:
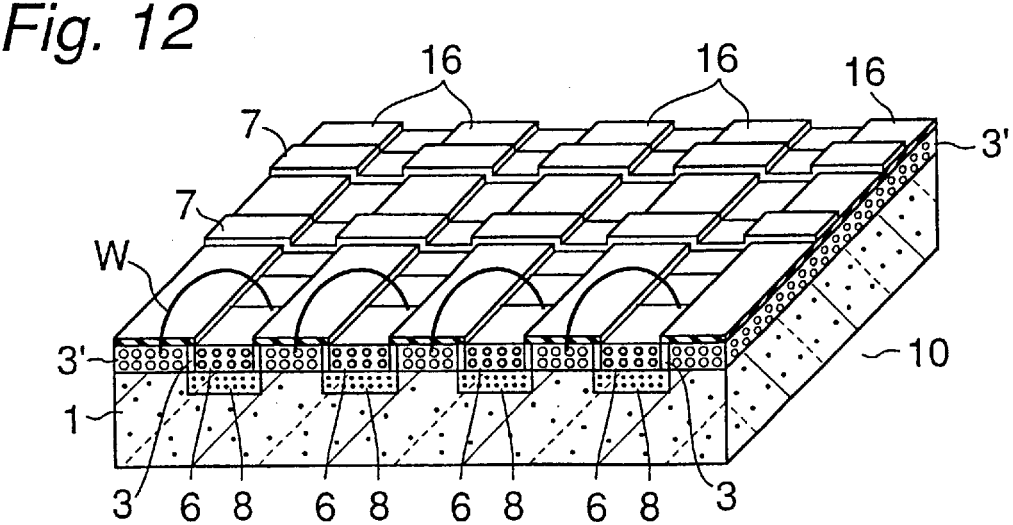
FIG. 12 is a perspective view of a key portion of FIG. 11.
Figure 13:
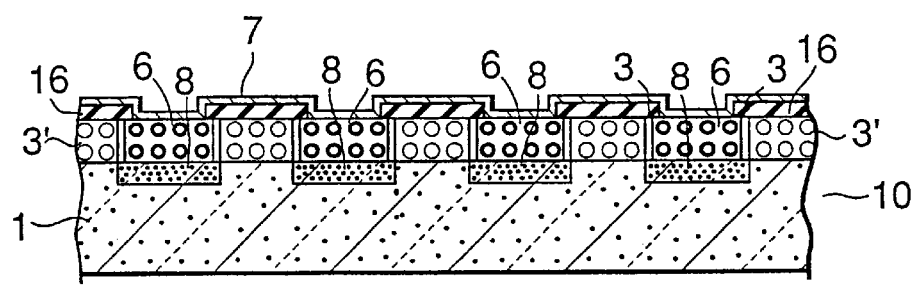
FIG. 13 is a side sectional view of FIG. 11.

The field emission electron source 10 of this embodiment has a feature for preventing such a trouble. As shown in FIG. 11 through FIG. 13, the field emission electron source 10 of this embodiment comprises the p-type silicon substrate 1, the n-type region 8 formed in the configuration of stripes on the principal surface side in the p-type silicon substrate 1, the strong electric field drift layer 6 made of oxidized porous polycrystal silicon layer formed on the n-type region 8, the polycrystal silicon layer 3 formed on the side wall of the strong electric field drift layer 6 and a p-type polycrystal silicon layer 3' formed between the polycrystal silicon layers 3. The strong electric field drift layer 6, the polycrystal silicon layer 3 and the p-type polycrystal silicon layer 3' constitute the polycrystal semiconductor layer, while the polycrystal semiconductor layer has the surface electrodes 7 made of thin metal film formed on the polycrystal silicon layer in a configuration of stripes crossing the n-type region 8 at right angles. While the polycrystal silicon layer 3 is formed on the side wall of the strong electric field drift layer, the polycrystal silicon layer 3 may not necessarily be provided and, instead, the polycrystal semiconductor layer may also be constituted only from the strong electric field drift layer 6 and the p-type polycrystal silicon layer 3'.

Thus according to this embodiment, since the p-type polycrystal silicon layer 3' is formed between the strong electric field drift layers 6, electrons can be prevented from being injected from the n-type region 8 into the p-type polycrystat silicon layer 3' by applying a reverse bias voltage between the p-type polycrystal silicon layer 3' and the n-type region 8, thus making it possible to electrically isolate the adjoining strong electric field drift layers 6 from each other. As a result, since leak current can be prevented from flowing into the strong electric field drift layer 6 located on the n-type region 8 that is adjacent to the n-type region to which the voltage is applied, it is made possible to reliably flow current through only the intersect of the n-type region 8 and the surface electrode 7 when a voltage is applied between the n-type region 8 and the surface electrode 7.

In the field emission electron source 10 of this embodiment, too, since a matrix is formed from the n-type region 8 formed in stripes and the surface electrodes 7 formed in stripes crossing the n-type region 8 at right angles, as a voltage is applied selectively across some of the n-type regions 8 and some of the surface electrodes 7, electrons are emitted only from such a region of the surface electrodes 7 to which the voltage is applied that crosses the n-type region 8 to which the voltage is applied, thus making it possible to emit electrons only from a desired region of the surface electrodes 7. Connection to the n-type region 8 is made with a wire W by etching a part of the strong electric field drift layer 6 and exposing a part of the surface of the n-type region 8 as shown in FIG. 12.

Moreover, when a display apparatus as shown in FIG. 11 is to be made, it is not necessary to form the collector electrode 31 in the form of stripes as in the case of the display apparatus shown in FIG. 22. Thus it is made possible to eliminate a circuit that switches a high voltage of several hundreds to several thousands of volts applied to the collector electrode 31, thereby reducing the size and cost of the apparatus.

The method of producing the field emission electron source 10 of this embodiment will be described below with reference to FIGS. 14A through D.

First, a dopant such as phosphorus (P) is introduced on the principal surface side in the p-type silicon substrate 1 by thermal diffusion technique or ion implantation technique, thereby to form the n-type region 8 in stripes, similarly to the first embodiment. Then the undoped polycrystal silicon layer 3 having a thickness of 1.5 μm is formed by LPCVD step on the principal surface of the p-type silicon substrate 1 whereon the n-type region 8 has been formed, followed by anodic oxidation of the portion located above the n-type region 8 to make it porous and rapid thermal oxidation to form the strong electric field drift layer 6 made of thermally oxidized porous polycrystal silicon, resulting in the structure shown in FIG. 8A to be obtained Photo-resist is applied and such a pattern is made as the resist layer 12 remains on the strong electric field drift layer 6, so that the structure shown in FIG. 8B is obtained. Thus the resist layer 12 is formed in the configuration of stripes.

Then ions such as boron B are injected into the polycrystal silicon layer 3 between the strong electric field drift layers 6 by ion implantation technique using the resist layer 12 as the mask, thereby to form the p-type polycrystal silicon layer 3', followed by the removal of the resist layer 12, resulting in the structure shown in FIG. 8C. As the side wall layer comprising the polycrystal silicon layer 3 remains on the side wall of the strong electric field drift layer 6, the strong electric field drift layer 6, the polycrystal silicon layer 3 and the p-type polycrystal silicon layer 3' constitute the polycrystal semiconductor layer. In case the resist layer 12 is formed so that the side wall layer comprising the polycrystal silicon layer 3 does not remain during the ion implantation step using the resist layer 12 as the mask, the polycrystal semiconductor layer can be formed from the strong electric field drift layer 6 and the p-type polycrystal silicon layer 3'. Then after forming an insulating layer 16 made of silicon oxide having a thickness of 0.5 μm on the polycrystal semiconductor layer by PCVD process, a part of the insulating layer 16 located on the strong electric field drift layer 6 is removed by etching.

Figure 14A:
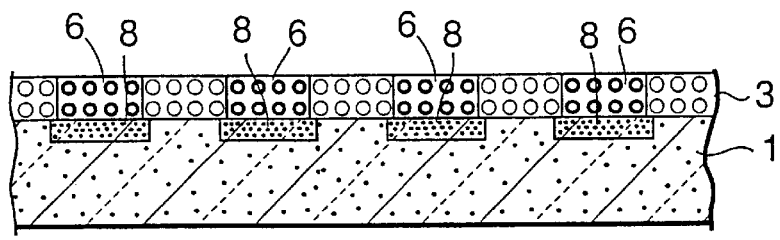
FIGS. 14A through 14D are drawings explaining a major flow sheet of the second embodiment.
Figure 14B:
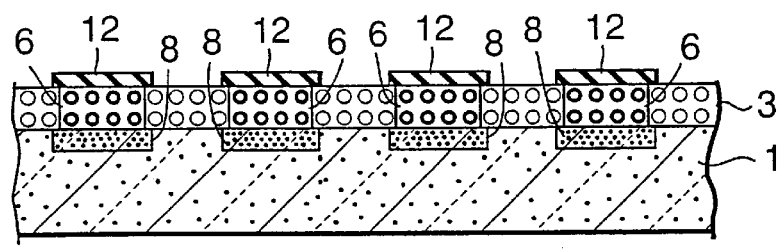
Figure 14C:
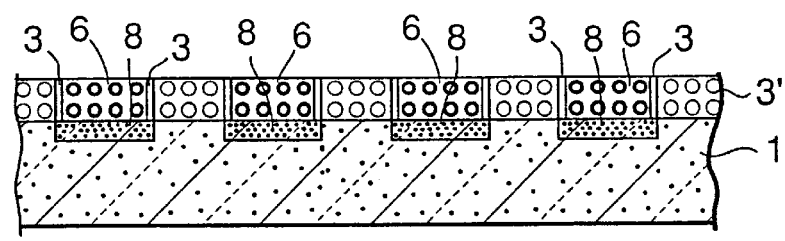
Figure 14D:
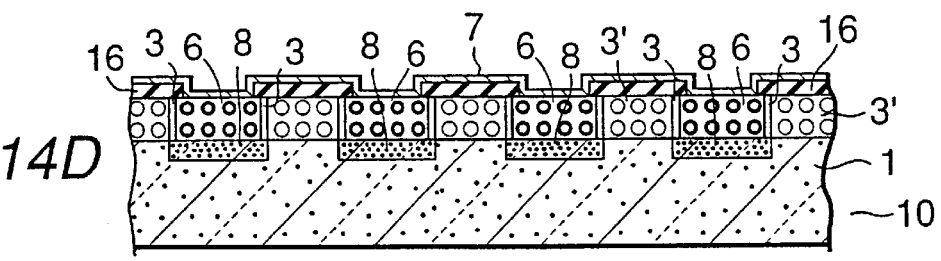

Then a thin metal film is formed by vapor deposition on the polycrystal semiconductor layer using a metal mask having openings formed therein in the configuration of stripes, thereby forming the surface electrodes 7 formed in stripes made of the thin metal film, resulting in the field emission electron source 10 of the structure shown in FIG. 14D. The pattern of the surface electrodes 7 may be made by a combination of photolithography technique and etching technique, or a combination of photolithography technique and liftoff technique.

Embodiment 3

Figure 15:
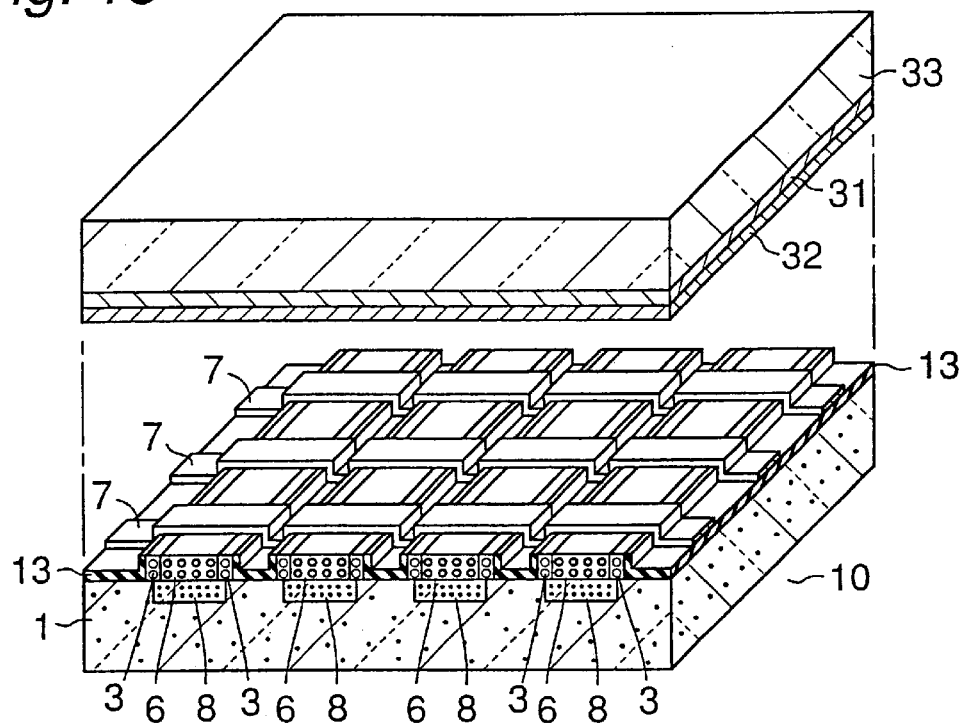
FIG. 15 is a drawing showing the schematic constitution of the third embodiment.

FIG. 15 is a perspective view schematically showing a display apparatus that uses the field emission electron source 10 of this embodiment, wherein the glass substrate 33 is disposed to oppose the field emission electron source 10. The collector electrode 31 is formed on the surface of the glass substrate 33 that faces the field emission electron source 10, while the collector electrode 31 is coated with the phosphor layer 32 that emits visible light when irradiated with electrons emitted from the field emission electron source 10. Components similar to those of the first embodiment are denoted by identical reference numerals.

In the field emission electron source 10 having the configuration of the first embodiment shown in FIG. 7 through FIG. 10, there is a possibility, though slight it may be, of electrons drifting through the polycrystal silicon layer 3 interposed between the strong electric field drift layers 6. When this occurs, since the electrons are emitted from the surface electrodes 7 located above the n-type region 8 to which the voltage is not applied, the display apparatus may suffer from cross-talk.

Figure 16:
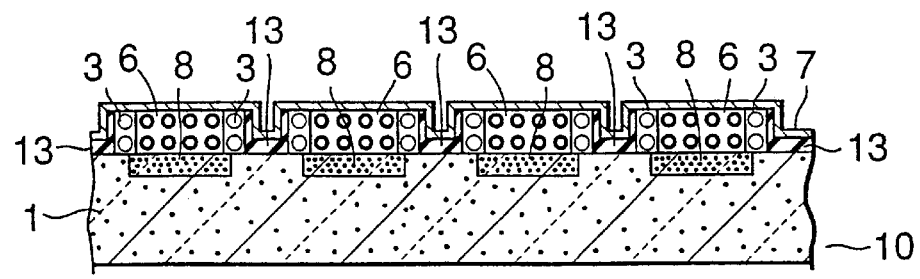
FIG. 16 is a side sectional view of FIG. 15.

The field emission electron source 10 of this embodiment has a feature for preventing such a trouble. As shown in FIG. 15 and FIG. 16, the field emission electron source 10 of this embodiment comprises the p-type silicon substrate 1, the n-type region 8 formed in the configuration of stripes on the principal surface side in the p-type silicon substrate 1, the strong electric field drift layer 6 made of oxidized porous polycrystal silicon layer formed on the n-type region 8, an insulation film 13 made of silicon oxide film formed on the p-type silicon substrate 1 between the adjoining strong electric field drift layers 6, and the surface electrodes 7 made of thin metal film formed on the strong electric field drift layer 6 in a configuration of stripes crossing the n-type region 8. The surface electrodes 7 are formed also on the insulation film 13.

According to this embodiment, since the insulation film 13 is formed between the strong electric field drift layers 6 so that the adjoining strong electric field drift layers 6 are electrically isolated from each other by the insulation film 13 interposed therebetween, current can be prevented from flowing between the adjoining strong electric field drift layers 6.

In the field emission electron source 10 of this embodiment, too, since a matrix is formed from the n-type region 8 formed in stripes and the surface electrodes 7 formed in stripes crossing the n-type region 8 at right angles, as a voltage is applied selectively across some of the n-type regions 8 and some of the surface electrodes 7, electrons are emitted only from such a region of the surface electrodes 7 to which the voltage is applied that crosses the n-type region 8 to which the voltage is applied, thus making it possible to emit electrons only from a desired region of the surface electrodes 7.

Moreover, when a display apparatus as shown in FIG. 15 is to be made, it is not necessary to form the collector electrode 31 in the form of stripes as in the case of the display apparatus shown in FIG. 22. Thus it is made possible to eliminate a circuit that switches a high voltage of several hundreds to several thousands of volts applied to the collector electrode 31, thereby reducing the size and cost of the apparatus.

The method of producing the field emission electron source 10 of this embodiment will be described below with reference to FIGS. 17A through F.

First, a dopant such as phosphorus (P) is introduced on the principal surface side in the p-type silicon substrate by thermal diffusion technique or ion implantation technique thereby to form the n-type region 8 in stripes, similarly to the first embodiment. Next the undoped polycrystal silicon layer 3 having a thickness of 1.5 $\mu$m is formed by LPCVD process on the principal surface of the p-type silicon substrate 1 whereon the n-type region 8 has been formed, followed by anodic oxidation of the portion located above the n-type region 8 to make it porous and rapid thermal oxidation step to form the strong electric field drift layer 6 made of thermally oxidized porous polycrystal silicon layer, thus result in the structure shown in FIG. 17A to be obtained.

Figures 17A, 17B, 17C, 17D, 17E, 17F:
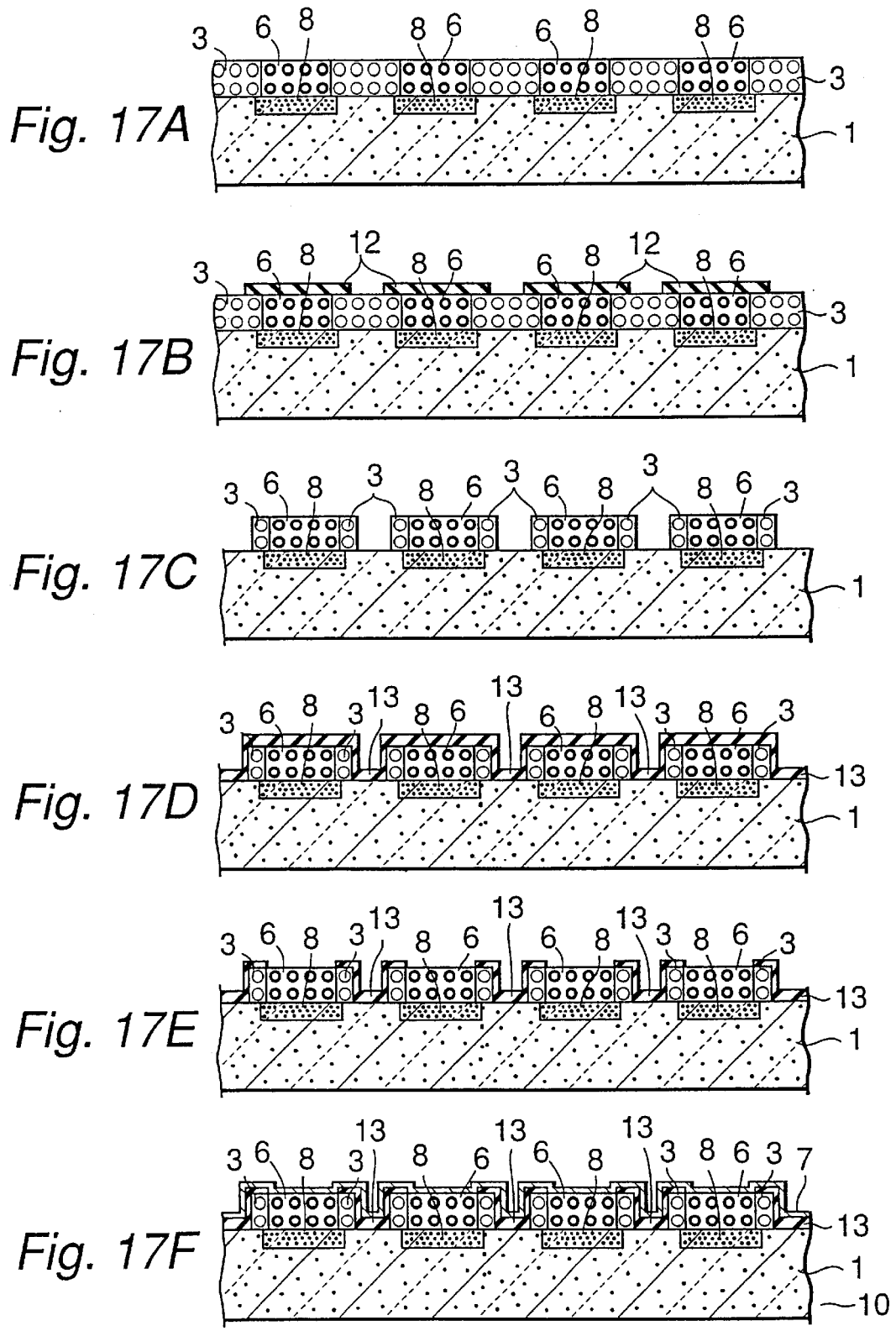
FIGS. 17A through 17F are drawings explaining a major flow sheet of the third embodiment.

Then photo-resist is applied and such a pattern is made as the resist layer 12 remains on the strong electric field drift layer 6, so that the structure shown in FIG. 17B is obtained. Thus the resist layer 12 is formed in the configuration of stripes.

Then the polycrystal silicon layer 3 located between the strong electric field drift layers 6 is removed by reactive ion etching technique using the resist layer 12 as the mask. In this embodiment, since the resist layer 12 is wider than the strong electric field drift layer 6, a part of the polycrystal silicon layer 3 remains on the side wall of the strong electric field drift layer 6. Conditions of etching by the reactive ion etching technique are set to $O_2$ gas flow rate of 4 sccm, $CHF_3$ gas flow rate of 16 sccm, pressure of evacuated chamber of 8.3 Pa and arc discharge power of 100 W (power density of 0.3 W/cm$^2$. The structure shown in FIG. 17C is obtained by removing the resist layer 12. Step for etching the polycrystal silicon layer 3 is not limited to the reactive ion etching technique, and ion etching technique using argon gas, for example, may be employed.

When the insulation film 13 made of silicon oxide film is formed by plasma CVD process or the like to cover the entire principal surface of the p-type silicon substrate 1, the structure shown in FIG. 17D is obtained. Conditions of forming the silicon oxide film are set to substrate temperature of 225° C., $SiH_4$ gas flow rate of 50 sccm, $N_2O$ gas flow rate of 875 sccm, pressure of evacuated chamber of 133 Pa and arc discharge power of 150 W (power density of 0.05 W/cm$^2$).

The structure shown in FIG. 17E is obtained by removing the insulating layer 13 located on the strong electric field drift layer 6.

Then the surface electrodes 7 made of thin metal film (thin gold film) are formed in stripes on the principal surface of the p-type silicon substrate 1, so that the field emission electron source 10 of the structure shown in FIG. 17F is obtained.

Embodiment 4

Figure 18:
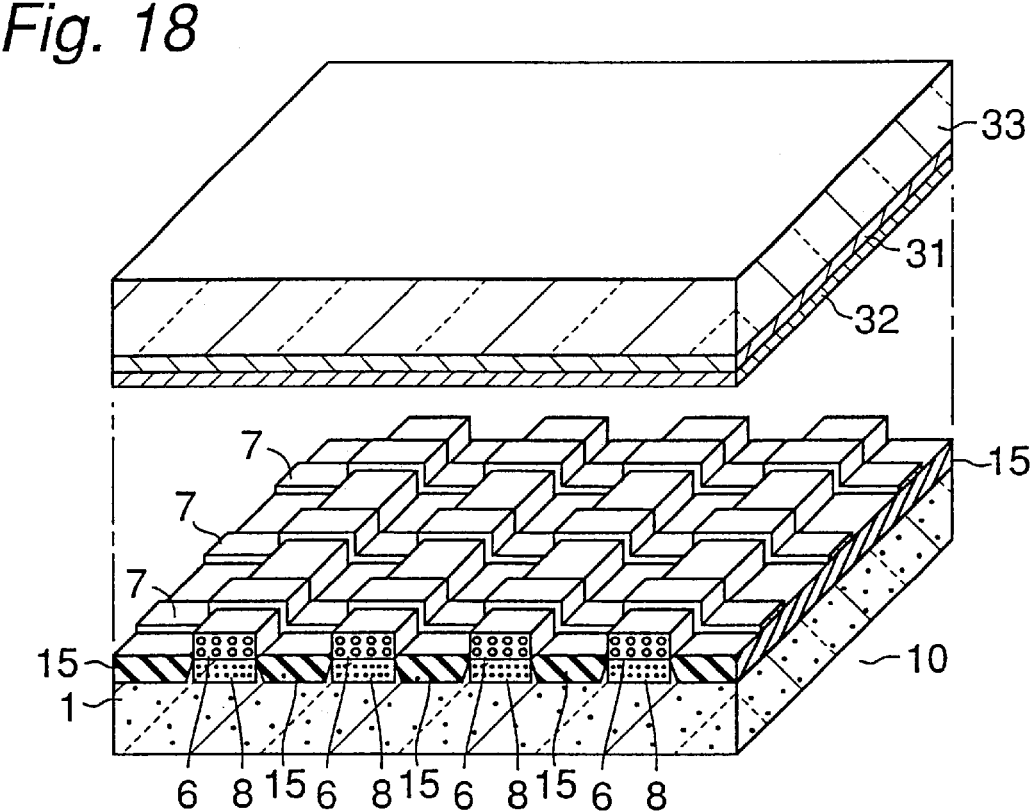
FIG. 18 is a drawing showing the schematic constitution of the fourth embodiment.

FIG. 18 is a perspective view schematically showing a display apparatus that uses the field emission electron source 10 of this embodiment, wherein the glass substrate 33 is disposed to oppose the field emission electron source 10. The collector electrode 31 is formed on the surface of the glass substrate 33 that opposes the field emission electron source 10, while the collector electrode 31 is coated with the phosphor layer 32 that emits visible light when irradiated with electrons emitted from the field emission electron source 10. Components similar to those of the first embodiment are denoted by identical reference numerals.

In the field emission electron source 10 having the configuration of the first embodiment shown in FIG. 1 through FIG. 3, there is a possibility, though slight it may be, of electrons drifting through the polycrystal silicon layer 3 interposed between the strong electric field drift layers 6. When this occurs, since the electrons are emitted from the surface electrodes 7 located above the n-type region 8 to which the voltage is not applied, the display apparatus may suffer from cross-talk.

Figure 19:
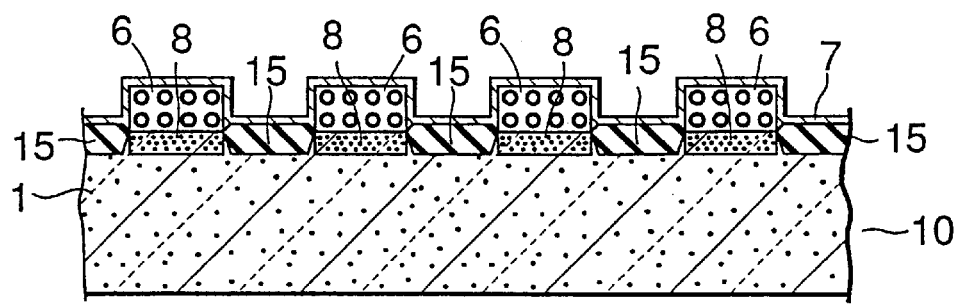
FIG. 19 is a side sectional view of FIG. 18.

The field emission electron source 10 of this embodiment has a feature for preventing such a trouble. As shown in FIG. 18 and FIG. 19, the field emission electron source 10 of this embodiment comprises the p-type silicon substrate 1, the n-type region 8 formed in the configuration of stripes on the principal surface side in the p-type silicon substrate 1, the strong electric field drift layer 6 made of oxidized porous polycrystal semiconductor formed on the n-type region 8, a silicon oxide layer 15 formed between the adjoining n-type regions 8, and the surface electrodes 7 made of thin metal film formed on the strong electric field drift layer 6 in a configuration of stripes crossing the n-type region 8 at right angles.

According to this embodiment, since the silicon oxide layer 15 is formed between the strong electric field drift layers 6, current can be prevented from flowing between the adjoining strong electric field drift layers 6.

In the field emission electron source 10 of this embodiment, too, since a matrix is formed from the n-type region 8 formed in stripes and the surface electrodes 7 formed in stripes crossing the n-type region 8 at right angles, as a voltage is applied selectively across some of the n-type region 8 and some of the surface electrodes 7, electrons are emitted only from such a region of the surface electrodes 7 to which the voltage is applied that crosses the n-type region 8 to which the voltage is applied, thus making it possible to emit electrons only from a desired region of the surface electrodes 7.

Moreover, when a display apparatus as shown in FIG. 18 is to be made, it is not necessary to form the collector electrode 31 in the form of stripes as in the case of the display apparatus shown in FIG. 22. Thus it is made possible to eliminate a circuit that switches a high voltage of several hundreds to several thousands of volts applied to the collector electrode 31, thus reducing the size and cost of the apparatus.

The method of producing the field emission electron source 10 of this embodiment will be described below with reference to FIG. 20 and FIG. 21.

Figure 20A:
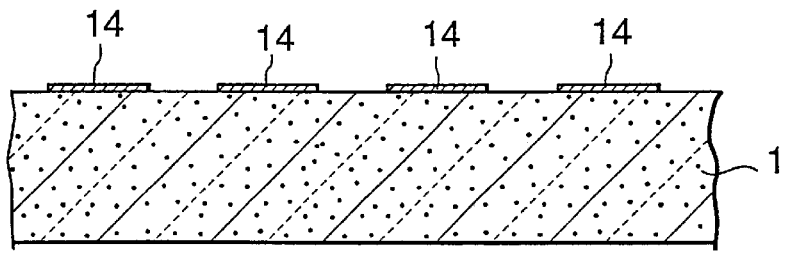
FIGS. 20A through 20E are drawings explaining a major flow sheet of the fourth embodiment.

First, after a silicon nitride film 14 is formed on the principal surface of the p-type silicon substrate 1 by plasma CVD technique, a pattern of stripes of the silicon nitride film 14 is made by photolithography technique and etching technique, thereby to obtain the structure shown in FIG. 20A. Conditions of forming the silicon nitride film 14 are set to substrate temperature of 300° C., $SiH_4$ gas flow rate of 30 sccm, $N_2$ gas flow rate of 450 sccm, $NH_3$ gas flow rate of 30 sccm, pressure of evacuated chamber of 67 Pa and arc discharge power of 500 W (power density of 0.17 W/cm).

Figure 20B:
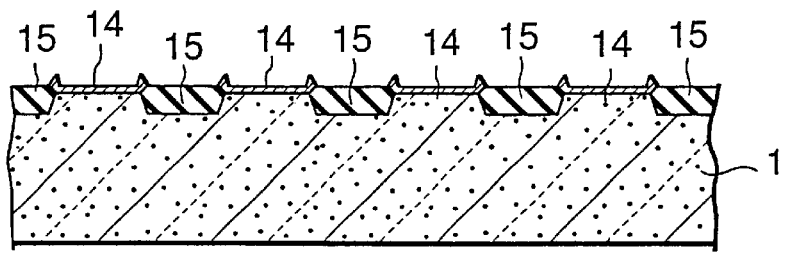

Wet oxidation is applied in steam to the p-type silicon substrate 1 whereon the silicon nitride film 14 is formed in the form of stripes, thereby selectively oxidize only a part of the principal surface of the p-type silicon substrate that is not covered by the silicon nitride film 14, thereby forming the silicon oxide layer 15 so that the structure shown in FIG. 20B is obtained.

Figure 20C:
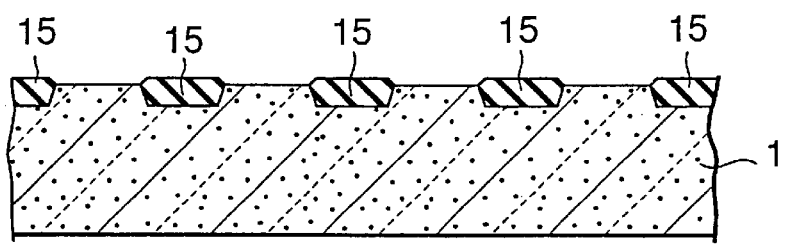

Next, the silicon nitride film 14 is removed by etching thereby to obtain the structure shown in FIG. 20C.

Figure 20D:
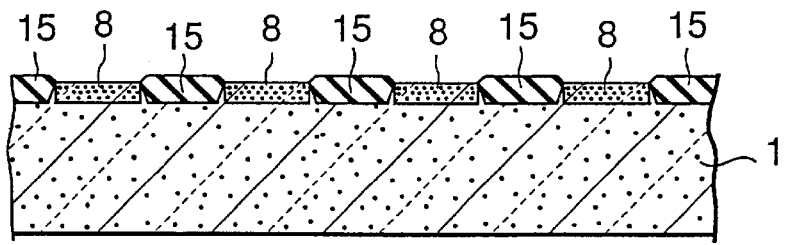

Then ion of phosphorus (P) or the like is injected using the silicon oxide layer 15 as a mask thereby to form the n-type region 8 in stripes on the principal surface side in the p-type silicon substrate 1, and the structure shown in FIG. 20D is obtained.

Figure 20E:
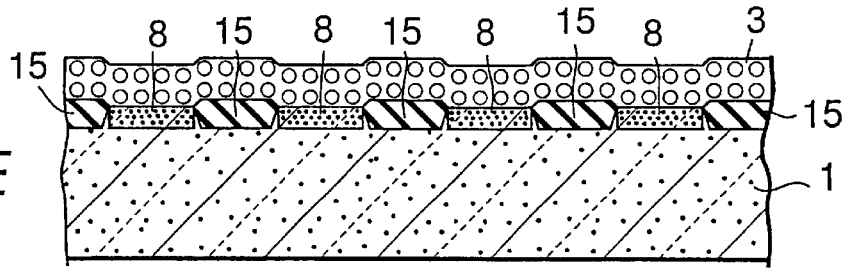

Next, polycrystal silicon layer 3 is formed by the LPCVD process on the n-type region 8 and on the silicon oxide layer 15, so that the structure shown in FIG. 20E is obtained. Although the portion of the polycrystal silicon layer 3 formed on the n-type region 8 is made of polycrystal silicon, the portion of the polycrystal silicon layer formed on the silicon oxide 15 is made of amorphous silicon.

When only the amorphous silicon on the silicon oxide layer 15 is removed by etching, the structure shown in FIG. 21 A is obtained.

Figure 21A:
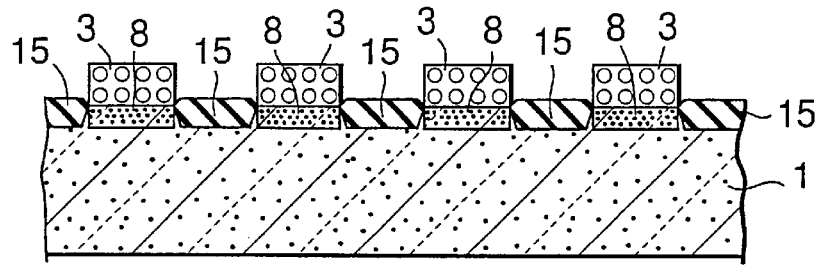
FIGS. 21A through 21D are drawings explaining the major steps of the fourth embodiment following FIG. 20.
Figure 21B:
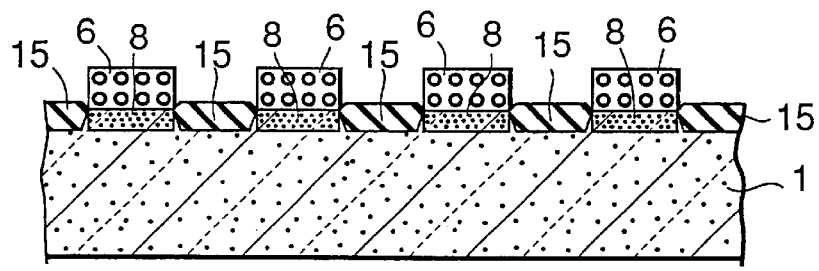

Then an electrolysis solution made by mixing 55 weight % of hydrogen fluoride solution and ethanol in a proportion of 1:1 and cooled to 0° C., a platinum electrode (not shown) as the negative electrode, and the p-type silicon substrate (an ohmic electrode not shown is formed on the back surface of the p-type silicon substrate 1) as the positive electrode are used to carry out anodic oxidation process with a constant current while irradiating with light, so that the polycrystal silicon layer 3 is made porous thereby to form the porous polycrystal silicon layer 6, and the structure shown in FIG. 21B is obtained. While the silicon oxide layer 15 is also etched by the electrolysis solution during the anodic oxidation process, etching rate of the silicon oxide layer 15 by the electrolysis solution is about 0.14 $\mu$m per minute and the duration of the anodic oxidation process is from about 10 seconds to 30 seconds. Therefore, the silicon oxide layer 15 formed to a thickness of about 0.5 $\mu$m surely functions as a mask.

Figure 21C:
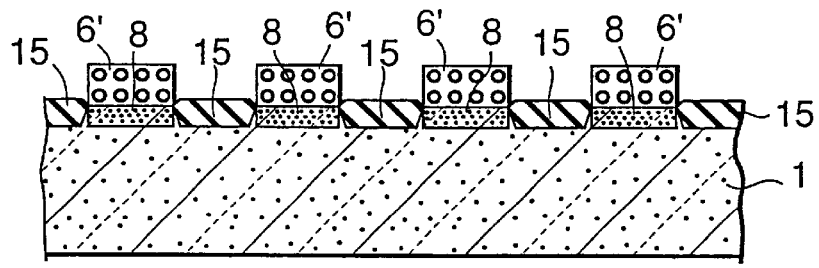

Then the porous polycrystal silicon layer 6 is subjected to rapid thermal oxidation (RTO) in a dry oxygen atmosphere using a lamp annealing apparatus, thereby to form the strong electric field drift layer 6' comprising the thermally oxidized porous polycrystal silicon, resulting in the structure shown in FIG. 21C. Conditions of the rapid thermal oxidation step are set to oxidizing temperature of 900° C. and oxidation period of one hour.

Figure 21D:
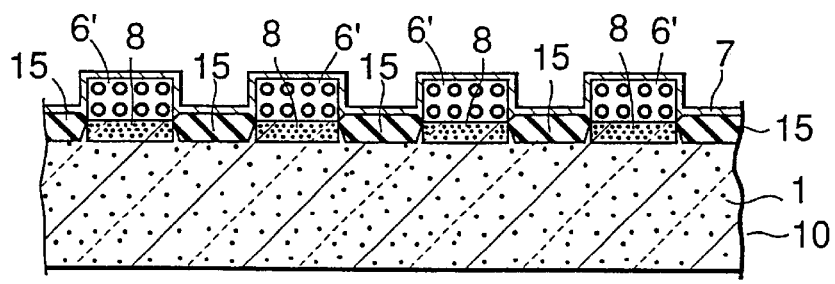

Then a thin metal film is formed as the surface electrodes 7 on the principal surface side of the p-type silicon substrate 1 in the configuration of stripes that cross the n-type region 8 at right angles by vapor deposition, thereby to obtain the field emission electron source 10 of the structure shown in FIG. 21D.

Embodiment 5

Figure 23:
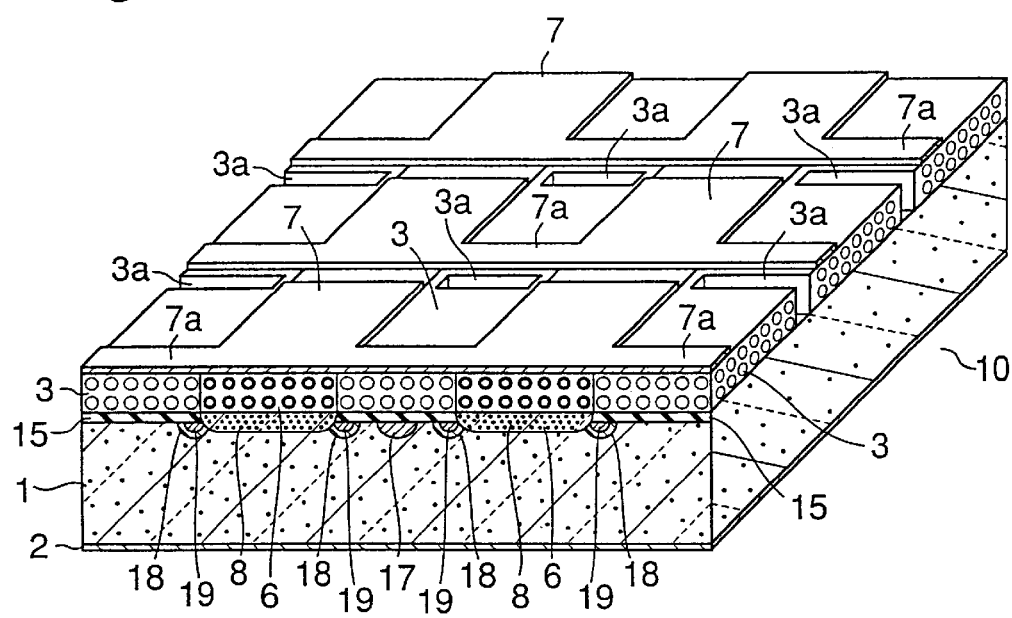
FIG. 23 is a drawing showing the schematic constitution of the fifth embodiment.

Basic configuration of the field emission electron source 10 according to this embodiment is substantially the same as that of the embodiment described above. As shown in FIG. 23, the basic configuration consists of the p-type silicon substrate 1 that is a conductive substrate, the n-type region 8 (diffusion layer) formed in the form of stripes on the principal surface side in the p-type silicon substrate 1, the strong electric field drift layer 6 made of the oxidized porous polycrystal silicon layer and formed on the n-type region 8 wherein electrons injected from the n-type region 8 drift, the polycrystal silicon layer 3 formed between the strong electric field drift layers 6, and the surface electrodes 7 made of thin conductive film formed in stripes in the direction to cross the n-type region 8 to bridge over the strong electric field drift layers 6 and the polycrystal silicon layer 3. The strong electric field drift layers 6 can be formed by forming the polycrystal silicon layer 3 over the entire principal surface of the p-type silicon substrate 1 and then applying anodic oxidation to turn a part of the polycrystal silicon layer 3 into porous material and further oxidizing it by rapid thermal oxidation, similarly to the constitution described previously.

While Cr/Au is used for the surface electrodes 7 in this embodiment, material for making the surface electrodes 7 is not limited to Cr/Au and may be any metal or conductive film (for example, ITO film) having a low work function and, in the case of a metal, aluminum, chromium, tungsten, nickel, platinum or an alloy of some of these metals may be used. Although thickness of the surface electrodes 7 is set to 10 nm, the thickness is not limited to this value.

In the field emission electron source 10 of this embodiment, a matrix is formed from the n-type region 8 formed in stripes and the surface electrodes 7 formed in stripes that cross the n-type region 8 at right angles. As a consequence, as a voltage is applied selectively across some of the n-type region 8 and some of the surface electrodes 7, electrons are emitted only from such a region of the surface electrodes 7 to which the voltage is applied that crosses the n-type region 8 to which the voltage is applied, thus making it possible to emit electrons only from a desired region of the surface electrodes 7.

When a display apparatus is to be made using the field emission electron source 10 of this embodiment, although not shown in FIG. 23, the glass substrate 33 may be disposed to oppose the field emission electron source 10 similarly to the constitution described above. The collector electrode 31 may be formed on the surface of the glass substrate 33 that faces the field emission electron source 10, while the collector electrode 31 is coated with the phosphor layer 32 that emits visible light when irradiated with electrons emitted from the field emission electron source 10. The glass substrate 33 may be integrated with the field emission electron source 10 by means of a spacer made of glass that is not shown, with the inner space enclosed by the glass substrate 33, the spacer and the field emission electron source 10 being evacuated to a predetermined degree of vacuum.

When a display apparatus of the constitution described above is to be made, it is not necessary to form the collector electrode 31 in the form of stripes as in the case of the display apparatus shown in FIG. 22. Thus it is made possible to eliminate a circuit that switches a high voltage of several hundreds to several thousands of volts applied to the collector electrode 31, thereby reducing the size and cost of the apparatus.

In the field emission electron source 10 of this embodiment, the voltage applied across the n-type region 8 and the surface electrodes 7 is in a range from about 10 V to about 30 V.

Characteristic features of the field emission electron source 10 of this embodiment will be described below.

In the field emission electron source 10 of this embodiment, a p++ type region 17 that is a p-type region of high impurity concentration is formed at substantially the central portion between the n-type regions 8 on the principal surface side in the p-type silicon substrate 1. Consequently, since the p++ type region 17 is provided, leak current can be prevented from flowing between the n-type regions 8.

Also n+ diffusion layers 18 that are n+ layers having a higher concentration of impurity than the n-type region 8 and adjoins the n-type region 8 are provided on both sides in the direction of width of the n-type region 8 on the principal surface side in the p-type silicon substrate 1. And an n++ diffusion layers 19 that is an n++ layer having higher concentration of impurity than the n+ diffusion layer 18 is provided in the n+ diffusion layer 18. Consequently, even when the impurity concentration in the n-type region 8 is made lower, electrical resistance of the n-type portion can be decreased since the n-type region 8 and the n+ diffusion layer 18 adjoin each other. Moreover, since the n++ diffusion layer 19 having higher concentration of impurity than the n+ diffusion layer 18 is provided in the n+ diffusion layer 18, concentration of strong electric field on the principal surface side of the p-type silicon substrate 1 can be prevented, thus making it possible to improve the insulation withstanding voltage.

Also because the ohmic electrode 2 is provided on the back surface of the p-type silicon substrate 1 as a back electrode, leak current can be surely prevented from flowing between the n-type regions 8 by controlling the potential of the p-type silicon substrate 1 by using the ohmic electrode 2.

The polycrystal silicon layer 3 has isolation grooves 3a, that penetrate therethrough in the direction of thickness, formed in a part of the portion thereof located between the surface electrodes 7. The isolation grooves 3a have openings of rectangular shape with a longer side corresponding to the surface electrodes 7 and a shorter side corresponding to the longitudinal direction of the strong electric field drift layer 6. Consequently, leak current flowing between the strong electric field drift layers 6 and between the surface electrodes 7 can be suppressed.

Further in the field emission electron source 10 of this embodiment, the insulating layer 15 is formed by LOCOS process between the p-type silicon substrate 1 and the polycrystal silicon layer 3. The insulating layer 15 is formed with a part 10 thereof in the direction of thickness being embedded in the p-type silicon substrate, while the thickness on both ends in the direction of width gradually decreases toward the end. Even when the insulating layer 15 is formed between the p-type silicon substrate 1 and the polycrystal silicon layer 3, the step between the surfaces of the polycrystal silicon layer 3 and the strong electric field drift layer 6 can be decreased thus preventing the surface electrodes 7 from breaking due to the formation of the insulating layer 15. The LOCOS process, as is well known, is a technique used in steps of producing MOS devices and the like for isolating elements. Use of the LOCOS method in forming the insulating layer 15 makes it possible to decrease the variation in the configuration of the insulating layer 15 in the wafer and among wafers relatively easily.

In such a case as the strong electric field drift layer 6 is formed by making a porous portion by applying anodic oxidation to a part of the polycrystal silicon layer 3 that has been formed over the entire principal surface of the p-type silicon substrate 1, the n-type region 8 can be used as a positive electrode in relation to the negative electrode made of platinum, and therefore it is not necessary to provide a protective film on the polycrystal silicon layer 3 when applying anodic oxidation, thus making the step simpler.

The surface electrode 7 has a portion 7a, having smaller width than the portion thereof located on the strong electric field drift layer 6, located on the polycrystal silicon layer 3. Since the surface electrode 7 is formed with the portion located on the polycrystal silicon layer 3 (narrow portion 7a) having smaller width than the portion located on the strong electric field drift layer 6, when used in a display apparatus, possibility of electrons being emitted from the surface electrodes 7 above the n-type region 8 without voltage applied thereto is decreased compared to a case where width of the surface electrode 7 is constant over the entire length thereof, thus straightness of the electron traveling direction can be improved resulting in reduced cross-talk.

Cross-talk can be reduced also by providing an insulation film between the surface electrode 7 and the polycrystal silicon layer 3, because this improves the straightness of the electron traveling direction, too.

Steps characteristic of the method of producing the field emission electron source 10 according to this embodiment will be described below.

After a silicon nitride film is formed on the principal surface of the p-type silicon substrate 1 by plasma CVD technique or the like, a pattern of stripes of the silicon nitride film 14 is made by photolithography technique and etching technique, and the principal surface of the p-type silicon substrate 1 whereon the stripes of silicon nitride film are formed is subjected to wet oxidation in steam atmosphere, thereby to selectively oxidizing only the portion of the principal surface of the p-type silicon substrate 1 not covered by the silicon nitride film 14, and form the insulating layer 15 from silicon oxide film. In short, the insulation film 15 is formed by LOCOS method. Then after removing the silicon nitride film by etching, the insulation film 15 is used as a mask to injet ions of phosphorus (P) or the like, thereby to form the n-type region 8 in a form of stripes on the principal surface side in the p-type silicon substrate 1. This is followed by the formation of the polycryslal silicon layer 3 on the n-type region 8 and on the insulating layer 15 by LPCVD process or the like. Then by using an electrolysis solution made by mixing 55 weight % of hydrogen fluoride solution and ethanol in a proportion of 1:1 and cooled to 0° C., a platinum electrode (not shown) as the negative electrode, and the n-type region 8 as the positive electrode, anodic oxidation process is carried out with a constant current while irradiating with light, so that the polycrystal silicon layer 3 located the n-type region 8 is made porous thereby to form a porous polycrystal silicon layer. Then the porous polycrystal silicon layer is subjected to rapid thermal oxidation (RTO) in a dry oxygen atmosphere using a lamp annealing apparatus, thereby to form the strong electric field drift layer 6 comprising the thermally oxidized porous polycrystal silicon layer. The surface electrodes 7 are formed by vapor deposition of metal film on the principal surface of the p-type silicon substrate in the form of stripes in the direction perpendicular to the n-type region 8.

Although the p-type silicon substrate 1 is used as the conductive substrate and the n-type region 8 is used as the diffusion layer in this embodiment, the conductive substrate is not limited to the p-type silicon substrate and the diffusion layer is not limited to the n-type region 8. The diffusion layer to be formed in the form of stripes may be, made in other configuration as long as the diffusion layers formed in stripes are electrically isolated from each other and from the conductive substrate.

Embodiment 6

Figure 24:
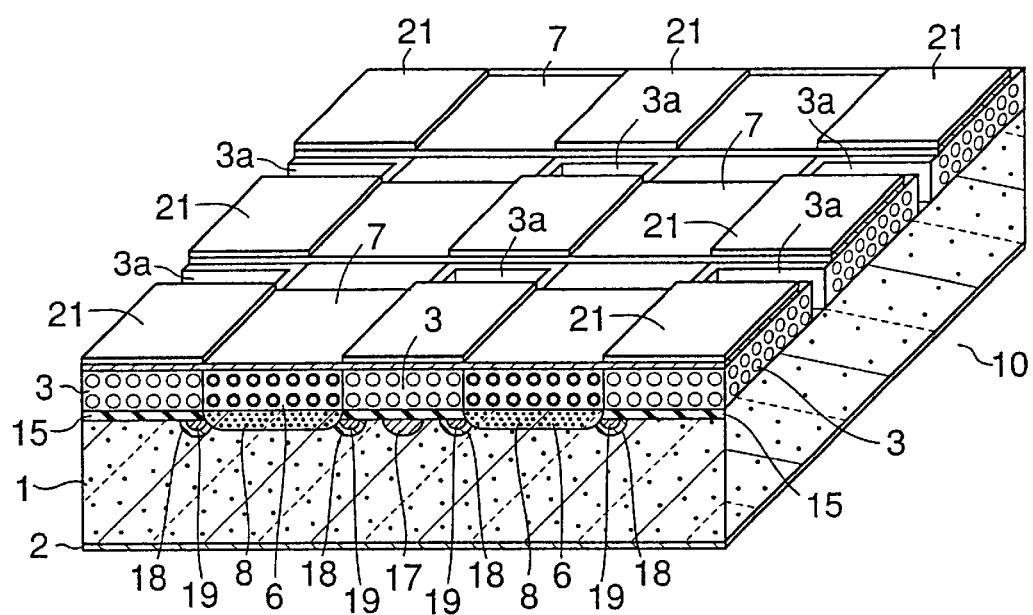
FIG. 24 is a drawing showing the schematic constitution of the sixth embodiment.

Basic constitution of the field emission electron source 10 of this embodiment is substantially the same as that shown in FIG. 23, and as shown in FIG. 24 is characterized in that the surface electrodes 7 are formed to have constant width over the entire length, and an insulation film 21 is provided on a portion that does not overlap the strong electric field drift layer 6 in the direction of thickness. Components similar to those of the first embodiment will be denoted with identical reference numerals and description thereof will be omitted.

In the field emission electron source 10 of this embodiment, since the insulation film 21 is provided on a portion that does not overlap the strong electric field drift layer 6 in the direction of thickness, possibility of electrons being emitted from the surface electrodes 7 above the n-type region 8 without voltage applied is decreased when used in a display apparatus or the like, and therefore straightness of the electron travel can be improved resulting in reduced cross-talk.

In case such a configuration is employed instead of providing the insulation film 21, that thickness of the surface electrodes 7 at portions not overlapping the strong electric field drift layer 6 is increased compared to the thickness of the portion overlapping the strong electric field drift layer 6, in an application for a display apparatus or the like, possibility of electrons being emitted from the surface electrodes 7 above the n-type region 8 without voltage applied is decreased and therefore straightness of the electron travel can be improved resulting in reduced cross-talk.

Embodiment 7

Figure 25A:
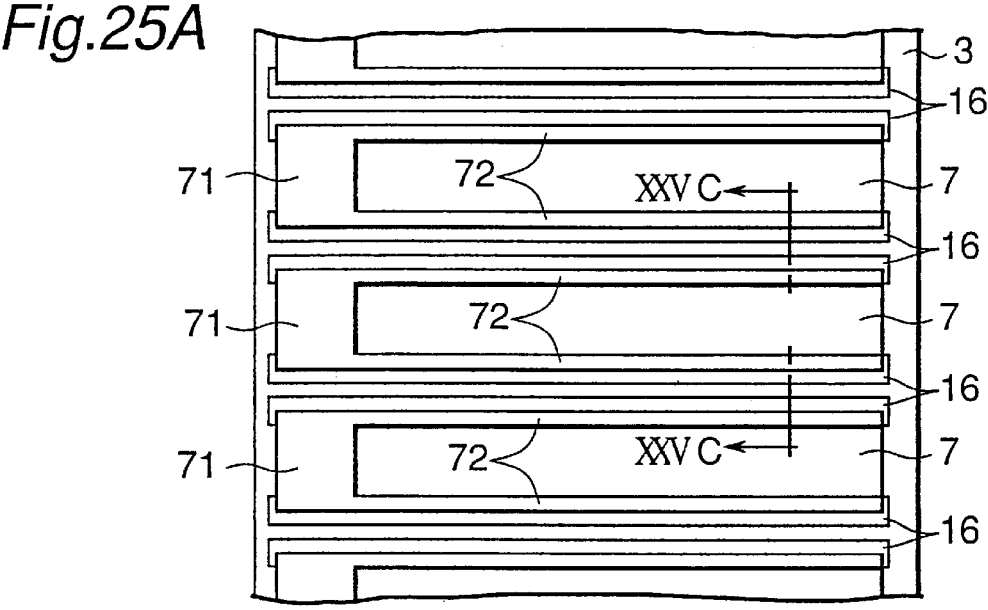
FIGS. 25A through 25C are plan view, side sectional view and sectional view taken along lines C—C, respectively, showing a part of the field emission electron source of the seventh embodiment.
Figure 25B:
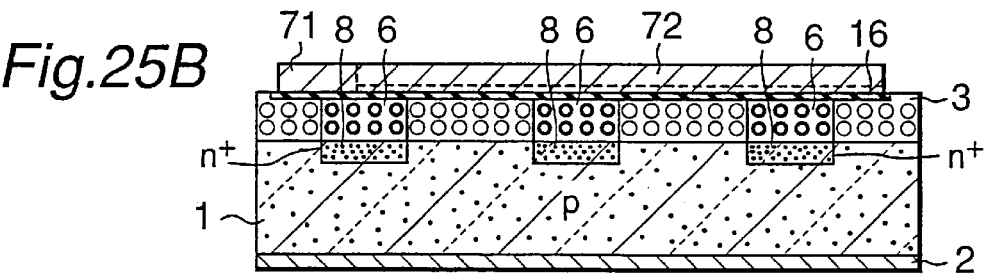
Figure 25C:
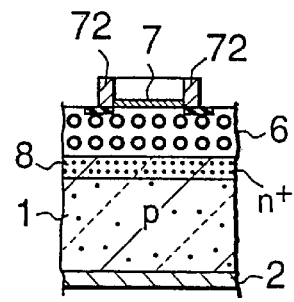

The electron source of this embodiment comprises, as shown in FIG. 25A through C, the strong electric field drift layer 6 made of porous polycrystal silicon formed on one side of the p-type silicon substrate 1, the surface electrodes 7 made of gold film having a thickness of 10 nm that has a low work function and high oxidation resistance to cover a part of the strong electric field drift layer 6, the back electrode 2 made of aluminum film having a thickness of 0.5 $\mu$m formed on the back surface of the silicon substrate 1, and a wiring electrode 72 connecting the surface electrode 7 and a terminal electrode 71. The wiring electrode 72 and the terminal electrode 71 are both made of aluminum film having a thickness of 1.5 $\mu$m, while the wiring electrode 72 is disposed to electrically connect to the surface electrodes 7 and an insulating layer 16 made of silicon oxide having a thickness of 0.5 $\mu$m is formed between the wiring electrode 72 and the strong electric field drift layer 6.

According to this embodiment, since the wiring electrode 72 having a large thickness and therefore low electric resistance is provided separately from the surface electrode 7, it is made possible to improve the electron emission efficiency, reduce the operating voltage, reduce the heat generation, increase the operating speed, reduce the variations in the electron emission efficiency and in the current emission density within a plane, reduce failures due to breakage of the surface electrode 7, and improve the performance, quality and yield when used in displays or the like.

Also because the insulating layer 16 made of silicon oxide film having a thickness of 0.5 $\mu$m is formed between the wiring electrode 72 and the strong electric field drift layer 6, ineffective current caused by electrons entering from the strong electric field drift layer 6 directly into the wiring layer can be eliminated, thereby further improving the electron emission efficiency because of providing the wiring electrode 72.

Moreover, since the wiring electrode 72 and the terminal electrode 71 are made of the same material with the same thickness, the wiring electrode 72 can be formed simultaneously as the terminal electrode 71 is formed, and therefore providing the wiring electrode 72 does not increase the number of steps.

Also as the wiring electrode 72 having greater thickness is provided separately from the surface electrodes 7 that are about 10 nm thick Joule heat generated in the strong electric field drift layer 6 can be effectively dissipated through the wiring electrode 72, thereby improving the aging stability of the electron source.

By employing such a structure as the surface electrodes 7 are surrounded by the thick wiring electrode 72, heat dissipation performance is improved, thereby farther improving the aging stability of the electron source.

Embodiment 8

Figure 26A:
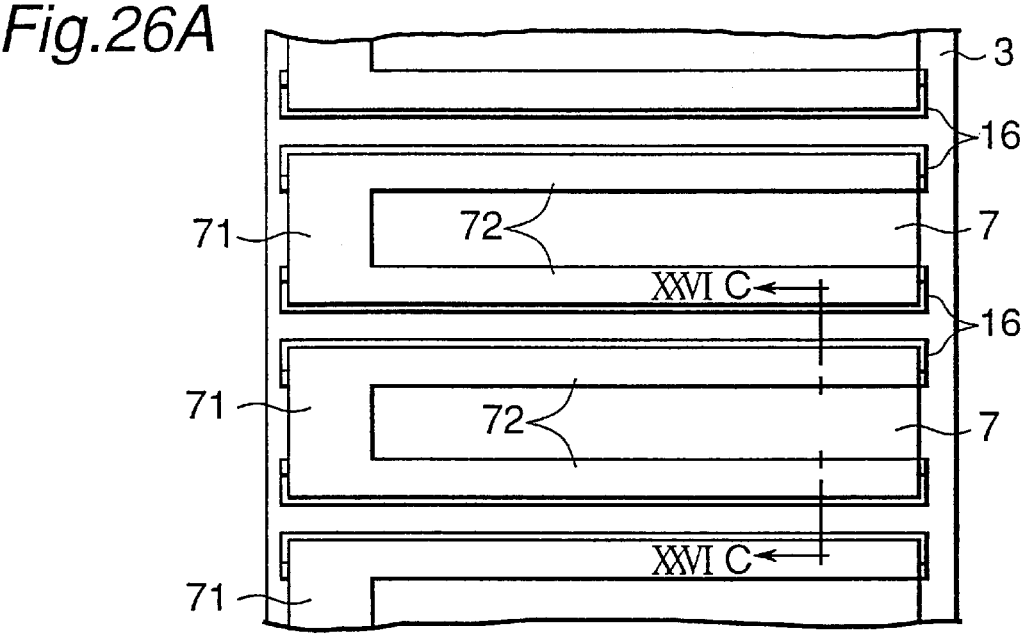
FIGS. 26A through 26C are plan view, side sectional view and sectional view taken along lines C—C, respectively, showing a part of the field emission electron source of the eighth embodiment.
Figure 26B:
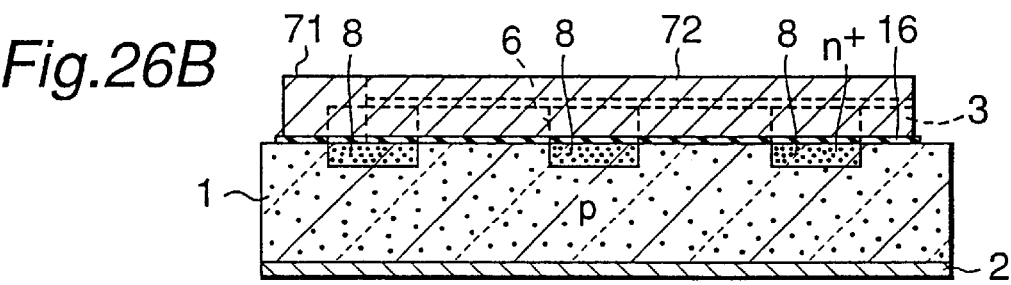
Figure 26C:
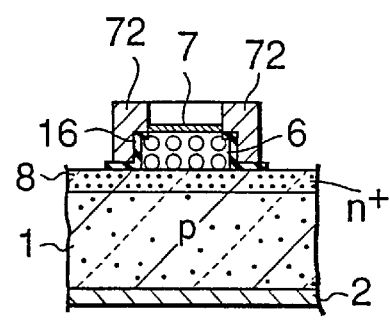

The electron source of this embodiment comprises, as shown in FIG. 26A through C, the strong electric field drift layer 6 made of porous polycrystal silicon formed on one side of the p-type silicon substrate 1, the surface electrodes 7 made of gold film 10 nm thick that has a low work function and high oxidation resistance to cover a part of the strong electric field drift layer 6, the back electrode 2 made of aluminum film having a thickness of 0.5 $\mu$m formed on the back surface of the silicon substrate 1, and the wiring electrode 72 connecting the surface electrode 7 and the terminal electrode 71. The wiring electrode 72 and the terminal electrode 71 are both made of aluminum film having a thickness of 1.5 $\mu$m, while the wiring electrode 72 is disposed to electrically connect to the surface electrodes 7. The porous polycrystal silicon that makes up the strong electric field drift layer 6 is removed from below the wiring electrode 72 except for a portion thereof, and most of the wiring electrode 72 is interposed by the insulating layer 16 made of silicon oxide film having a thickness of 0.5 $\mu$m formed on the flat silicon substrate 1.

According to this embodiment, in addition to the advantages of the seventh embodiment, since the porous polycrystal silicon that makes up the strong electric field drift layer 6 is removed from below the wiring electrode 72 except for a portion thereof the wiring electrode 72 can be formed on the flat surface of the silicon substrate 1, not on the polycrystal silicon layer that has significant surface unevenness. As a consequence, breakage and increase in the electrical resistance of the electrodes can be prevented from occurring, thus making it possible to improve the electron emission efficiency, reduce the operating voltage, reduce the heat generation, increase the operating speed, reduce the variations in the electron emission efficiency and in the current emission density within a plane, reduce failures due to breakage of the surface electrode 7, and improve the performance, quality and yield when used in displays or the like, compared to the seventh embodiment.

Embodiment 9

Figure 27A:
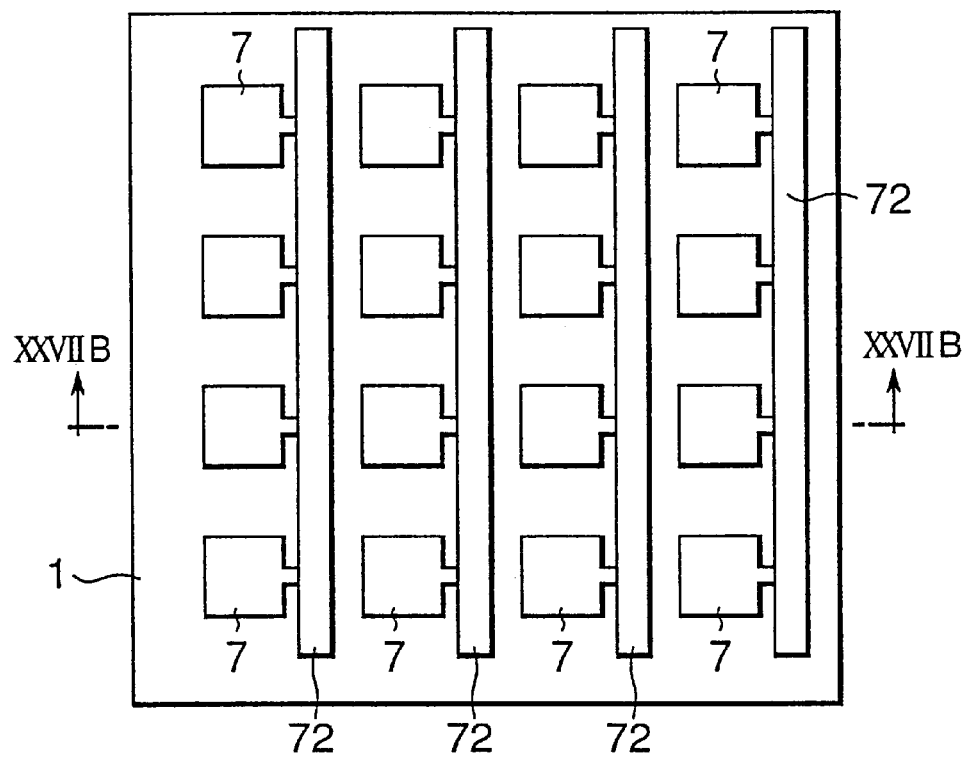
FIGS. 27A, 27B are plan view, side sectional view and sectional view taken along lines C—C, respectively, showing a part of the field emission electron source of the ninth embodiment.
Figure 27B:
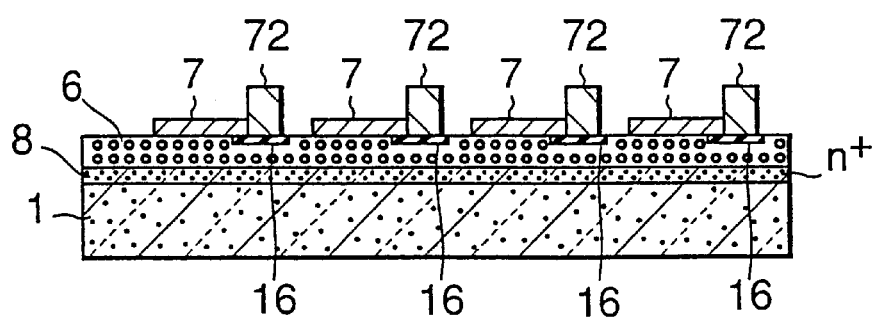

In this embodiment, as shown in FIG. 27A and B, the strong electric field drift layer 6 made of porous polycrystal silicon layer is formed in matrix on a substrate, for example the silicon substrate 1, the surface electrodes 7 made of gold film having similar thickness to that of the seventh and eighth embodiments are formed on the strong electric field drift layers 6, and the wiring electrodes 72 are formed in parallel and corresponding to the surface electrodes 7 arranged in a row. The wiring electrodes 72 are made of aluminum film having similar thickness to that of the seventh and eighth embodiments, electrically connected to the corresponding surface electrodes 7 by linkage electrodes 73 of substantially the same thickness as the surface electrodes 7 as shown in FIG. 28A, B, while at the same time heat generated in the strong electric field drift layer 6 is transmitted through the linkage electrodes 73 and the silicon substrate 1 thereby to be dissipated. The insulating layer 16 is formed below the wiring electrode 72.

While the surface electrodes 7 are connected by the linkage electrodes 73 to the wiring electrodes 72 in the configuration described above, the surface electrodes 7 may also be electrically connected to the wiring electrodes 72 by forming the wiring electrode 72 to surround the surface electrodes 7 as shown in FIG. 29A, B, in which case higher effect of heat dissipation by the wiring electrodes 72 can be achieved.

Embodiment 10

Figure 30A:
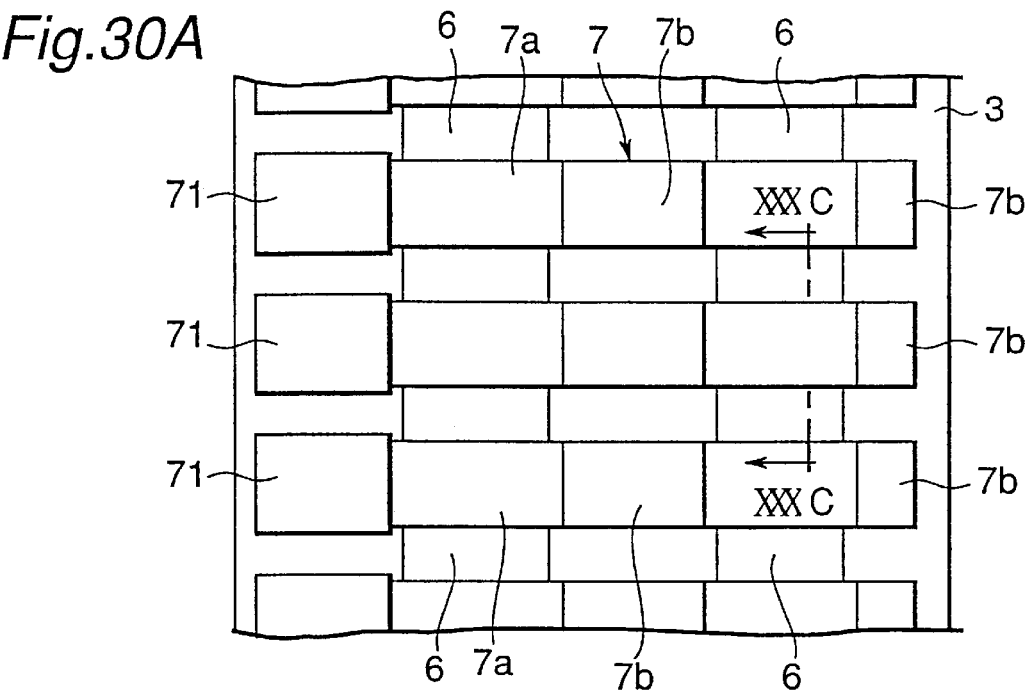
FIGS. 30A through 30C are plan view, side sectional view and sectional view taken along lines C—C, respectively, showing a part of the field emission electron source of the tenth embodiment.
Figure 30B:
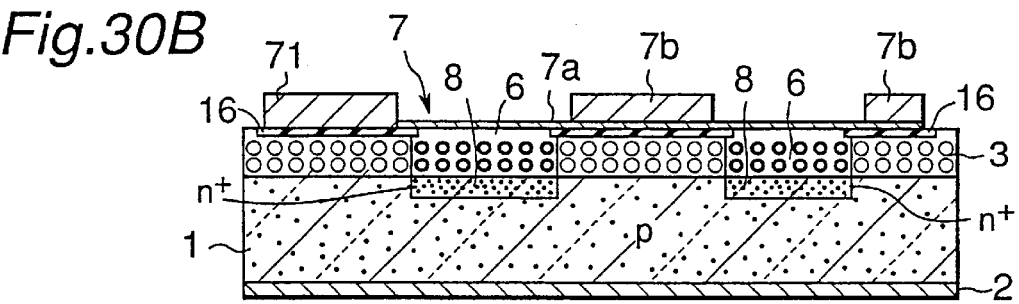
Figure 30C:
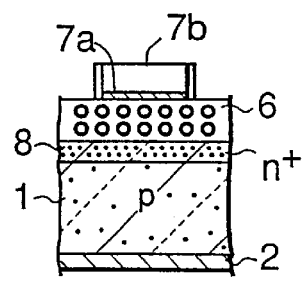

The field emission electron source of this embodiment will be described below with reference to FIG. 30A through 30C.

The field emission electron source comprises the p-type silicon substrate 1, the n-type region (diffusion layer) 8 formed in stripes on the principal surface of the p-type silicon substrate 1, the back electrode (ohmic electrode) 2 made of aluminum film having a thickness of about 0.5 $\mu$m formed on the back surface of the p-type silicon substrate 1, the polycrystal silicon layer (semiconductor polycrystal layer) 3 formed on the surface of the p-type silicon substrate 1 by, for example, the LPCVD process, the porous polycrystal silicon layer (strong electric field drift layer) 6 formed by applying anodic oxidation while irradiating a part of the polycrystal silicon layer 3 with light to make it porous and further applying rapid thermal oxidation, the surface electrodes 7 formed to cover the polycrystal silicon layer 3 and a part of each of the porous polycrystal silicon layers 6, and the terminal electrodes 71 made of aluminum film having a thickness of about 1.5 $\mu$m formed by, for example, vapor deposition on the surface of the polycrystal silicon layer 3 for electrical connection of the surface electrodes 7 with external circuits. The surface electrode 7 comprises the thin metal film 7a made of for example, a gold film about 10 nm thick formed by vapor deposition on the surfaces of the polycrystal silicon layer 3 and on the surface of the porous polycrystal silicon layer 6, and the thin metal film 7b made of aluminum film having a thickness of about 1.5 $\mu$m formed by, for example, vapor deposition on the surface of the thin metal film 7a that is formed in the region of the polycrystal silicon layer 3.

The porous polycrystal silicon layer 6 constitutes the porous polycrystal semiconductor layer. The insulating layer 16 is formed between the polycrystal silicon layer 3 in a portion other than the porous polycrystal silicon layer 6 and the surface electrodes 7.

While the p-type silicon substrate 1 having a conductive layer formed thereon with an n+ diffusion layer is used as the conductive substrate in this embodiment, the conductive substrate constitutes the negative electrode of the field emission electron source, supports the porous polycrystal silicon layer 6 in vacuum and injects electrons unto the porous polycrystal silicon layer 6. Therefore, the conductive substrate is required only to constitute the negative electrode of the field emission electron source and support the porous polycrystal silicon layer 6, and is not limited to the p-type silicon substrate 1. An insulating substrate such as glass with a conductive film formed thereon may also be used as the conductive substrate.

Since the porous polycrystal silicon layer 6 that serves as the strong field drift layer is formed by turning a part of the polycrystal silicon layer 3 into a porous material and further applying rapid thermal oxidation, surface of the polycrystal silicon layer 3 and surface of the porous polycrystal silicon layers 6 are formed in substantially the same plane.

The surface electrodes 7a are formed to extend over the porous polycrystal silicon layer 6 and the portion other than the porous polycrystal silicon layer 6 on the surface of the n-type silicon substrate 1 whereon the porous polycrystal silicon layer 6 that constitutes the strong electric field drift layer is formed. Since the portion other than the porous polycrystal silicon layer 6 and the porous polycrystal silicon layer 6 are formed so that the surfaces thereof are in the same plane, the thin metal film 7a can be formed in a stepless region Therefore, breakage and increase in the electrical resistance of the film can be made less likely to occur than in the case of forming the thin metal film 7a in a stepped region.

Also the thin metal film 7a formed on the surface of the porous polycrystal silicon layer 6 is formed to a very small thickness in order to prevent the electrons reaching the surface of the porous polycrystal silicon layer 6 from being scattered in the thin metal film 7a, but it is not necessary to make the thin metal film 7b, that is formed in a region other than the porous polycrystal silicon layer 6, to be so thin. So the thin metal film 7b is formed to be thicker than the thin metal film 7a. Thus it is made possible to further prevent the thin metal film 7b from breaking and the electrical resistance thereof from increasing. Also since the insulating layer 16 is provided between the polycrystal silicon layer 3 other than the porous polycrystal silicon layer 6 and the surface electrode 7, the straightness of the electron traveling direction can be improved, thus providing the effect of reducing the cross-talk.

Since the increase in electrical resistance of the thin metal films 7a, 7b that constitute the surface electrodes 7 can be suppressed as described above, heat generated in the surface electrodes 7 by the current flowing therein can be s reduced, thus reducing the thermal loss and preventing the electron emission efficiency from decreasing. While an increase in electrical resistance of the surface electrodes 7 increases the voltage drop due to the current flowing in the surface electrodes 7 and, it is necessary to increase the operating voltage because the voltage applied to the porous polycrystal silicon layer 6 is lower than the operating voltage applied across the terminal electrode 71 and the back electrode 2, an increase in the operating voltage can be suppressed by suppressing the increase in the electrical resistance. Further, a voltage drop in the surface electrodes 7 varies depending on the position. Thus when the surface electrodes 7 have a high electrical resistance, there is a possibility that the electron emission efficiency and the emission current density vary with the position. However, the electron emission efficiency and the current emission density are prevented from varying with the position as electrical resistance of the surface electrodes 7 is prevented from increasing. Moreover, when electrical resistance of the surface electrodes 7 increases, time constant also increases resulting in slower operation. However, since electrical resistance of the surface electrodes 7 is suppressed from increasing, decrease in the operating speed can be prevented.

The surface electrodes 7 constitute the positive electrode of the field emission electron source. When a voltage is applied across the surface electrodes 7 serving as the positive electrodes and the n-type region 8 serving as the negative electrode, electrons injected from the n-type region 8 drift through the porous polycrystal silicon layer 6 and are, upon reaching the surface of the porous polycrystal silicon layer 6, emitted from the surface of the thin metal film 7a due to the tunnel effect. Energy of free electron that has been emitted is the energy given by the direct current voltage applied across the n-type region 8 and the thin metal film 7a minus the work function of the thin metal film 7a. Thus it is desirable to make the work function of the thin metal film 7a as small as possible. Also because formation of an oxide film on the surface of the thin metal film 7a due to the oxidation of the thin metal film 7a decreases the electron emission efficiency through the thin metal film 7a, a metal that is resistant to oxidation is desirable for the material to made the thin metal film 7a While gold is used for the thin metal film 7a in this embodiment, material for making the thin metal film 7a is not limited to gold and may be any metal that has a low work function and is resistant against oxidation such as platinum, iridium, rhodium, ruthenium or an alloy of some of these metals. Also it is desirable to use a material of low resistivity for the thin metal film 7b formed in a region other than the porous polycrystal silicon layer 6 on the surface of the thin metal film 7a, and aluminum is used in this embodiment. However, the material of the thin metal film 7b is not limited to aluminum and may be any metal having low resistivity. Also thicknesses of the thin metal films 7a, 7b and the electrodes 71, 72 are not limited to the values described above.

As described above, since the surface electrodes 7b formed on the surface of the polycrystal silicon layer 3 and the terminal electrode 71 are made of the same material with substantially the same thickness, the electrodes 7b and 71 can be formed in the same one step.

Embodiment 11

Figure 31A:
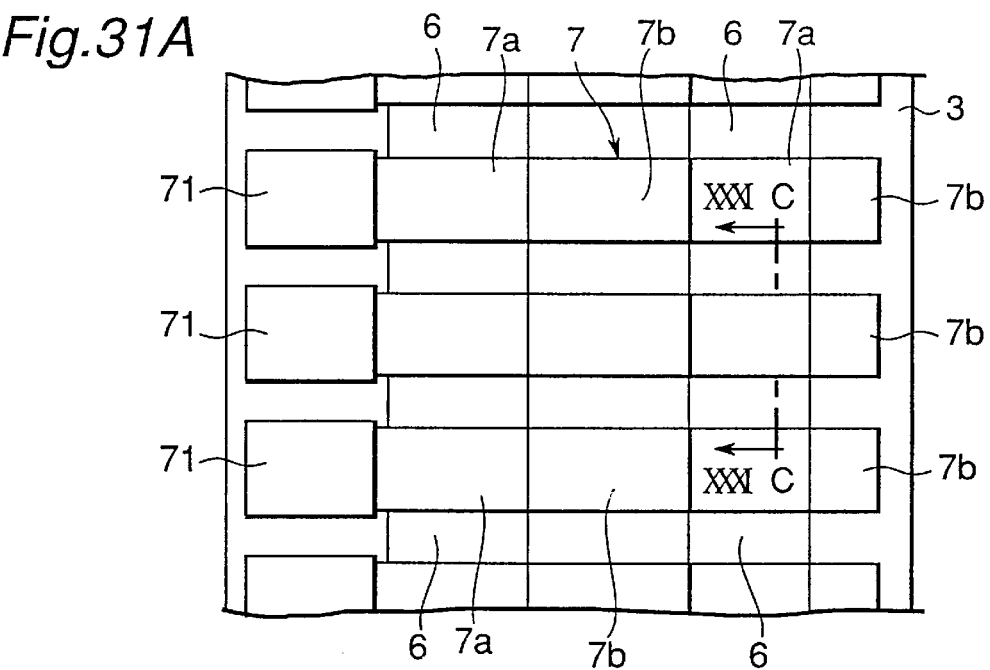
FIGS. 31A through 31C are plan view, side sectional view and sectional view taken along lines C—C, respectively, showing a part of the field emission electron source of the eleventh embodiment.
Figure 31B:
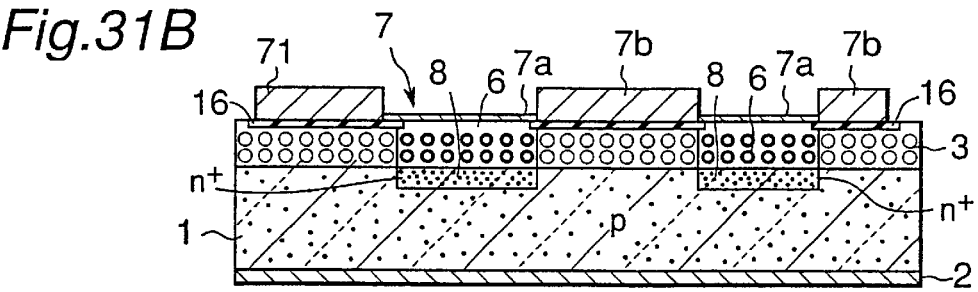
Figure 31C:
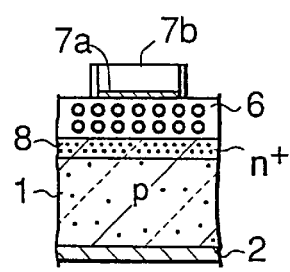

The field emission electron source of this embodiment will be described below with reference to FIG. 31A through 31C. In the field emission electron source of the tenth embodiment, the surface electrodes 7 is constituted from the thin metal film 7a made of, for example, a gold film formed on the surfaces of the polycrystal silicon layer 3 and the porous polycrystal silicon layer 6, and the thin metal film 7b made of; for example, aluminum film formed in the region of the polycrystal silicon layer 3 on the thin metal film 7a. In the field emission electron source of this embodiment, on the other hand, the surface electrodes 7 is constituted from the thin metal film 7a made of, for example, a gold film about 10 nm thick formed by vapor deposition on the surfaces of the porous polycrystal silicon layer 6 and the thin metal film 7b made of, for example, aluminum film having a thickness of about 1.5 $\mu$m formed by, for example, vapor deposition on the surface of the polycrystal silicon layer 3. Constitution except for the surface electrodes 7 is similar to the tenth embodiment. Therefore the same components will be denoted with identical reference numerals and description thereof will be omitted.

Since the surfaces of the polycrystal silicon layer 3 and the porous polycrystal silicon layer 6 are formed so that the surfaces thereof are in substantially the same plane, the thin metal films 7a and 7b can be formed in a stepless region. Therefore, breakage and increase in resistance of the film can be made less likely to occur than in the case of forming the thin metal films 7a, 7b in a stepped region.

As described in relation to the tenth embodiment, the surface electrodes 7 constitute the positive electrode of the field emission electron source. When a voltage is applied across the surface electrodes 7 serving as the positive electrodes and the n-type region 8 serving as the negative electrode, electrons injected from the n-type region 8 drift through the porous polycrystal silicon layer 6 and are, upon reaching the surface of the porous polycrystal silicon layer 6, emitted from the surface of the thin metal film 7a due to tunnel effect. Enegy of free electron that has been emitted is the energy given by the direct current voltage applied across the n-type region 8 and the thin metal film 7a minus the work function of the thin metal film 7a. Thus it is desirable to make the work function of the thin metal film 7a as small as possible. Also because formation of an oxide film on the surface of the thin metal film 7a due to the oxidation of the thin metal film 7a decreases the electron emission efficiency through the thin metal film 7a, a metal that is resistant to oxidation is desirable for the material to made the thin metal film 7a. While gold is used for the thin metal film 7a in this embodiment, material for making the thin metal film 7a is not limited to gold and may be any metal that has a low work function and is resistant against oxidation such as platinum, iridium, rhodium, ruthenium or an alloy of some of these metals. Also it is desirable to use a material of low resistivity for the thin metal film 4b formed in a region other than the porous polycrystal silicon layer 6 on the surface of the thin metal film 7a, and aluminum is used in this embodiment. However, the material of the thin metal film 7b is not limited to aluminum and may be any metal having low resistivity. Thickness of the thin metal films 7a, 7b and the electrodes 71, 72 is not limited to the values described above.

Embodiment 12

The field emission electron source of this embodiment will be described below with reference to FIG. 32A through F. In this embodiment, the p-type silicon substrate ((100) substrate having resistivity of 10 Ωm) is used for the conductive substrate.

First, the n-type region (n+ conductive layer) 8 is formed in stripes on the principal surface of the p-type silicon substrate 1, and an ohmic electrode 2 is formed on the back surface. Then the undoped polycrystal silicon layer 3 having a thickness of 1.5 $\mu$m is formed by LPCVD process to cover the n-type region 8, thereby to form the structure shown in FIG. 32A Conditions of forming the film by the LPCVD process are set to substrate temperature of 610° C., $SiH_4$ gas flow rate of 600 sccm and pressure of evacuated chamber of 20 Pa. Step for forming the polycrystal silicon layer 3 is not limited to the LPCVD process, and such a process may be employed as an amorphous silicon layer is formed by sputtering or plasma CVD method and then the amorphous silicon layer is crystallized by annealing, thereby forming the polycrystal silicon layer 3.

Figure 32A:
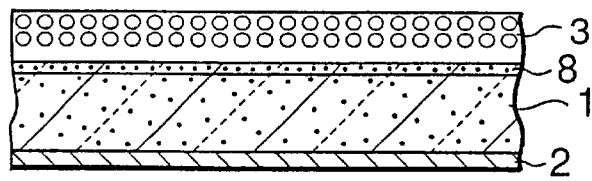
FIGS. 32A through 32F are drawings explaining a major flow sheet of the twelfth embodiment.
Figure 32B:
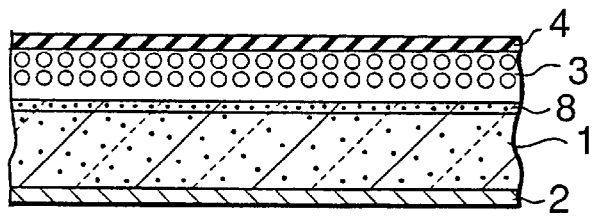

Then a silicon oxide layer 4 having a thickness of 1 $\mu$m is formed by plasma CVD process on the polycrystal silicon layer 3, so that the structure shown in FIG. 32B is obtained. Conditions of forming the silicon oxide layer 4 are set to substrate temperature of 225° C., $SiH_4$ gas flow rate of 50 sccm, $N_2O$ gas flow rate of 875 sccm, pressure of evacuated chamber of 133 Pa and ac discharge power of 150 W (power density of 0.05 W/cm$^2$). The method for forming the silicon oxide layer 4 is not limited to the plasma CVD process and, for example, thermal oxidation step may be employed.

Figure 32C:
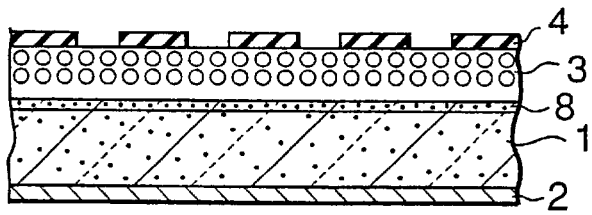

Then, the silicon oxide 4 on the polycrystal silicon layer 3 is patterned by combining the photolithography technique and etching technique, thereby to obtain the structure shown in FIG. 32C.

Figure 32D:
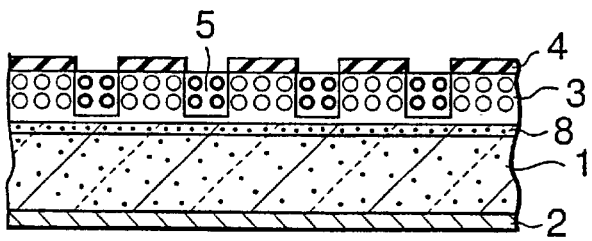

Then an electrolysis solution made by mixing 55 weight % of hydrogen fluoride solution and ethanol in a proportion of 1:1 and cooled to 0° C., a platinum electrode (not shown) as negative electrode and the p-type silicon substrate 1 (the ohmic electrode 2) as positive electrode are used to carry out anodic oxidation process with a constant current while irradiating the exposed portion of the polycrystal silicon layer 3 with light. Thus the porous polycrystal silicon layer 5 is partially formed and the structure shown in FIG. 32D is obtained. In this embodiment, conditions of the anodic oxidation process are set to constant current density of 20 mA/cm$^2$, anodic oxidation time of 15 seconds and irradiation with light emitted by a 500 W tungsten lamp during the anodic oxidation process, thereby forming the porous polycrystal silicon layer 1 $\mu$m m thick. While the polycrystal silicon layer 3 is made porous to a mid point in the direction of thickness thereof in this embodiment, the polycrystal silicon layer 3 may also be made porous to such a depth as reaches the p-type silicon substrate 1. Also the current density is maintained constant during the anodic oxidation process so that the degree of porosity of the porous polycrystal silicon layer 5 is substantially uniform in this embodiment, although the current density may be changed during the anodic oxidation process to form such a structure as a polycrystal silicon layer of a high degree of porosity and a polycrystal silicon layer of a low degree of porosity are laminated alternately, or such a structure may also be formed as the degree of porosity changes continuously in the direction of thickness.

While the silicon oxide layer 4 having a thickness of 1 $\mu$m is also etched by the electrolysis solution during the anodic oxidation process, etching rate of silicon oxide by the electrolysis solution is about 0.14 $\mu$m per minute and the duration of the anodic oxidation process is 15 seconds. Therefore, the silicon oxide layer 4 surely functions as a mask.

Figure 32E:
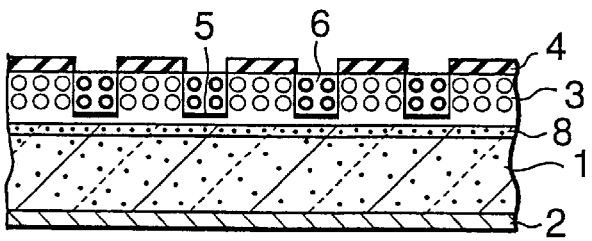

Then the porous polycrystal silicon layer 5 is subjected to rapid thermal oxidation (RTO), that is a part of the porous polycrystal silicon layer 5 is oxidized, resulting in the structure shown in FIG. 32E being obtained. Conditions of rapid thermal oxidation are set to oxidizing temperature of 900< C. and oxidation period of one hour. Although a part of the porous polycrystal silicon layer 5 is oxidized in this embodiment, the porous polycrystal silicon layer 5 may also be oxidized as a whole.

Figure 32F:
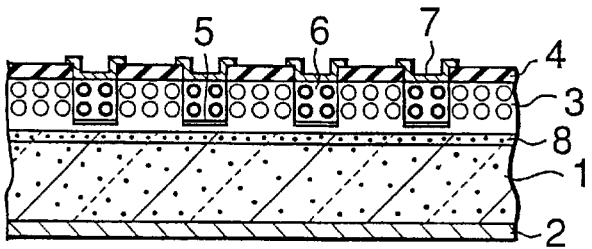

Then a thin gold film is formed in stripes on the porous polycrystal silicon layer 6 and on the polycrystal silicon layer 3 so as to cross the n-type region 8 by vapor deposition using a mask, thereby to form the thin metal film 7 (metal electrode) made of thin gold film, so that the field emission electron source 10 of the structure shown in FIG. 32F is obtained. While gold is used for the thin metal film 7 in this embodiment, material for making the thin metal film 7 is not limited to gold and may be any metal having a low work function such as aluminum, chromium, tungsten, nickel, platinum or an alloy of some of these metals. Although thickness of the thin gold film is set to 10 nm, the thickness is not limited to this value.

The field emission electron source 10 described above is put in a vacuum chamber (not shown) with the collector electrode (not shown) disposed at a position to face the thin metal film 7, and the inside of the vacuum chamber is pumped vacuum to a pressure of $5 \times 10^{-5}$ Pa When a direct current voltage of 20 V is applied across the thin metal film 7 as positive electrode and the n-type region 8 as negative electrode and a direct current voltage of 100 V is applied across the collector electrode as positive electrode and the thin metal film 7 as negative electrode, emission of electrons from the surface of the thin metal film 7 toward the collector electrode can be observed. The back electrode 2 is preferably at a negative potential with respect to the n-type region.

In the method of producing the field emission electron source according to this embodiment, since the silicon oxide layer 4 patterned by combining the photolithography technique and etching technique is used as the mask in the anodic oxidation process to form the porous polycrystal silicon layer 5, the accuracy of forming the pattern of the porous polycrystal silicon layer 5 is improved. Also because the contact area of the oxidized porous polycrystal silicon layer 6 and the thin metal film 7 is determined by the accuracy of forming the pattern of the silicon oxide layer 4, accuracy of the electron emitting area can be improved at a low cost.

Although the p-type silicon substrate ((100) substrate having resistivity of 10 Ωcm) is used for the conductive substrate in this embodiment, the conductive substrate is not limited to the p-type silicon substrate. For example, a glass substrate coated with a thin conductive film (such as thin chromium film or thin ITO film) may be used, making it possible to increase the surface area and lower production cost compared to a case of using a semiconductor substrate such as p-type silicon substrate.

Embodiment 13

Figure 33:
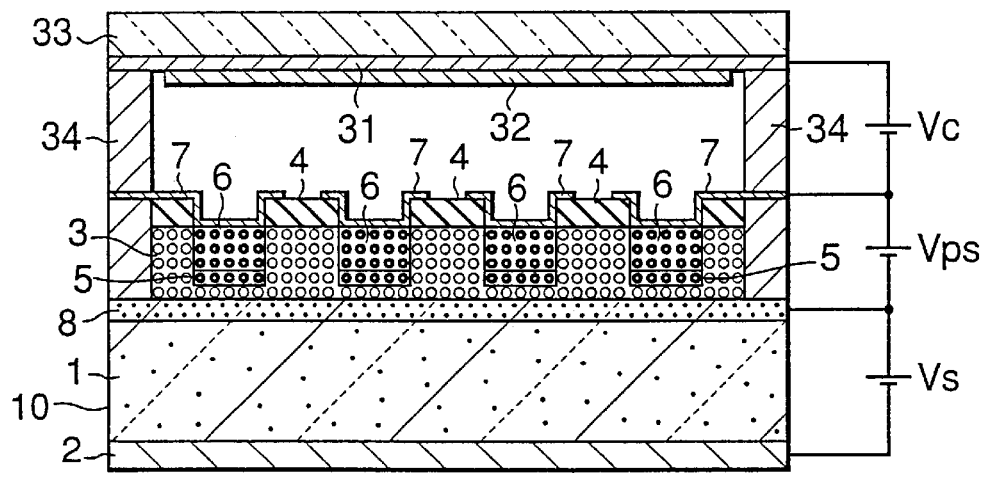
FIG. 33 is a drawing showing the schematic constitution of the thirteenth embodiment.

FIG. 33 shows the schematic configuration of a planar light emission apparatus using the field emission electron source 10 of the twelfth embodiment. Components similar to those of the twelfth embodiment will be denoted with identical reference numerals and description thereof will be omitted.

The planar light emission apparatus of this embodiment comprises the field emission electron source 10 and a transparent electrode 31 disposed to oppose the thin metal film 7 of the field emission electron source 10, wherein the transparent electrode 31 is coated with a phosphor 32 that emits visible light when irradiated with electrons emitted by the field emission electron source 10. The transparent electrode 31 is made of a transparent conductive film, and is formed in a transparent sheet 33 comprising a glass substrate. The transparent sheet 33 whereon the transparent electrode 31 and the phosphor 32 are formed is made integral with the field emission electron source 10 via a spacer 34, with the inner space enclosed by the transparent sheet 33, the spacer 34 and the field emission electron source 10 evacuated to a predetermined degree of vacuum.

When electrons are emitted from the field emission electron source 10, the phosphor 32 is caused to emit light that is guided through the transparent electrode 31 and the transparent sheet 33 to the outside for display.

In the planar light emission apparatus of this embodiment, when a direct current voltage Vc of 1 kV is applied across the transparent electrode 31 and the thin metal film 7, with the transparent electrode 31 at a positive potential with respect to the thin metal film 7, and a direct current voltage Vps of 20 V is selectively applied across the thin metal film 7 of the field emission electron source 10 as the positive electrode and selected thin metal film 7, light is emitted in a pattern that corresponds to the selected intersects. Thus since the electron source comprising the strong electric field drift layer 6 that is made by oxidizing the porous polycrystal semiconductor layer in this embodiment, electrons are emitted in a direction substantially perpendicular to the thin metal film 7 substantially uniformly in the plane thereof, it is not necessary to provide a converging electrode that has been used in the conventional planar light emission apparatus, making the constitution simpler and reducing the cost. Also because the electron emitting area pattern of the field emission electron source 10 of this embodiment has a high accuracy, the planar light emission apparatus of less unevenness in light emission can be achieved. Particularly since the ohmic electrode 2 is charged with negative potential with respect to the n+ conductive layer 8 in this embodiment, leak current can be prevented from flowing between the conductive layers and is therefore more preferable.

Embodiment 14

Figure 34:
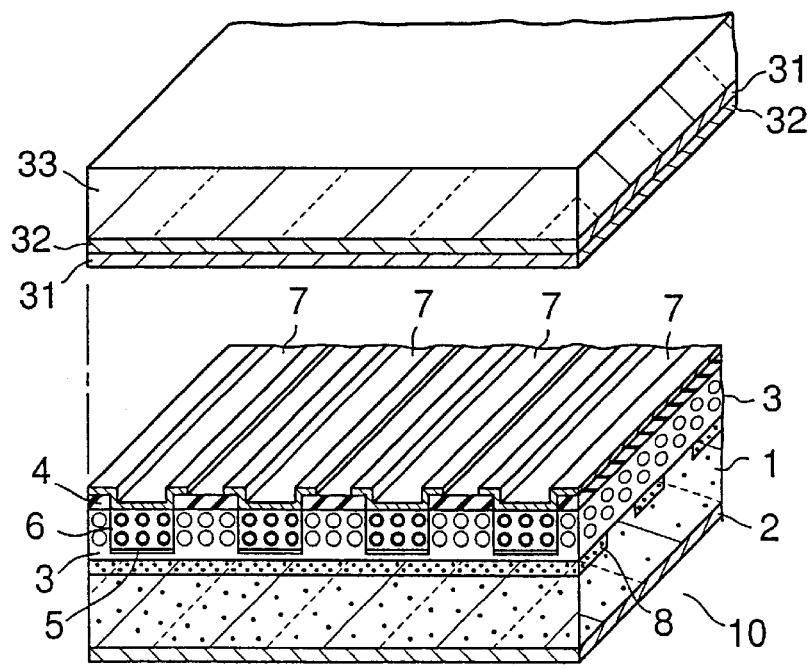
FIG. 34 is a drawing showing the schematic constitution of the fourteenth embodiment.

FIG. 34 shows a schematic configuration of the field emission electron source 10 of the twelfth embodiment applied to a display apparatus. In this embodiment, as shown in FIG. 34, the thermally oxidized porous polycrystal silicon layer 6 is formed on the n+ conductive layer 8 having a form of stripes and the thin metal films 7 in the form of stripes are formed to cross the stripe pattern of the n+ conductive layer 8. Also the transparent electrode 31 is disposed to face the thin metal films 7 of the field emission electron source 10, and a transparent electrode 31 disposed to oppose the thin metal film 7 of the field emission electron source 10, wherein the transparent electrode 31 is coated with a phosphor 32 that emits visible light when irradiated with electrons emitted by the field emission electron source 10. The transparent electrode 31 is made of a transparent conductive film, and is formed in a transparent sheet 33 comprising a glass substrate. In this embodiment, the n+ region 8 and the thin gold film 7 are disposed to cross each other at right angles, thereby to form a matrix. Each intersect of the n+ region 8 and the thin gold film 7 corresponds to a pixel. Thus a particular pixel can be caused to illuminate by applying voltages to selected thin metal electrode 7 and the n+ region 8.

In the display apparatus of this embodiment, the electron emitting area pattern of the field emission electron source 10 has a high accuracy and makes it possible to achieve a high definition display apparatus.

Embodiment 15

The method of producing the field emission electron source of this embodiment will be described below with reference to FIG. 35A through 35D.

Figure 35A:
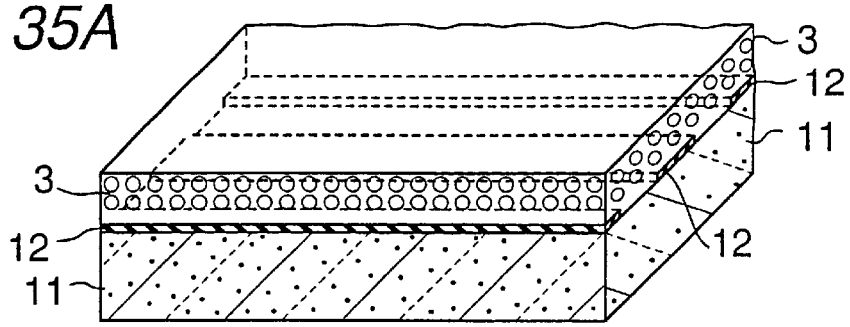
FIGS. 35A through 35D are drawings explaining a major flow sheet of the fifteenth embodiment.
Figure 35B:
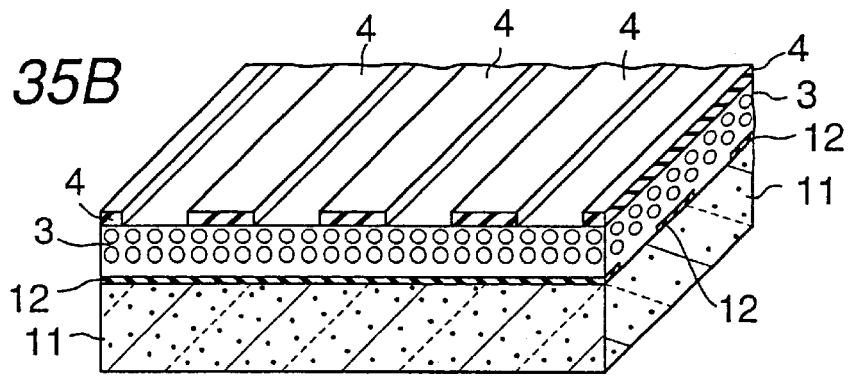
Figure 35C:
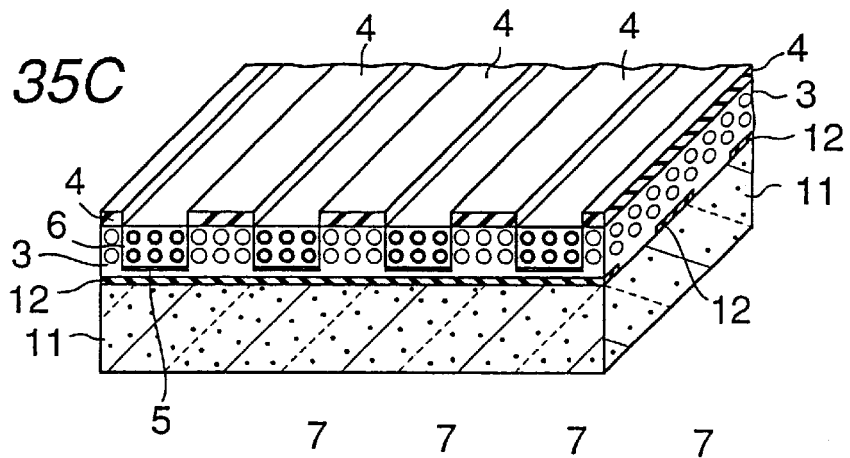

First, after the lower electrode 12 is formed in stripes on the principal surface of an insulating substrate 11, the undoped polycrystal silicon layer 3 having a thickness of 1.5 µm is formed by LPCVD step to cover the lower electrode 12 over the entire principal surface of an insulating substrate 11, thereby to form the structure shown in FIG. 35A. Surface of the polycrystal silicon layer 3 is made substantially flat. Conditions of forming the film by the LPCVD process are set to substrate temperature of 610° C., $SiH_4$ gas flow rate of 600 sccm and pressure of evacuated chamber of 20 Pa. Step for forming the polycrystal silicon layer 3 is not limited to the LPCVD process, and such a process may be employed as an amorphous silicon layer is formed by sputtering or plasma CVD method and then the amorphous silicon layer is crystallized by annealing, thereby forming the polycrystal silicon layer.

Then a silicon oxide layer 4 having a thickness of 1 µm is formed by plasma CVD process on the polycrystal silicon layer 3. Conditions of forming the silicon oxide layer 4 are set to substrate temperature of 225° C., $SiH_4$ gas flow rate of 50 sccm, $N_2O$ gas flow rate of 875 sccm, pressure of evacuated chamber of 133 Pa and ac discharge power of 150 W (power density of 0.05 W/cm$^2$). The method for forming the silicon oxide layer 4 is not limited to the plasma CVD process and, for example, thermal oxidation step may be employed. After forming the silicon oxide layer 4 described above, the silicon oxide layer 4 is patterned in stripes that cross the lower electrode 12 at right angles by combining the photolithography technique and etching technique, thereby to obtain the structure shown in FIG. 35B.

Then an electrolysis solution made by mixing 55 weight % of hydrogen fluoride solution and ethanol in a proportion of 1:1 and cooled to 0° C., a platinum electrode (not shown) as the negative electrode and the lower electrode 12 as the positive electrode are used to carry out anodic oxidation process with a constant current while irradiating the exposed portion of the polycrystal silicon layer 3 with light, so that the porous polycrystal silicon layer 5 is formed in stripes. In this embodiment, conditions of the anodic oxidation process are set to constant current density of 20 mA/cm$^2$, anodic oxidation time of 15 seconds and irradiation with light emitted by a 500 W tungsten lamp during the anodic oxidation process, thereby forming the porous polycrystal silicon layer 1 $\mu$m thick While the silicon oxide layer 4 is also etched by the electrolysis solution during the anodic oxidation process, the silicon oxide layer 4 has a thickness of 1 $\mu$m, in contrast to the etching rate of the silicon oxide layer 4 by the electrolysis solution being about 0.14 $\mu$m per minute and the duration of the anodic oxidation process is 15 seconds. Therefore, the silicon oxide layer 4 surely functions as a mask. Then the porous polycrystal silicon layer 5 is subjected to rapid thermal oxidation (RTO) thereby to oxidize the porous polycrystal silicon layer to a predetermined depth (that is, a part of the porous polycrystal silicon layer is oxidized). Thus the thermally oxidized porous polycrystal silicon layer 6 is formed resulting in the structure shown in FIG. 35C. Conditions of rapid thermal oxidation are set to oxidizing temperature of 900° C. and oxidation period of one hour. Although a part of the porous polycrystal silicon layer 5 is oxidized in this embodiment, the porous polycrystal silicon layer 5 may also be oxidized as a whole.

Figure 35D:
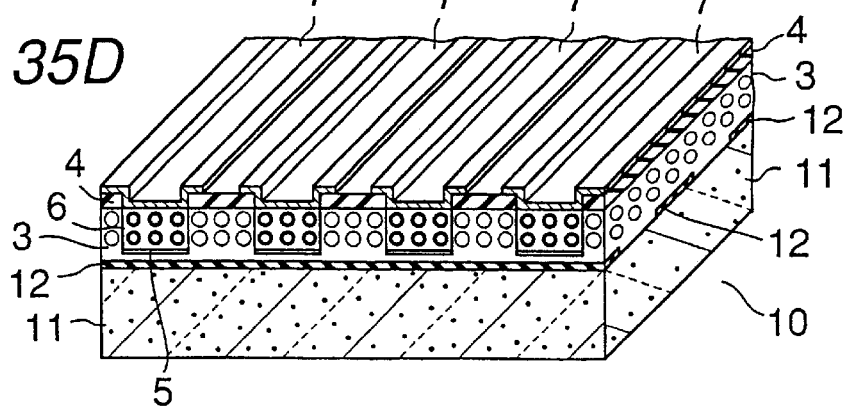

Then a thin gold film is formed as the surface electrodes 7 on the principal surface side of the insulating substrate 11 in stripes that cross the stripe pattern of the lower electrode 12 at right angles by vapor deposition, thereby to obtain the field emission electron source 10 of the structure shown in FIG. 35D. While gold is used for the thin metal film 7 in this embodiment, material for making the thin metal film 7 is not limited to gold and may be any metal having a low work function such as aluminum, chromium, tungsten, nickel, platinum or an alloy of some of these metals. Although thickness of the thin gold film is set to 10 nm, the thickness is not limited to this value. The thin metal films 7 constitute the upper electrode in this embodiment.

In this embodiment, since the silicon oxide layer 4 patterned by combining the photolithography technique and etching technique is used as the mask in the anodic oxidation process to form the porous polycrystal silicon layer 5, the accuracy of forming the pattern of the porous polycrystal silicon layer 5 is improved. Also because the contact area of the oxidized porous polycrystal silicon layer 6 and the thin metal film 7 is determined by the accuracy of forming the pattern of the silicon oxide layer 4, accuracy of the electron emitting area can be improved at a low cost.

In the field emission electron source 10 of this embodiment, electrons can be emitted from only a particular pixel by applying voltages to selected lower electrode 12 and upper electrode 7.

Embodiment 16

The method of producing the field emission electron source of this embodiment will be described below with reference to FIG. 36A through 36D. The method of this embodiment is substantially the same as that of the fifteenth embodiment except for the pattern configuration of the silicon oxide layer 4. Features that are the same as those of the fifteenth embodiment will be described briefly.

Figure 36A:
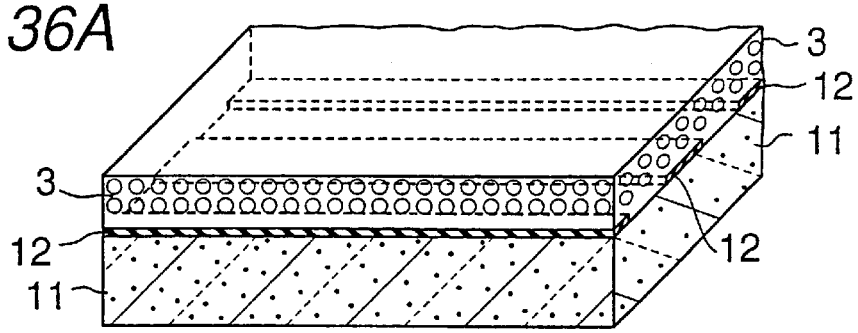
FIGS. 36A through 36D are drawings explaining a major flow sheet of the sixteenth embodiment.

First, after the lower electrode 12 is formed in stripes on the principal surface of the insulating substrate 11, the undoped polycrystal silicon layer 3 having a thickness of 1.5 $\mu$m is formed by LPCVD step to cover the lower electrode 12 over the entire principal surface of the insulating substrate 11, thereby to obtain the structure shown in FIG. 36A.

Figure 36B:
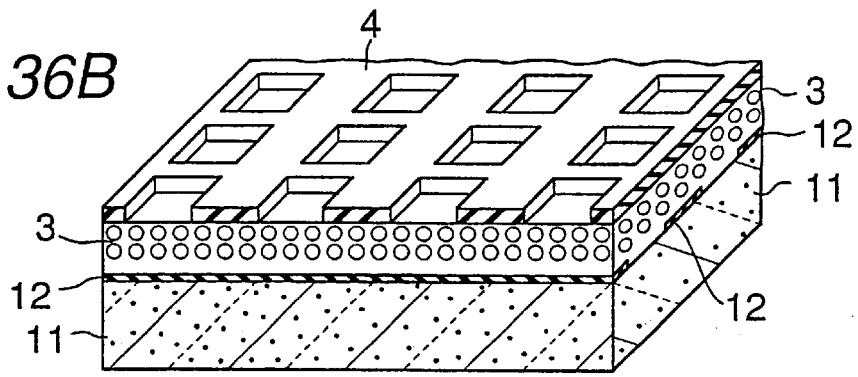
Figure 36C:
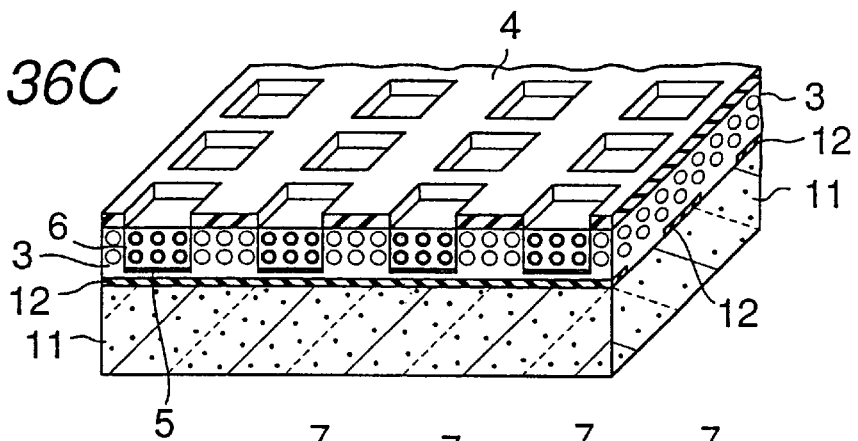

After forming the silicon oxide layer 4 having thickness of 1 $\mu$m on the polycrystal silicon layer 3 by plasma CVD process, the silicon oxide layer 4 is patterned in a grating configuration opening at predetermined intervals long the longitudinal direction of the lower electrode 12 above the lower electrode 12 by combining the photolithography technique and etching technique, so that the structure shown in FIG. 36B is obtained.

Then an electrolysis solution made by mixing 55 weight % of hydrogen fluoride solution and ethanol in a proportion of 1:1 and cooled to 0° C., a platinum electrode (not shown) as the negative electrode and the lower electrode 12 as the positive electrode are used to carry out anodic oxidation process with a constant current while irradiating the exposed portion of the polycrystal silicon layer 3 with light, so that the porous polycrystal silicon layer 5 is formed. Then the porous polycrystal silicon layer 5 is oxidized to a predetermined depth by rapid thermal oxidation (RTO), thereby to form the thermally oxidized porous polycrystal silicon layer 6 resulting in the structure shown in FIG. 36C.

Figure 36D:
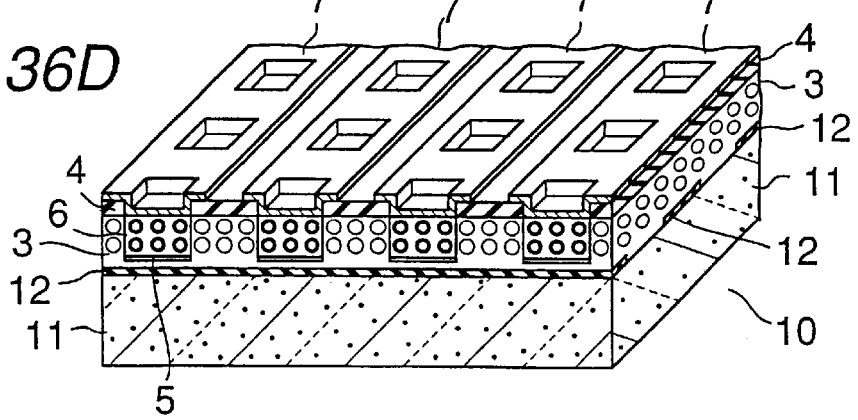

Then a thin gold film is formed as the surface electrodes 7 on the principal surface side of the insulating substrate 11 in stripes that cross the stripe pattern of the lower electrode 12 at right angles by vapor deposition using a metal mask, thereby to obtain the field emission electron source 10 of the structure shown in FIG. 36D. While gold is used for the thin metal film 7 in this embodiment, material for making the thin metal film 7 is not limited to gold and may be any metal having a low work function such as aluminum, chromium, tungsten, nickel, platinum or an alloy of some of these metals. Although thickness of the thin gold film is set to 10 nm, the thickness is not limited to this value. The thin metal films 7 constitute the upper electrode in this embodiment.

In this embodiment, since the silicon oxide layer 4 patterned by combining the photolithography technique and etching technique is used as the mask in the anodic oxidation process to form the porous polycrystal silicon layer 5, the accuracy of forming the pattern of the porous polycrystal silicon layer 5 is improved. Also because the contact area of the oxidized porous polycrystal silicon layer 6 and the thin metal film 7 is determined by the accuracy of forming the pattern of the silicon oxide layer 4, accuracy of the electron emitting area can be improved at a low cost.

In the field emission electron source 10 of this embodiment, electrons can be emitted from only a particular pixel by applying voltages to selected lower electrode 12 and upper electrode 7. This embodiment is also preferable because the insulating layer 4 is provided below the thin metal film 7 other than the porous polycrystal silicon layer 6 and improves the cross-talk characteristics and the straightness of the electron traveling distance.

Embodiment 17

Figure 37:
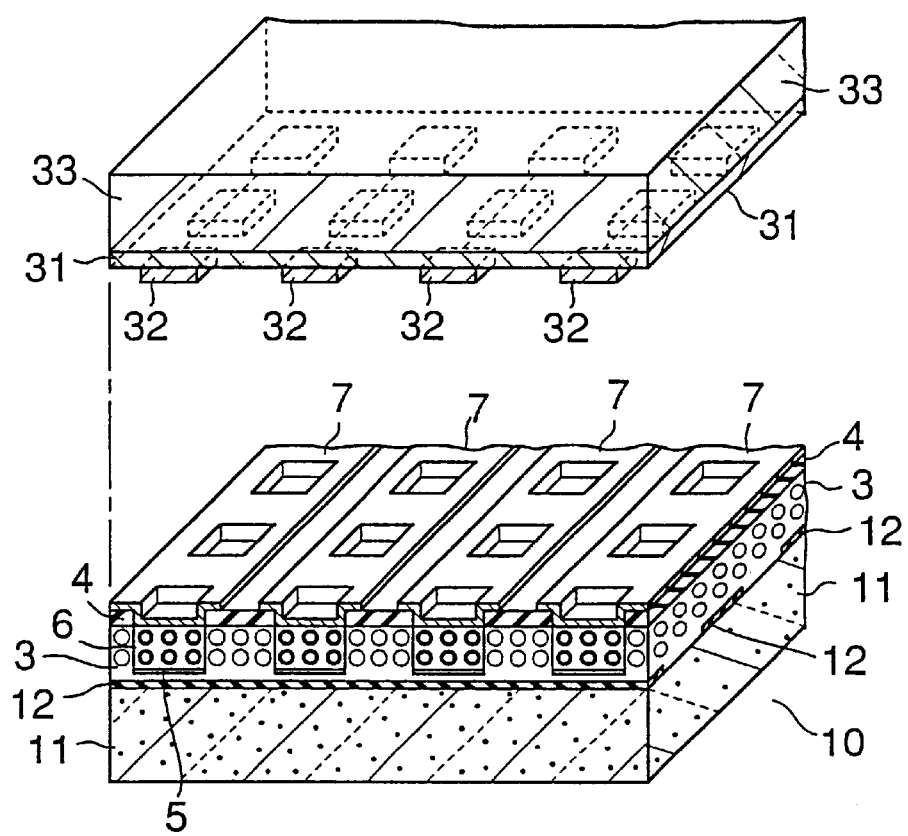
FIG. 37 is a drawing showing the schematic constitution of the seventeenth embodiment.

FIG. 37 shows the schematic configuration of the field emission electron source 10 of the embodiment 16 applied to a display apparatus. In this embodiment, as shown in FIG. 37, the transparent electrode 31 is disposed to oppose the thin metal films 7 of the field emission electron source 10, wherein the transparent electrode 31 is coated with a phosphor 32 that emits visible light when irradiated with electron beam emitted by the field emission electron source 10. The transparent electrode 31 is made of a transparent conductive film, and is formed in a transparent sheet 33 comprising a glass substrate. In this embodiment, the transparent electrodes 31 are formed in an array in the same plane, and are formed in a configuration of matrix opposing the portions of the gold electrodes 7 that are formed on the thermally oxidized porous polycrystal silicon layer 6. The transparent electrode 31 and the transparent sheet 33 whereon the phosphor 32 is applied are made integral with the field emission electron source 10 via a spacer (not shown), with the inner space enclosed by the transparent sheet 33, the spacer and the field emission electron source 10 being evacuated to a predetermined degree of vacuum. Electron beam can be emitted from only particular pixels by combining the metal electrodes 7 (hereinafter referred to as the upper electrodes 7) and the lower electrodes 12 to which voltages are applied, so that only the phosphor 32 disposed to oppose the particular pixel is caused to emit light that is guided through the transparent electrode 31 and the transparent sheet 33 to the outside for display.

In this embodiment, when a direct current voltage of 1 kV is applied across the transparent electrode 31 and the upper electrodes 7, with the transparent electrode 31 at a positive potential with respect to the upper electrodes 7, and a direct current voltage of 20 V is applied across the upper electrode 7 as the positive electrode and the lower electrode 12, only the phosphor 32 corresponding to a particular pixel of the electron source is caused to illuminate.

In this embodiment, since the accuracy of electron emitting area pattern of the field emission electron source 10 is determined by the accuracy of the silicon oxide layer 4 pattern, the accuracy of the electron emitting area is high and a high definition display can be achieved.

According to the present invention, as will be apparent from the foregoing description electrons can be emitted from a desired region of the spice electrode, and a circuit for switching a high voltage of several hundreds to several thousands of volts applied to the collector electrode is made unnecessary when making a display apparatus wherein the collector electrode is disposed to oppose the surface electrode. As a result, a high accuracy field emission electron source array capable of emitting electrons selectively from a desired region of the surface electrode can be made smaller in size at a lower cost.

What is claimed is:

1. An array of field emission electron sources comprising:
   a substrate;
   a conductive layer, located on a surface of said substrate, comprising a plurality of stripes extending in parallel to each other at predetermined intervals;
   a strong electric field drift layer, formed on said conductive layer, comprising a porous poly-crystal semiconductor layer which has been subjected to oxidation or nitrization;
   thin conductive film surface electrodes, formed on said drift layer, comprising a plurality of thin conductive film stripes extending in parallel to each other at predetermined intervals in a manner to oppose and cross over the stripes of said conductive layer via said drift layer;
   said drift layer comprising electron emitting regions which are coupled between said conductive layer and said thin conductive film, and comprising non-electron emitting regions which are not coupled between said conductive layer and said thin conductive film;
   said electron emitting and non-emitting regions arranged separate from one another, thereby forming a plurality of electron sources arranged at predetermined intervals on said substrate; and
   wherein electrons are injected from said substrate into said drift layer and are drifted and discharged through said thin conductive film by applying a voltage across said thin conductive film and said conductive layer with said thin conductive film serving as a positive electrode.

2. The array of field emission sources of claim 1, wherein said substrate comprises an insulating substrate provided with a semiconductor layer on a surface or comprises a semiconductor substrate and the stripes of said conductive layer are impurity-diffusion layers extending in parallel to each other at predetermined intervals on said conductive substrate.

3. The array of field emission sources of claim 1, wherein said substrate comprises an insulator and said conductive layer stripes comprise metal.

4. The array of field emission sources of claim 2, wherein between the stripes of said conductive layer, there are formed layers doped with a high amount of a different type of impurity from said conductive layer.

5. The array of field emission sources of claim 4, wherein said substrate is a p-type semiconductor substrate, said impurity diffusion layer is an n-type impurity doped layer and said high impurity doped layer is a p-type impurity doped layer.

6. The array of field emission sources of claim 2, wherein insulate layer(s) are formed between the stripes of said conductive layer to shut out leakage current flowing from said substrate through said poly-crystal layer to said thin conductive film or flowing from said conductive layer to said drift layer.

7. The array of field emission sources of claim 1, wherein said drift layer is surrounded by poly-crystal semiconductor layers doped with a different type of impurity from that of said conductive layer or without impurity, and said poly-crystal layer is covered by an insulating layer at the top of said poly-crystal layer.

8. The array of field emission sources of claim 2, wherein said substrate comprises a semiconductor substrate and an electrode is formed at a principal surface opposite said impurity diffusion layer.

9. The array of field emission sources of claim 1, wherein said substrate comprises a silicon substrate, and said polycrystal semiconductor layer comprises a poly-silicon.

10. The array of field emission sources of claim 1, wherein said drift layer comprises a plurality of stripes formed along the stripes of said conductive layer.

11. The array of field emission sources of claim 1, wherein said drift layer comprises a plurality of stripes formed along the stripes of said conductive layer at predetermined intervals.

12. The array of field emission sources of claim 1, wherein said drift layer comprises a porous poly-crystal semiconductor made by subjecting a part of the poly-crystal semiconductor to oxidation or nitrization.

13. The array of field emission sources of claim 1, wherein said thin conductive film is flush mounted on said drift layer which is formed on a level with any area other than said drift layer.

14. The array of field emission sources of claim 1, wherein said stripes of said surface electrodes cross over said drift layer and the width of said surface electrodes becomes narrower at any area other than the area on said drift layer.

15. The array of field emission sources of claim 1, wherein said surface electrodes provided with an insulate layer or layers at the upper and lower side of any area other than an area on said drift layer.

16. The array of field emission sources of claim 6, wherein said insulate layers become thinner toward each of two cross direction sides.

17. The array of field emission sources of claim 1, wherein said surface electrodes become thicker at any area other than a surface electrode crossing area on said drift layers.

18. The array of field emission sources of claim 1, wherein said thin conductive film comprises a wiring electrode.

19. A display device comprising a display electrode for receiving electrons radiated from an array of field emission sources of claim 1, and a fluorescent material mounted on an upper or lower surface of said display electrode for emitting light and making an image.

20. An array of field emission electron sources comprising:
    a semiconductor substrate or an insulate substrate provided with a semiconductor layer on a surface thereof;
    a conductive layer, located on a principal surface of said substrate, comprising impurity-diffusion stripes extending in parallel to each other at predetermined intervals on said semiconductor substrate or layer;
    wherein at each cross direction side of the stripes of said conductive layer there is a pair of high density impurity diffusion layers, of the same conductivity as said conductive layer, extending along the stripes;
    a strong electric field drift layer formed on said conductive layer;
    surface electrodes comprising a thin conductive film, formed on the drift layer, comprising a plurality of stripes extending in parallel to each other at predetermined intervals in a manner to oppose and cross over the stripes of said conductive layer via said drift layer;
    said drift layer comprising a porous poly-crystal semiconductor layer which is subjected to oxidization or nitrization, with regions of said drift layer being held between said conductive layer and said thin conductive film at intersect points of the stripes of said conductive layer and said thin conductive film, thereby forming a plurality of electron sources arranged at predetermined intervals on said conductive substrate; and
    wherein electrons are injected from said semiconductor substrate or layer into said drift layer and are drifted and discharged through said thin conductive film by applying a voltage across said thin conductive film and said conductive layer with said thin conductive film serving as a positive electrode.

21. The array of field emission sources of claim 20, wherein said high density impurity diffusion layers comprise double layers wherein the inside layer has a higher density of impurity than the outside layer.

22. An array of field emission electron sources comprising:
    a substrate;
    a conductive layer, located on a principal surface of said substrate, comprising a plurality of stripes extending in parallel to each other at predetermined intervals;
    a strong electric field drift layer formed on said conductive layer;
    surface electrodes comprising a thin conductive film, formed on the drift layer, comprising a plurality of stripes extending in parallel to each other at predetermined intervals in a manner to oppose and cross over the stripes of said conductive layer via said drift layer;
    said drift layer comprising a part of a porous poly-crystal semiconductor layer which is subjected to oxidization or nitrization, with regions of said drift layer being held between said conductive layer and said thin conductive film at intersect points of the stripes of said conductive layer and said thin conductive film, thereby forming a plurality of electron sources arranged at predetermined intervals on said conductive substrate,
    said drift layer being surrounded by insulate layers formed or filled in grooves made by removing all or part of semiconductor layers positioned between the stripes of said conductive layer and by removing all or part of semiconductor layers not covered by said thin conductive film; and
    wherein electrons are injected from said substrate into said drift layer and are drifted and discharged through said thin conductive film by applying a voltage across said thin conductive film and said conductive layer with said thin conductive film serving as a positive electrode.

* * * * *

UNITED STATES PATENT AND TRADEMARK OFFICE
CERTIFICATE OF CORRECTION

PATENT NO. : 6,794,805 B1
DATED : September 21, 2004
INVENTOR(S) : T. Hatai et al.

It is certified that error appears in the above-identified patent and that said Letters Patent is hereby corrected as shown below:

<u>Title page,</u>
Item [30], Foreign Application Priority Data, "May 26, 1998" should be
-- May 26, 1999 --.

Signed and Sealed this

Twenty-first Day of June, 2005

JON W. DUDAS
*Director of the United States Patent and Trademark Office*